United States Patent
Okada

(10) Patent No.: US 11,939,687 B2
(45) Date of Patent: Mar. 26, 2024

(54) WATER ELECTROLYSIS APPARATUS, AND STERILIZATION/CLEANING METHOD AND METHOD FOR DECOMPOSING/REMOVING HARMFUL SUBSTANCE, EACH USING WATER ELECTROLYSIS APPARATUS

(71) Applicant: Kogakuin University, Tokyo (JP)

(72) Inventor: Fumio Okada, Tokyo (JP)

(73) Assignee: Kogakuin University, Tokyo (JP)

( * ) Notice: Subject to any disclaimer, the term of this patent is extended or adjusted under 35 U.S.C. 154(b) by 147 days.

(21) Appl. No.: 17/432,863

(22) PCT Filed: Feb. 25, 2020

(86) PCT No.: PCT/JP2020/007520
§ 371 (c)(1),
(2) Date: Aug. 20, 2021

(87) PCT Pub. No.: WO2020/171238
PCT Pub. Date: Aug. 27, 2020

(65) Prior Publication Data
US 2022/0098745 A1    Mar. 31, 2022

(30) Foreign Application Priority Data
Feb. 22, 2019  (JP) ................. 2019-031029

(51) Int. Cl.
C25B 15/08    (2006.01)
C02F 1/461    (2023.01)
(Continued)

(52) U.S. Cl.
CPC .......... *C25B 15/08* (2013.01); *C02F 1/46104* (2013.01); *C25B 9/19* (2021.01);
(Continued)

(58) Field of Classification Search
CPC .............. C02F 1/46; C02F 2201/46
(Continued)

(56) References Cited

U.S. PATENT DOCUMENTS 2,634,959 A * 4/1953 John ............... B01J 19/32
                                                 261/24
4,048,047 A * 9/1977 Beck ............... C25B 11/036
                                                 204/278
(Continued)

FOREIGN PATENT DOCUMENTS

JP    173852/1984 U    6/1986
JP    2001-300561 A   10/2001
(Continued)

OTHER PUBLICATIONS

Machine translation of Okada JP 2018/076575 A (Year: 2018).*
(Continued)

*Primary Examiner* — Harry D Wilkins, III
(74) *Attorney, Agent, or Firm* — Kilpatrick Townsend & Stockton LLP

(57) ABSTRACT

In an anode side electrolytic domain (130), a radial flow is formed from an outer peripheral opening (131) to an inner side opening (141) of an anode side mesh electrode (140). Flows horizontal to the electrode surface of the anode side mesh electrode 140 are formed. Gases such as ozone generated from water electrolysis in the anode side electrolytic domain (130) are dissolved in raw water in the anode side electrolytic domain (130), and anode side electrolytic water is generated. Gas such as ozone that has been atomized by the anode side mesh electrode (140) comes into contact with the raw water, and high concentration anode side electrolytic water is generated. The anode side electrolytic water gen- (Continued)

erated in the anode side electrolytic domain (130) flows in the inner side opening (141) of the anode side mesh electrode (140).

25 Claims, 39 Drawing Sheets

(51) Int. Cl.
  *C25B 1/04*       (2021.01)
  *C25B 9/19*       (2021.01)
  *C25B 9/60*       (2021.01)
  *C25B 11/031*     (2021.01)
  *C25B 11/036*     (2021.01)
  *C25B 11/044*     (2021.01)
  *C25B 13/08*      (2006.01)

(52) U.S. Cl.
  CPC .............. *C25B 9/60* (2021.01); *C25B 11/031* (2021.01); *C25B 11/036* (2021.01); *C25B 11/044* (2021.01); *C25B 13/08* (2013.01); *C02F 2201/46115* (2013.01); *C02F 2201/46145* (2013.01); *C25B 1/04* (2013.01)

(58) Field of Classification Search
  USPC ................................................ 261/100–104
  See application file for complete search history.

(56) References Cited

U.S. PATENT DOCUMENTS

| | | | | |
|---|---|---|---|---|
| 5,389,210 A | * | 2/1995 | Silveri | E04H 4/169 204/279 |
| 6,315,886 B1 | * | 11/2001 | Zappi | C02F 1/46109 204/266 |
| 8,562,803 B2 | * | 10/2013 | Nyberg | C02F 1/4695 204/632 |
| 2004/0031761 A1 | * | 2/2004 | Wunsche | C02F 1/467 204/242 |
| 2012/0031754 A1 | * | 2/2012 | Shyu | C02F 1/461 204/278.5 |
| 2015/0353401 A1 | | 12/2015 | Matsumoto et al. | |
| 2017/0334750 A1 | | 11/2017 | Nitta et al. | |

FOREIGN PATENT DOCUMENTS

| | | | | |
|---|---|---|---|---|
| JP | 2002-531704 A | * | 9/2002 | ........ C02F 1/46104 |
| JP | 2006-124750 A | | 5/2006 | |
| JP | 2008-266718 A | | 11/2008 | |
| JP | 2012-246553 A | | 12/2012 | |
| JP | 2014-198310 A | | 10/2014 | |
| JP | 2018-76575 A | | 5/2018 | |
| WO | 2014/115383 A1 | | 7/2014 | |
| WO | 2017/006837 A1 | | 1/2017 | |

OTHER PUBLICATIONS

International Search Report in PCT/JP2020/007520, dated May 19, 2020, 3 pages.

Extended European Search Report in 20759823.6 dated Nov. 11, 2022, 12 pages.

Okada et al. Production of 160 mg/L ozone water using circulating water electrolysis system. Electrochimica Acta. Jan. 20, 2019;294:391-7.

\* cited by examiner

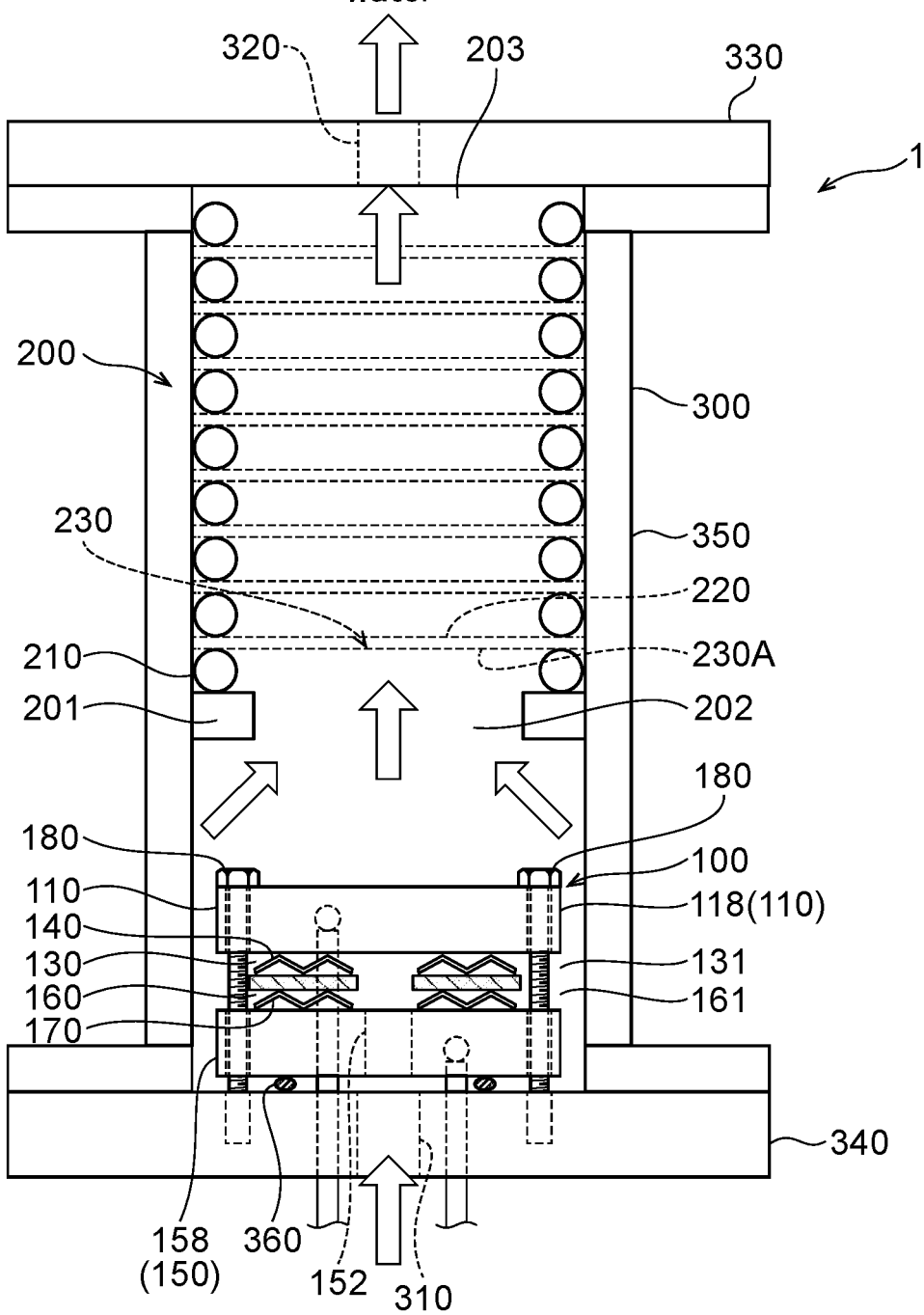

Voltage and Current Characteristics of Water Electrolysis Apparatus

Dissolved Ozone Concentration in Functional Water Generated by Water Electrolysis Apparatus Gas-phase Ozone Generation Rate of Water Electrolysis Apparatus Ozone Generation Current Efficiency of Water Electrolysis Apparatus Hydrogen Peroxide Concentration of Functional Water Generated by Water Electrolysis Apparatus pH of Anode Side Electrolytic Water and Cathode Side Electrolytic Water at Outlet of Water Electrolysis Apparatus Difference in Hydroxide Ion ($OH^-$) Generation Rate Between Pt Electrode and Ti Electrode Voltage-current Characteristics of Water Electrolysis Apparatus Relationship Between Current Density and Gas-phase Ozone Generation Rate Dissolved Ozone Concentration in Advanced Oxidation
Water Generated at Current Density of 0.2 A/cm$^2$ Hydrogen Peroxide Concentration in Advanced Oxidation
Water Generated at Current Density of 0.2 A/cm$^2$ Ozone Generation Current Efficiency When Operating at Current Density of 0.2 A/cm²

Change in Voltage over Time When Operating at Current Density of 0.2A/cm²

Change over Time in Dissolved Ozone
Concentration in Advanced Oxidation Water

Analysis Results of Advanced Oxidation Water
Generated by BDD Powder Supported Catalyst

| Electric density [A/cm$^2$] | Liquid-phase $O_3$ concentration [mg/L] | Gas-phase $O_3$ generation rate [mL/min] | $H_2O_2$ concentration [mg/L] |
|---|---|---|---|
| 0.115 | 0.125 | 0.0009 | 0.15 |
| 0.153 | 0.193 | 0.0031 | 0.15 |

Change over Time in Voltage at 1A Operation with BDD Powder Supported Ti Mesh Catalyst

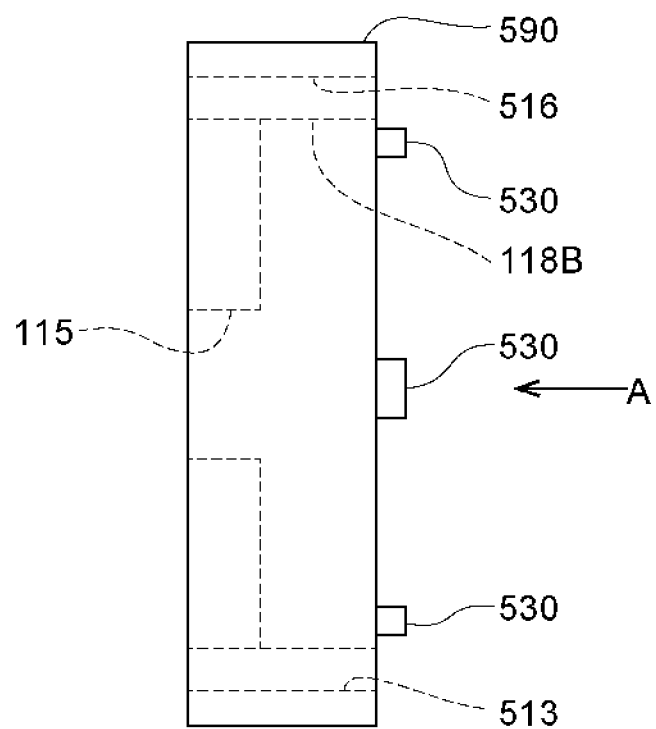

FIG.44

Table 1 Sterilization Experiment Results of Three-stage Parallel Type Water Electrolysis Apparatus

| | | |
|---|---|---|
| Properties of advanced oxidation water when electrolyzing tap water | Dissolved $O_3$ concentration [ppm] | 2.7 |
| | $H_2O_2$ concentration [ppm] | 0.42 |
| ATP concentration when directly electrolyzing river water | ATP [RLU] of contaminated raw water | 357 |
| | ATP [RLU] after treatment | 7 |

WATER ELECTROLYSIS APPARATUS, AND STERILIZATION/CLEANING METHOD AND METHOD FOR DECOMPOSING/REMOVING HARMFUL SUBSTANCE, EACH USING WATER ELECTROLYSIS APPARATUS

TECHNICAL FIELD

The present invention relates to a water electrolysis apparatus, and a sterilization/cleaning method and a method of decomposing/removing a harmful substance, each using the water electrolysis apparatus.

BACKGROUND ART

Japanese Patent Application Laid-Open (JP-A) No. 2018-76575 describes an invention in which a square metal mesh electrode is provided in a water electrolysis cell, and water is distributed horizontally to the surface of the metal mesh electrode to bring ozone, which has been atomized in the metal mesh electrode, into contact with the water, thereby increasing the concentration of ozonated water.

SUMMARY OF INVENTION

Technical Problem

The invention aims at generating a large flow rate of functional water in a small apparatus by making a water electrolysis cell smaller and reducing the pressure loss in the water electrolysis cell compared to the case of using a square metal mesh electrode. The invention aims at enabling efficient water electrolysis with a smaller number of pipes compared to the case of using a square metal mesh electrode. The invention aims at sterilizing and cleaning contaminated water such as river water with a simple apparatus and method. The invention aims at decomposing/removing a harmful substance in wastewater discharged from a factory, or the like with a simple apparatus and method.

Solution to Problem

A first aspect of the invention is a water electrolysis apparatus including: a first inlet through which raw water flows in from the outside; a second inlet through which raw water flows in from the outside; a first outlet through which anode side electrolytic water flows out to the outside; a second outlet through which cathode side electrolytic water flows out to the outside; and a water electrolysis portion interposed between the first and second inlets and the first and second outlets, wherein the water electrolysis portion includes: an anode; a polymer electrolyte membrane provided in the thickness direction of the anode; an anode side electrolytic domain that is formed between the anode and the polymer electrolyte membrane, wherein an outer peripheral opening that is connected to one of the first inlet or the first outlet; an anode side mesh electrode that is provided in the anode side electrolytic domain and includes an inner side opening inside the anode side electrolytic domain, wherein the inner side opening that is connected to the other of the first inlet or the first outlet; a cathode provided in the thickness direction of the polymer electrolyte membrane; a cathode side electrolytic domain formed between the polymer electrolyte membrane and the cathode, wherein an outer peripheral opening is connected to one of the second inlet or the second outlet; and a cathode side mesh electrode that is provided in the cathode side electrolytic domain, includes an inner side opening inside the cathode side electrolytic domain, and the inner side opening is connected to the other of the second inlet or the second outlet.

A second aspect of the invention is a water electrolysis apparatus including: an inlet through which raw water flows in from the outside; an outlet through which electrolytic water flows out to the outside; and a water electrolysis portion interposed between the inlet and the outlet, wherein the water electrolysis portion includes: an anode; a polymer electrolyte membrane that is provided in the thickness direction of the anode and in which an inner side opening that is connected to the inlet is formed; an anode side electrolytic domain that is formed between the anode and the polymer electrolyte membrane, wherein an outer peripheral opening is connected to the outlet; an anode side mesh electrode that is provided in the anode side electrolytic domain and includes an inner side opening inside the anode side electrolytic domain, wherein the inner side opening is connected to the inner side opening of the polymer electrolyte membrane; a cathode provided in the thickness direction of the polymer electrolyte membrane; a cathode side electrolytic domain formed between the polymer electrolyte membrane and the cathode, wherein an outer peripheral opening is connected to the outlet; and a cathode side mesh electrode that is provided in the cathode side electrolytic domain and includes an inner side opening inside the cathode side electrolytic domain, wherein the inner side opening is connected to the inner side opening of the polymer electrolyte membrane.

A third aspect of the invention is a water electrolysis apparatus including: an inlet through which raw water flows in from the outside; an outlet through which electrolytic water flows out to the outside; and a water electrolysis portion interposed between the inlet and the outlet, wherein the water electrolysis portion includes: an anode; a polymer electrolyte membrane that is provided in the thickness direction of the anode and in which an inner side opening that is connected to the outlet is formed; an anode side electrolytic domain that is formed between the anode and the polymer electrolyte membrane, wherein an outer peripheral opening is connected to the inlet; an anode side mesh electrode that is provided in the anode side electrolytic domain and includes an inner side opening inside the anode side electrolytic domain, wherein the inner side opening is connected to the inner side opening of the polymer electrolyte membrane; a cathode provided in the thickness direction of the polymer electrolyte membrane; a cathode side electrolytic domain formed between the polymer electrolyte membrane and the cathode, wherein an outer peripheral opening is connected to the inlet; and a cathode side mesh electrode that is provided in the cathode side electrolytic domain and includes an inner side opening inside the cathode side electrolytic domain, wherein the inner side opening is connected to the inner side opening of the polymer electrolyte membrane.

A fourth aspect of the present invention is the water electrolysis apparatus according to any one of the first aspect to the third aspect, wherein the electrode surfaces of the anode side mesh electrode and the cathode side mesh electrode are parallel to the surface of the polymer electrolyte membrane.

A fifth aspect of the invention is the water electrolysis apparatus according to any one of the first aspect to the third aspect, wherein the anode, the anode side mesh electrode, the polymer electrolyte membrane, the cathode side mesh electrode, and the cathode are circular or approximately circular in outline when viewed in a plane perpendicular to the thickness direction.

A sixth aspect of the invention is the water electrolysis apparatus according to the second aspect or the third aspect, wherein a plurality of the water electrolysis portions are interposed between the inlet and the outlet, and the plurality of the water electrolysis portions are arranged in such a manner that the flow of water in the anode side electrolytic domain and the cathode side electrolytic domain of one of the water electrolysis portions and the flow of water in the anode side electrolytic domain and the cathode side electrolytic domain of another of the water electrolysis portions are parallel.

A seventh aspect of the invention is the water electrolysis apparatus according to the sixth aspect, wherein the cathode or the anode of one of the water electrolysis portions is in common with the cathode or the anode of another of the water electrolysis portions.

An eighth aspect of the invention is the water electrolysis apparatus according to the second aspect, wherein a housing is provided with the inlet and the outlet, the water electrolysis portion is arranged in the housing, a gas-liquid mixing portion is interposed between the water electrolysis portion and the outlet in the housing, and the gas-liquid mixing portion includes: a gas-liquid mixing inlet portion that is connected to outer peripheral openings of the anode side electrolytic domain and the cathode side electrolytic domain of the water electrolysis portion; and a gas-liquid mixing outlet portion that discharges a fluid that has been gas-liquid mixed and that is connected to the outlet.

A ninth aspect of the invention is the water electrolysis apparatus according to the third aspect, wherein a housing is provided with the inlet and the outlet, the water electrolysis portion is arranged in the housing, a gas-liquid mixing portion is interposed between the water electrolysis portion and the outlet in the housing, and the gas-liquid mixing portion includes: a gas-liquid mixing inlet portion that is connected to an inner side opening of the polymer electrolyte membrane; and a gas-liquid mixing outlet portion that discharges a fluid that has been gas-liquid mixed and that is connected to the outlet.

A tenth aspect of the invention is the water electrolysis apparatus of the eighth aspect or the ninth aspect, wherein the gas-liquid mixing portion includes: a plurality of partitioning portions interposed between the gas-liquid mixing inlet portion and the gas-liquid mixing outlet portion, including a plurality of openings, spaced apart in the axial direction of the housing, and partitioning the inside of the housing in the axial direction; and a holding member arranged between the partitioning portions adjacent to each other in the axial direction for holding the spacing between the partitioning portions.

An eleventh aspect of the invention is the water electrolysis apparatus according to the tenth aspect, wherein the partitioning portion is composed of a partitioning member with a plurality of openings.

A twelfth aspect of the invention is the water electrolysis apparatus according to any one of the first aspect to the eleventh aspect, wherein in the anode side electrolytic domain, one or more metal mesh electrodes and a boron-doped diamond substrate electrode in which boron-doped diamond is deposited on a substrate electrode in which a plurality of holes are formed.

A thirteenth aspect of the invention is the water electrolysis apparatus according to any one of the first aspect to the eleventh aspect, wherein the anode side mesh electrode includes a boron-doped diamond mesh electrode in which boron-doped diamond powder is supported on a metal mesh.

A fourteenth aspect of the invention is the water electrolysis apparatus according to any one of the first aspect to the thirteenth aspect, wherein in the cathode side electrolytic domain, a metal mesh electrode made of titanium or/and stainless steel or/and a mesh electrode or substrate electrode in which boron-doped diamond is formed at least on the surface thereof is/are arranged.

A fifteenth aspect of the invention is the water electrolysis apparatus according to any one of the first aspect to the thirteenth aspect, wherein the cathode side mesh electrode includes a metal mesh electrode made of platinum.

A sixteenth aspect of the invention is the water electrolysis apparatus according to the second aspect, wherein a plurality of the water electrolysis portions are provided, and the plurality of the water electrolysis portions are arranged in such a manner that each of the inner side openings is connected to the common inlet and each of the outer peripheral openings is connected to the common outlet.

A seventeenth aspect of the invention is the water electrolysis apparatus according to the third aspect, wherein a plurality of the water electrolysis portions are provided, and the plurality of the water electrolysis portions are arranged in such a manner that each of the inner side openings is connected to the common outlet and each of the outer peripheral openings is connected to the common inlet.

An eighteenth aspect of the invention is the water electrolysis apparatus according to the sixteenth aspect, wherein at least two of the plurality of the water electrolysis portions are arranged stacked on top of each other in the thickness direction, and the anode or the cathode of the at least two of the water electrolysis portions is composed of a common electrode.

A nineteenth aspect of the invention is the water electrolysis apparatus according to the seventeenth aspect, wherein at least two of the plurality of the water electrolysis portions are arranged stacked on top of each other in the thickness direction, and the anode or the cathode of the at least two of the water electrolysis portions is composed of a common electrode.

A twentieth aspect of the invention is the water electrolysis apparatus according to the sixteenth aspect, wherein n units of the water electrolysis portions are arranged stacked on top of each other in the thickness direction, the anode or the cathode of adjacent units of then units of the water electrolysis portions in the thickness direction is a common electrode, and the n units of the water electrolysis portions include n+1 electrodes.

A twenty-first aspect of the invention is the water electrolysis apparatus according to the seventeenth aspect, wherein n units of the water electrolysis portions are arranged stacked on top of each other in the thickness direction, the anode or the cathode of adjacent units of the n units of the water electrolysis portions in the thickness direction is a common electrode, and the n units of the water electrolysis portions include n+1 electrodes.

The twenty-second aspect of the invention is the water electrolysis apparatus according to the sixteenth aspect, wherein a housing is provided with the common inlet and the common outlet, the plurality of the water electrolysis portions are arranged in the housing, a gas-liquid mixing portion is interposed between the plurality of the water electrolysis portions and the common outlet in the housing, and the gas-liquid mixing portion includes: a gas-liquid mixing inlet portion that is connected to each of the outer peripheral openings of the plurality of the water electrolysis portions; and a gas-liquid mixing outlet portion that discharges a fluid that has been gas-liquid mixed and that is connected to the common outlet.

The twenty-third aspect of the invention is the water electrolysis apparatus according to the seventeenth aspect, wherein a housing is provided with the common inlet and the common outlet, the plurality of the water electrolysis portions are arranged in the housing, a gas-liquid mixing portion is interposed between the plurality of the water electrolysis portions and the common outlet in the housing, and the gas-liquid mixing portion includes: a gas-liquid mixing inlet portion that is connected to each of the inner side openings of the plurality of the water electrolysis portions; and a gas-liquid mixing outlet portion that discharges a fluid that has been gas-liquid mixed and that is connected to the common outlet.

A twenty-fourth aspect of the invention is the water electrolysis apparatus according to the sixteenth aspect, wherein a catalyst electrode containing boron-doped diamond is provided on the anode side of the plurality of the water electrolysis portions.

A twenty-fifth aspect of the invention is the water electrolysis apparatus according to the seventeenth aspect, wherein a catalyst electrode containing boron-doped diamond is provided on the anode side of the plurality of the water electrolysis portions.

A twenty-sixth aspect of the invention is a sterilization/cleaning method using the water electrolysis apparatus according to the twenty-fourth aspect, wherein contaminated water containing bacteria and/or viruses is supplied to the common inlet, and water with a reduced ATP (adenosine triphosphate) value flows out from the common outlet of the water electrolysis apparatus.

A twenty-seventh aspect of the invention is a sterilization/cleaning method using the water electrolysis apparatus according to the twenty-fifth aspect, wherein contaminated water containing bacteria and/or viruses is supplied to the common inlet, and water with a reduced ATP (adenosine triphosphate) value flows out from the common outlet of the water electrolysis apparatus.

A twenty-eighth aspect of the invention is a sterilization/cleaning method using the water electrolysis apparatus according to the twenty-fourth aspect, wherein the water electrolysis apparatus is used to generate advanced oxidation water in which ozone and hydrogen peroxide coexist as the electrolytic water, and the generated advanced oxidation water is mixed with contaminated water containing bacteria and/or viruses to reduce the ATP (adenosine triphosphate) value.

A twenty-ninth aspect of the invention is a sterilization/cleaning method using the water electrolysis apparatus according to the twenty-fifth aspect, wherein the water electrolysis apparatus is used to generate advanced oxidation water in which ozone and hydrogen peroxide coexist as the electrolytic water, and the generated advanced oxidation water is mixed with contaminated water containing bacteria and/or viruses to reduce the ATP (adenosine triphosphate) value.

A thirtieth aspect of the invention is a method of decomposing/removing harmful substances using the water electrolysis apparatus according to the twenty-fourth aspect, wherein contaminated water containing organic matter and/or ammonia and/or cyanide is supplied to the common inlet of the water electrolysis apparatus, and water in which organic matter and/or ammonia and/or cyanide have been decomposed/treated flows out from the common outlet of the water electrolysis apparatus.

A thirty-first aspect of the invention is a method of decomposing and removing harmful substances using the water electrolysis apparatus according to the twenty-fifth aspect, wherein contaminated water containing organic matter and/or ammonia and/or cyanide is supplied to the common inlet of the water electrolysis apparatus, and water in which organic matter and/or ammonia and/or cyanide have been decomposed/treated flows out from the common outlet of the water electrolysis apparatus.

The thirty-second aspect of the invention is a method of decomposing and removing harmful substances using the water electrolysis apparatus according to the twenty-fourth aspect, wherein the water electrolysis apparatus is used to generate advanced oxidation water in which ozone and hydrogen peroxide coexist as the electrolytic water, and the generated advanced oxidation water is mixed with contaminated water containing organic matter and/or ammonia and/or cyanide to decompose and remove the organic matter and/or ammonia and/or cyanide in the contaminated water.

The thirty-third aspect of the invention is a method of decomposing and removing harmful substances using the water electrolysis apparatus according to the twenty-fifth aspect, wherein the water electrolysis apparatus is used to generate advanced oxidation water in which ozone and hydrogen peroxide coexist as the electrolytic water, and the generated advanced oxidation water is mixed with contaminated water containing organic matter and/or ammonia and/or cyanide to decompose and remove the organic matter and/or ammonia and/or cyanide in the contaminated water.

Advantageous Effects of Invention

According to the first aspect to the fifth aspect of the invention, the cross-sectional area of water inflow can be increased compared to the case of using a square mesh electrode. As a result, the pressure loss of water passing through the water electrolysis apparatus is reduced, and a large flow rate of functional water can be generated despite the small size of the apparatus. Compared to the case of using a square mesh electrode, dead portions of fluid or gas accumulation are less likely to be generated, allowing water electrolysis to be performed efficiently with fewer pipes.

In particular, according to the second aspect or the third aspect, the number of pipes can be further reduced and space can be saved because the inlet and the outlet of water are shared between the anode side and the cathode side. Water can be saved by merging the anode side electrolytic water and the cathode side electrolytic water.

According to the sixth aspect or the seventh aspect of the invention, the cross-sectional area of water inflow can be increased compared to the case of using a stand-alone water electrolysis portion. As a result, the pressure loss of water passing through the water electrolysis apparatus is reduced, and a large flow rate of functional water can be generated despite the small size of the apparatus.

According to the eighth aspect and the ninth aspect of the invention, space can be saved compared to the case of connecting the water electrolysis portion and the gas-liquid mixing portion with piping.

According to the tenth aspect and the eleventh aspect of the invention, gas is dissolved in water with high efficiency. As a result, electrolytic water with high solubility can be generated.

According to the twelfth aspect of the invention, ozone and hydrogen peroxide can be generated at the anode side, and advanced oxidation water in which ozone and hydrogen peroxide coexist can be generated.

According to the thirteenth aspect of the invention, a catalyst electrode for generating advanced oxidation water can be produced inexpensively.

According to the fourteenth aspect of the invention, hydrogen peroxide can be generated on the cathode side, and functional water containing hydrogen peroxide can be generated.

According to the fifteenth method of the invention, the generation rate of hydroxide ions on the cathode side can be suppressed, and the increase in pH can be suppressed, thus inhibiting the electrodeposition of minerals on the cathode side.

According to the sixteenth aspect or the seventeenth aspect of the invention, the cross-sectional area of water inflow can be increased compared to the case of using a stand-alone water electrolysis portion. As a result, the pressure loss of water passing through the water electrolysis apparatus is reduced, and a large flow rate of functional water can be generated despite the small size of the apparatus. Compared to the case of using a stand-alone water electrolysis portion, the electrode area can be increased. As a result, the amount of ozone and hydrogen peroxide generated increases. As a result, advanced oxidation water with high concentration can be produced at a large flow rate. Since the inlet for supplying water to the water electrolysis portion and the outlet for discharging water from the water electrolysis portion are common, only one pipe each for the inlet and the outlet is needed. This reduces the number of pipes and saves space compared to the case where a plurality of water electrolysis apparatuses are arranged in parallel. Water can be saved because the anode side electrolytic water and the cathode side electrolytic water are merged for utilization.

According to the eighteenth aspect to the twenty-first aspect of the invention, since the anode or the cathode is used in common, the number of electrodes, terminals (electrode terminals), power cords, power supplies, and the like are reduced. As a result, the number of parts in the water electrolysis apparatus can be reduced and the size can be made smaller.

According to the twenty-second aspect or the twenty-third aspect of the invention, space can be saved compared to the case of connecting the water electrolysis portion and the gas-liquid mixing portion with piping. Gas is dissolved in water with high efficiency. As a result, electrolytic water with high solubility can be generated. This allows production of safe advanced oxidation water with high ozone solubility and no ozone gas generation.

According to the twenty-fourth aspect and the twenty-fifth aspect of the invention, ozone and hydrogen peroxide can be generated at the anode side, and advanced oxidation water in which ozone and hydrogen peroxide coexist can be generated.

According to the twenty-sixth aspect to the twenty-ninth aspect of the invention, contaminated water such as river water, well water, or the like can be sterilized and cleaned with a simple apparatus and method.

According to the thirtieth aspect to the thirty-third aspect of the invention, harmful substances in wastewater discharged from a factory or the like can be decomposed/treated with a simple apparatus and method.

BRIEF DESCRIPTION OF DRAWINGS

FIG. 9 is a diagram illustrating an example of the configuration of a water electrolysis apparatus of an eleventh embodiment, in which the water electrolysis portion and the gas-liquid mixing portion of the second embodiment are arranged in a housing, which is a sectional view from a side.

FIG. 36B is a side view of an electrode holding portion.

FIG. 44 is a diagram illustrating the results of a sterilization experiment in Example 8 as Table 1.

DESCRIPTION OF EMBODIMENTS

Hereinafter, one embodiment of the invention will be described with reference to the drawings.

First Embodiment

Figure 1:
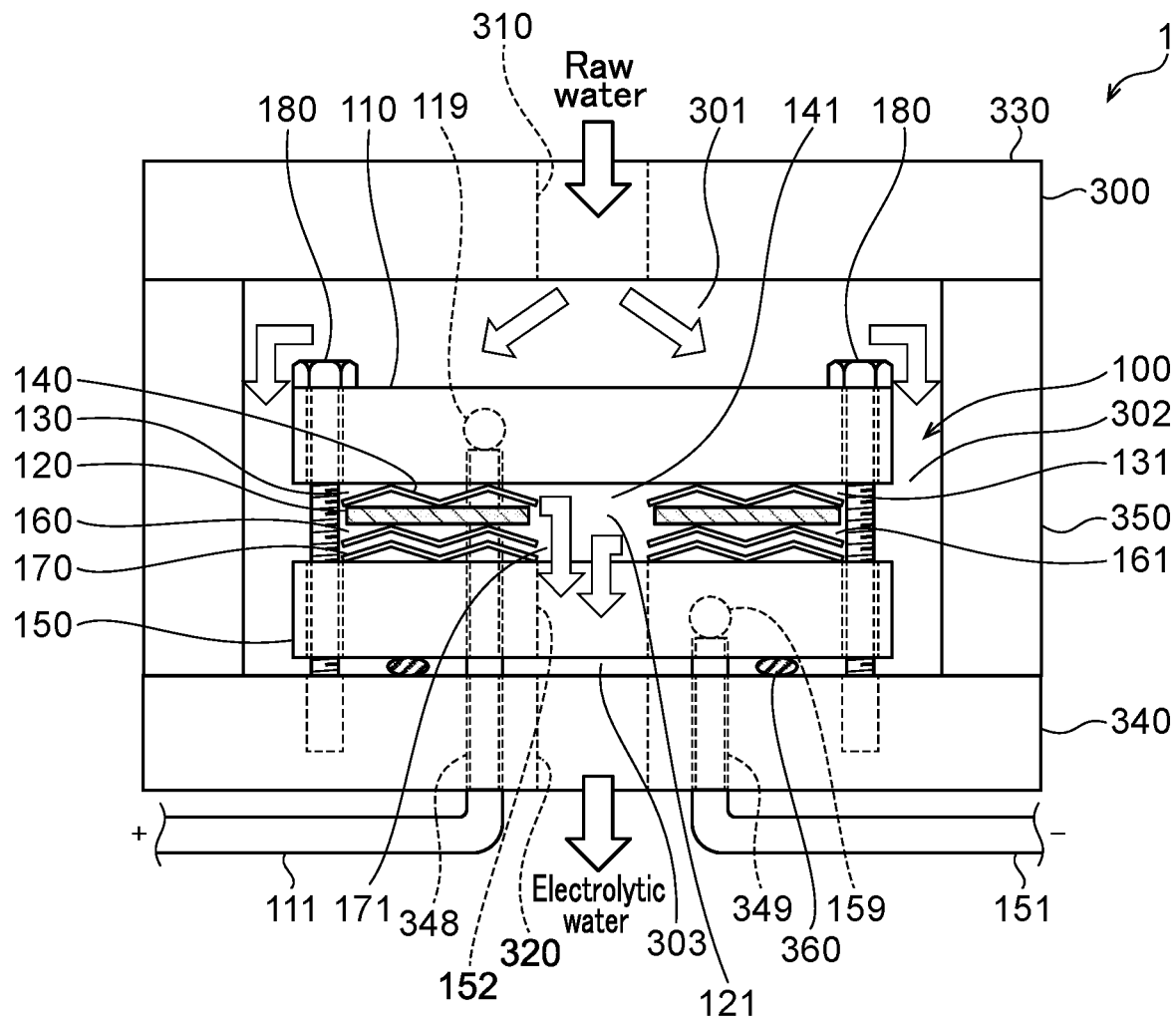
FIG. 1 is a sectional view from a side of the water electrolysis apparatus of a first embodiment.

FIG. 1 is a sectional view from a side of a water electrolysis apparatus 1 of a first embodiment.

The water electrolysis apparatus 1 is an apparatus that electrolyzes water such as tap water, pure water, or ion exchange water (soft water) to generate functional water as electrolytic water, such as ozonated water, hydrogen water, and advanced oxidation water in which ozone and hydrogen peroxide are mixed.

The water electrolysis apparatus 1 is composed of a housing 300 and a water electrolysis portion 100, as illustrated in FIG. 1. The housing 300 is formed in a cylinder shape. The water electrolysis portion 100 is formed in a circular column shape. The housing 300 is composed of a circular top plate 330 viewed from above in the figure, a circular bottom plate 340 viewed from below in the figure, and a cylindrical portion 350 between the top plate 330 and the bottom plate 340.

The water electrolysis portion 100 is arranged in the housing 300. In the housing 300, an inlet 310 and an outlet 320 are provided in such a manner to communicate with the outside of the housing 300 to the inside of the housing 300.

The inlet 310 is provided on the top plate 330 of the housing 300. The outlet 320 is provided on the bottom plate 340 of the housing 300. The inlet 310 is, for example, a through hole formed in the center of the top plate 330 of the housing 300. This through hole may be used as a screw hole, and an inlet piping joint including a threaded portion may be screwed therein. The outlet 320 is, for example, a through hole formed in the center of the bottom plate 340 of the housing 300. This through hole may be used as a screw hole, and an outlet piping joint including a threaded portion may be screwed therein. The inlet 310 and the outlet 320 are arranged in such a manner that the centers of the inlet 310 and the outlet 320 coincide or approximately coincide with the vertical central axis of the housing 300. The inlet 310 and the outlet 320 may be arranged in such a manner that the centers are offset from the vertical central axis of the housing 300.

Raw water flows in the inlet 310 from the outside. The water electrolysis portion 100 is interposed between the inlet 310 and the outlet 320. The electrolytic water generated in the water electrolysis portion 100 flows out from the outlet 320.

The water electrolysis portion 100 is composed of an anode 110, a polymer electrolyte membrane 120, an anode side electrolytic domain 130, an anode side mesh electrode 140, a cathode 150, a cathode side electrolytic domain 160, and a cathode side mesh electrode 170. The anode 110 may be held by being accommodated in an anode holding portion as described below in FIG. 7. Similarly, the cathode 150 may be held by being accommodated in a cathode holding portion.

The anode 110 is an anode side terminal plate as an anode side electrode plate electrically connected to the positive terminal of a direct current power supply, not illustrated, via a power cord 111 and an anode terminal 119.

The polymer electrolyte membrane 120 is provided in the thickness direction of the anode 110, and includes an inner side opening 121 that is connected to the outlet 320. For example, a solid polymer electrolyte membrane such as a Nafion membrane (for example, Nafion 117 membrane; Nafion is a registered trademark) is used as the polymer electrolyte membrane 120. A variety of solid polymer electrolyte membranes can be used as the polymer electrolyte membrane 120, not limited to Nafion membranes.

The anode side electrolytic domain 130 is formed between the anode 110 and the polymer electrolyte membrane 120, and an outer peripheral opening 131 is connected to the inlet 310.

The anode side mesh electrode 140 is provided in the anode side electrolytic domain 130, and includes an inner side opening 141 inside the anode side electrolytic domain 130, and this inner side opening 141 is connected to the inner side opening 121 of the polymer electrolyte membrane 120.

The cathode 150 is a cathode side terminal plate as a cathode side electrode plate electrically connected to the negative terminal of the above-described direct current power supply via a power cord 151 and a cathode terminal 159. The cathode 150 is provided in the thickness direction of the polymer electrolyte membrane 120. The cathode 150 includes an inner side opening 152 that is connected to the inner side opening 121 of the polymer electrolyte membrane 120.

The cathode side electrolytic domain 160 is formed between the polymer electrolyte membrane 120 and the cathode 150, and the outer peripheral opening 161 is connected to the inlet 310.

The cathode side mesh electrode 170 is provided in the cathode side electrolytic domain 160, and includes an inner side opening 171 inside this cathode side electrolytic domain 160, and this inner side opening 171 is connected to the inner side opening 121 of the polymer electrolyte membrane 120.

Electrode surfaces of the anode side mesh electrode 140 and the cathode side mesh electrode 170 are parallel to the surface of the polymer electrolyte membrane 120.

The anode 110, the anode side mesh electrode 140, the polymer electrolyte membrane 120, the cathode side mesh electrode 170, and the cathode 150 are formed in a circular shape or an approximately circular shape when viewed in a plane perpendicular to the thickness direction, in other words, when viewed from above in the figure. The inner side openings 141, 121, 171, and 152 of the anode side mesh electrode 140, the polymer electrolyte membrane 120, the cathode side mesh electrode 170, and the cathode 150 are formed in a circular shape or an approximately circular shape. The inner side openings 141, 121, 171, 152 are, for example, through holes formed in the center of the anode side mesh electrode 140, the polymer electrolyte membrane 120, the cathode side mesh electrode 170, and the cathode 150, respectively. The anode side mesh electrode 140, the polymer electrolyte membrane 120, the cathode side mesh electrode 170, and the cathode 150 are formed in an annular shape or an approximately annular shape when viewed in a plane perpendicular to the thickness direction, in other words, when viewed from above in the figure. The anode side mesh electrode 140, the polymer electrolyte membrane 120, the cathode side mesh electrode 170, and the cathode 150 are arranged in such a manner that the centers of the respective inner side openings 141, 121, 171, and 152 coincide or approximately coincide with the vertical central axis direction of the housing 300. The anode side mesh electrode 140, the polymer electrolyte membrane 120, the cathode side mesh electrode 170, and the cathode 150 may be arranged in such a manner that the centers of the respective inner side openings 141, 121, 171, and 152 are offset from the vertical central axis of the housing 300.

The anode side mesh electrode 140 can be composed of, for example, a single mesh electrode. The mesh electrode 140 is arranged in such a manner that the upper surface thereof is in contact with the anode 110 and the lower surface thereof is in contact with the polymer electrolyte membrane 120.

The cathode side mesh electrode 170 can, for example, be composed of two mesh electrodes. The mesh electrodes of the cathode side mesh electrode 170 are arranged in contact with each other in the thickness direction, with the upper surface of the upper mesh electrode in contact with the polymer electrolyte membrane 120 and the lower surface of the lower mesh electrode in contact with the cathode 150.

The number of mesh electrodes constituting the anode side mesh electrode 140 can be any number of one or more. Similarly, the number of mesh electrodes constituting the cathode side mesh electrode 170 can be any number of one or more.

The anode side mesh electrode 140 is sandwiched between the anode 110 and the polymer electrolyte membrane 120, the cathode side mesh electrode 170 is sandwiched between the polymer electrolyte membrane 120 and the cathode 150, and a threaded portion of a bolt 180 is screwed into screw holes formed in the anode 110, the cathode 150, and the bottom plate 340 of the housing 300. By screwing in the bolt 180 and fastening the bolt in the thickness direction, the water electrolysis portion 100 is fixed to the bottom plate 340 of the housing 300. As described below, the bolt 180 may be screwed into the anode holding portion and the cathode holding portion for fixing.

In the water electrolysis apparatus 1, a flow channel 301 as a gap is formed between the anode 110 and the top plate 330 of the housing 300. A flow channel 302 as a gap is formed between the anode 110 and the cathode 150 and the cylindrical portion 350 of the housing 300. A flow channel 303 is formed as a gap between the cathode 150 and the bottom plate 340 of the housing 300.

The flow channel 303 as a gap between the cathode 150 and the bottom plate 340 of the housing 300 is sealed by an O-ring 360. The O-ring 360 is arranged in such a manner that the inner side opening 152 of the cathode 150 is located above the inner side of the O-ring 360, and the outlet 320 is located below the inner side of the O-ring 360.

The materials of the anode side mesh electrode 140 and the cathode side mesh electrode 170 are selected according to the type of functional water that is to be generated. For example, a catalyst electrode with excellent water electrolysis activity is used as the anode side mesh electrode 140 and the cathode side mesh electrode 170. As these catalyst electrodes, for example, a metal such as Pt, Ni, or stainless steel, an oxide such as $PbO_2$, $SnO_2$ doped with Ni or Sb, $IrO_2$, $Nb_2O_5$, or $TaO_x$, or a carbon electrode such as activated carbon or boron-doped diamond (BDD) is used. The anode side mesh electrode 140 and the cathode side mesh electrode 170 may have a plain weave structure or a twill weave structure in which a plurality of strands are bundled together in order to promote dissolution of gas components in water. Expanded metal or the like without weaving may also be used. The anode side mesh electrode 140 and the cathode side mesh electrode 170 may have a structure that allows gases (gases) to dissolve efficiently in a liquid (water) when the liquid (water) passes through the mesh surface. For example, electrodes with a plate (flat) and mesh (net) shape, such as with plain weave or twill weave structure, can be used.

For example, when ozonated water is to be generated, a mesh of a metal such as platinum (Pt) or a metal oxide such as $PbO_2$ can be used as the anode side mesh electrode 140. Likewise, when oxygen water is to be generated, a mesh of a metal oxide such as $IrO_2$ can be used as the anode side mesh electrode 140. In particular, an $IrO_2$ mesh can safely produce oxygen water because the mesh produces almost no ozone gas, which is harmful to a human body. When generating advanced oxidation water in which ozone and hydrogen peroxide coexist, a mesh electrode on which boron-doped diamond (BDD) powder is supported or an electrode in which boron-doped diamond (BDD) is deposited on a perforated Nb substrate can be used as the anode side electrode. These boron-doped diamond (BDD) catalyst electrodes are placed with the surface of the boron-doped diamond (BDD) catalyst electrode in contact with the surface of the polymer electrolyte membrane 120.

The water electrolysis apparatus 1, configured as described above, operates as follows.

Raw water is supplied to the inlet 310 from a raw water source, for example, a storage tank not illustrated, or a water tap. A direct current power supply applies a voltage between the anode 110 and the cathode 150. As a result, current flows from the positive terminal of the direct current power supply through the power cord 111, the anode 110, the cathode 150, and the power cord 151 to the negative terminal of the direct current power supply, and water electrolysis is carried out in the anode side electrolytic domain 130 and the cathode side electrolytic domain 160 of the water electrolysis portion 100.

Figure 3A:
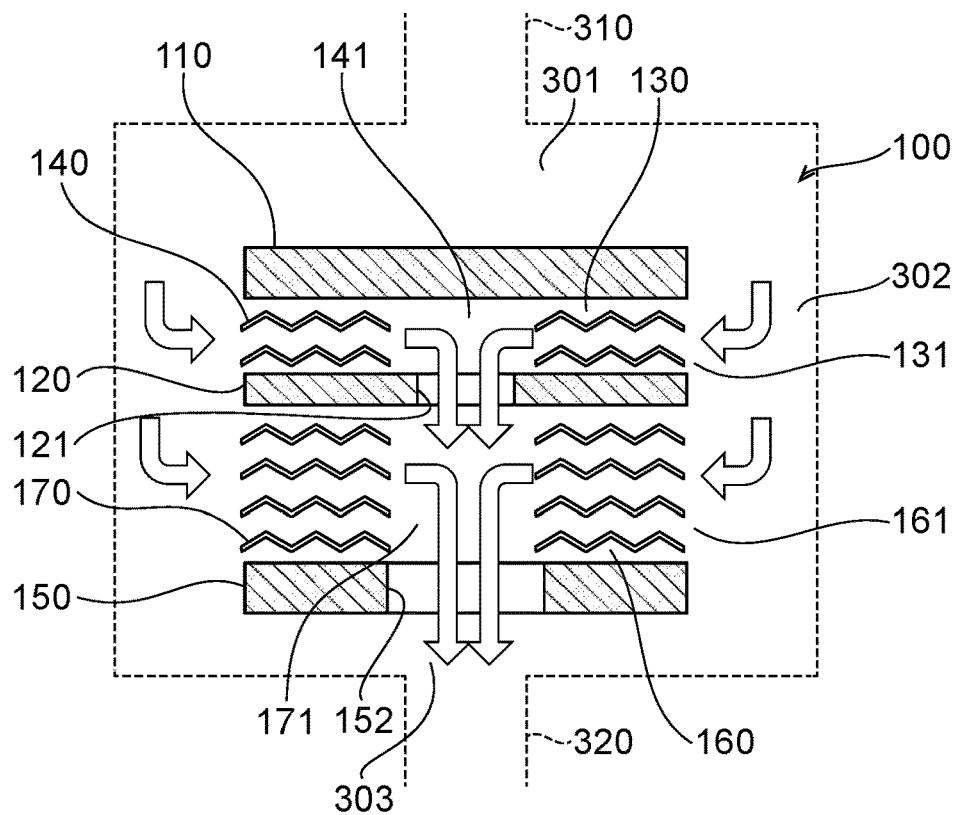
FIG. 3A illustrates flows of water in the water electrolysis portion of the first embodiment.

FIG. 3A is a diagram illustrating flows of water in the water electrolysis portion 100. Hereinafter, the description will be made together with FIG. 1.

The raw water that flows in the inlet 310 flows in the anode side electrolytic domain 130 via the flow channel 301, the flow channel 302, and the outer peripheral opening 131 of the anode side electrolytic domain 130.

Figure 2A:
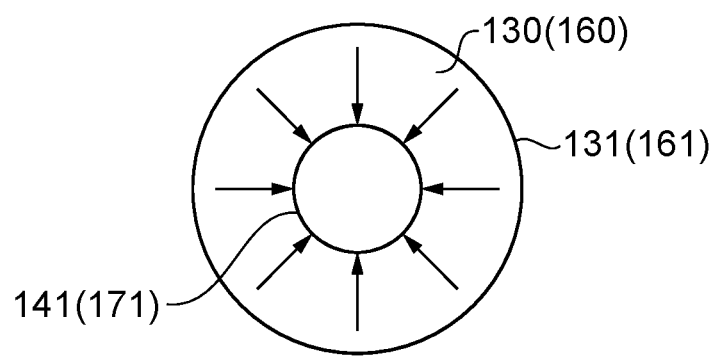
FIG. 2A is a diagram illustrating flows of water in an anode side electrolytic domain.

On the other hand, FIG. 2A is a diagram illustrating flows of water in the anode side electrolytic domain 130. Hereinafter, the description will be made with reference to FIG. 1 and FIG. 3A.

In the anode side electrolytic domain 130, a radial flow is formed from the outer peripheral opening 131 to the inner side opening 141 of the anode side mesh electrode 140. A flow horizontal to the electrode surface of the anode side mesh electrode 140 is formed.

Gases such as ozone and oxygen and hydrogen peroxide generated by water electrolysis in the anode side electrolytic domain 130 are dissolved in raw water in the anode side electrolytic domain 130, and anode side electrolytic water is generated. Gases such as ozone, oxygen, and hydrogen peroxide that have been atomized by the anode side mesh electrode 140 come into contact with the raw water, and high concentration anode side electrolytic water is generated. The anode side electrolytic water generated in the anode side electrolytic domain 130 flows in the inner side opening 141 of the anode side mesh electrode 140.

On the other hand, the raw water supplied to the inlet 310 flows in the cathode side electrolytic domain 160 via the flow channel 301, the channel 302, and the outer peripheral opening 161 of the cathode side electrolytic domain 160.

In the cathode side electrolytic domain 160, a radial flow is formed from the outer peripheral opening 161 to the inner side opening 171 of the cathode side mesh electrode 170. A flow horizontal to the electrode surface of the cathode side mesh electrode 170 is formed.

Hydrogen gas, hydrogen peroxide, and the like generated by water electrolysis in the cathode side electrolytic domain 160 are dissolved in the raw water in the cathode side electrolytic domain 160, and cathode side electrolytic water is generated. Hydrogen gas, hydrogen peroxide, and the like atomized by the cathode side mesh electrode 170 come into contact with the raw water, and high concentration cathode side electrolytic water is generated. The cathode side electrolytic water generated in the cathode side electrolytic domain 160 flows in the inner side opening 171 of the cathode side mesh electrode 170.

The anode side electrolytic water that flows in the inner side opening 141 of the anode side mesh electrode 140 merges with the cathode side electrolytic water that flows in the inner side opening 171 of the cathode side mesh electrode 170 via the inner side opening 121 of the polymer electrolyte membrane 120. The merged electrolytic water flows out to the outside via the inner side opening 152 of the cathode 150, the flow channel 303, and the outlet 320.

Figure 2B:
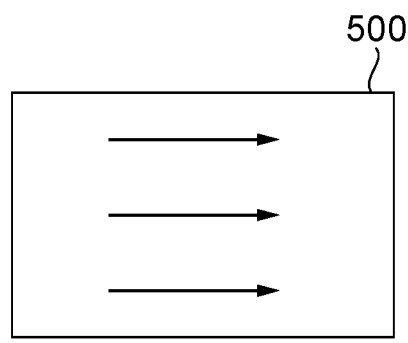
FIG. 2B is a diagram illustrating flows of water when a water electrolysis portion is configured using a conventional square mesh electrode.

FIG. 2B is a diagram illustrating flows of water when a water electrolysis portion is configured using a conventional square mesh electrode 500.

The electrode area of the mesh electrode 500 is set to 8 $cm^2$, the width of a water inlet is set to 2 cm, and the depth in the water flow direction is set to 4 cm. In this case, the cross-sectional area of water inflow is "2 cm×thickness of mesh electrode."

In contrast, as illustrated in FIG. 2A, in the first embodiment, when the anode side mesh electrode 140 with an electrode area of 8 $cm^2$, which is the same as that of the square mesh electrode 500, is used and the diameter of the inner side opening 141 is set to 1 cm, the cross-sectional area of water inflow is "3.14 cm×thickness of the mesh electrode" or more. As the water inflow cross-sectional area increases from the inside of the anode side mesh electrode 140 to the outside, the resistance to water flow decreases. Therefore, compared to the square mesh electrode 500, the water inflow cross-sectional area is larger even though the electrode area is the same, and a water electrolysis portion with less pressure loss can be constructed, allowing a large amount of water to flow. The same applies to the cathode side mesh electrode 170.

As described above, according to the first embodiment, a flow is formed in the radial direction between the outer periphery of the mesh electrode and the inner side opening. As a result, the cross-sectional area of water inflow can be larger than that of a conventional square mesh electrode. As a result, the pressure loss of water passing through the water electrolysis apparatus is reduced, and a large flow rate of functional water can be generated despite the small size of the apparatus. Dead portions of fluid and gas accumulation are less likely to occur. As a result, water electrolysis can be carried out more efficiently with fewer pipes than when using a conventional square mesh electrode.

In the case of the first embodiment, an inlet and an outlet of water are shared on the anode side and the cathode side, and there are only one inlet 310 and one outlet 320, and an inlet pipe and an outlet pipe of water can be made one each side. As a result, the number of pipes can be further reduced and space can be saved. As the anode side electrolytic water and the cathode side electrolytic water can be merged for utilization, water can be saved.

In the above, a configuration example in which the shape of the anode side mesh electrode 140, the polymer electrolyte membrane 120, and the cathode side mesh electrode 170 is an annular shape or an approximately annular shape has been described.

However, the shape of the anode side mesh electrode 140, the polymer electrolyte membrane 120, and the cathode side mesh electrode 170 may be any shape. For example, the shapes of the outer peripheral and the inner side opening of the anode side mesh electrode 140, the polymer electrolyte membrane 120, and the cathode side mesh electrode 170 may be square, triangular, or oval. The shape of the housing 300 is also not limited to a cylindrical shape, and may be a square, triangle, ellipse, or the like.

The water electrolysis apparatus 1 illustrated in FIG. 1 has a structure in which water flows from top to bottom in the figure.

However, the structure may be a structure in which water flows from the bottom of the figure to the inner side opening 171 of the cathode side mesh electrode 170, the inner side opening 121 of the polymer electrolyte membrane 120, and the inner side opening 141 of the anode side mesh electrode 140. In this case, electrolytic water flows outward from the outer peripheral opening 131 of the anode side electrolytic domain 130 and the outer peripheral opening 161 of the cathode side electrolytic domain 160, and the water flows upward in the figure. This embodiment will be described below in a second embodiment.

Second Embodiment

In the first embodiment, as illustrated in FIG. 3A, the configuration in which flows are formed in the radial direction from the outer periphery of the mesh electrode toward the inner side opening has been described.

Figure 3B:
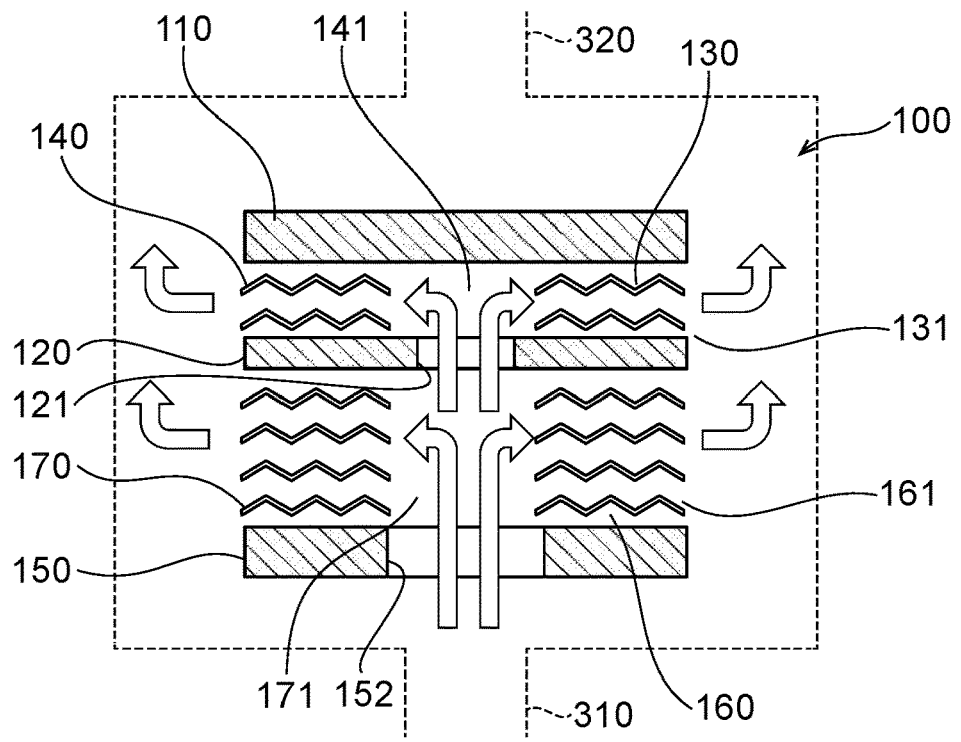
FIG. 3B illustrates flows of water in the water electrolysis portion of a second embodiment.

However, as illustrated in FIG. 3B, a configuration in which flows are formed in the radial direction from the inner side opening of the mesh electrode to the outer periphery can also be employed.

FIG. 3B is a diagram illustrating water flow in the water electrolysis portion 100 of the second embodiment. Hereinafter, the same symbol is assigned to a component that is similar to a component illustrated in FIG. 1, and a configuration that differs from the first embodiment will be described.

In the second embodiment, the inlet 310 is connected to the inner side opening 171 of the cathode side mesh electrode 170, the inner side opening 121 of the polymer electrolyte membrane 120, and the inner side opening 141 of the anode side mesh electrode 140 via the inner side opening 152 of the cathode 150. The outer peripheral opening 131 of the anode side electrolytic domain 130 and the outer peripheral opening 161 of the cathode side electrolytic domain 160 communicate with the outlet 320.

Therefore, raw water that has flowed in the inlet 310 flows in the cathode side electrolytic domain 160 via the inner side opening 152 of the cathode 150 and the inner side opening 171 of the cathode side mesh electrode 170. Raw water flows in the anode side electrolytic domain 130 via the inner side opening 171 of the cathode side mesh electrode 170, the inner side opening 121 of the polymer electrolyte membrane 120, and the inner side opening 141 of the anode side mesh electrode 140.

In the cathode side electrolytic domain 160, flows are formed in the radial direction from the inner side opening 171 of the cathode side mesh electrode 170 to the outer peripheral opening 161. Flows horizontal to the electrode surface of the cathode side mesh electrode 170 are formed.

Hydrogen gas, hydrogen peroxide, and the like generated by water electrolysis in the cathode side electrolytic domain 160 are dissolved in raw water in the cathode side electrolytic domain 160, and cathode side electrolytic water is generated. Hydrogen gas, hydrogen peroxide, and the like atomized by the cathode side mesh electrode 170 come into contact with raw water, and high concentration cathode side electrolytic water is generated. The cathode side electrolytic water generated in the cathode side electrolytic domain 160 flows out outward from the outer peripheral opening 161 of the cathode side electrolytic domain 160.

On the other hand, in the anode side electrolytic domain 130, flows are formed in the radial direction from the inner side opening 141 of the anode side mesh electrode 140 to the outer peripheral opening 131. Flows horizontal to the electrode surface of the anode side mesh electrode 140 are formed.

Gases such as ozone and oxygen and hydrogen peroxide generated by water electrolysis in the anode side electrolytic domain 130 are dissolved in raw water in the anode side electrolytic domain 130, and anode side electrolytic water is generated. Gases such as ozone and oxygen, and hydrogen peroxide atomized by the anode side mesh electrode 140 come into contact with raw water, and high concentration anode side electrolytic water is generated. The anode side electrolytic water generated in the anode side electrolytic domain 130 flows out outward from the outer peripheral opening 131 of the anode side electrolytic domain 130.

The anode side electrolytic water flowed out outward from the outer peripheral opening 131 of the anode side electrolytic domain 130 merges with the cathode side electrolytic water flowed out outward from the outer peripheral opening 161 of the cathode side electrolytic domain 160. The merged electrolytic water flows out to the outside via the outlet 320.

According to the second embodiment, as in the first embodiment, since flows are formed in the radial direction between the outer periphery of the mesh electrode and the inner side opening, the pressure loss of water passing through the water electrolysis apparatus is reduced, and a large flow rate of functional water can be generated despite the small size of the apparatus. Dead portions of fluid and gas accumulation are less likely to occur. As a result, water electrolysis can be carried out more efficiently with fewer pipes than when using a conventional square mesh electrode. Since the inlet and the outlet of water are shared on the anode side and on the cathode side, the number of pipes can be further reduced and space can be saved. Since anode side electrolytic water and cathode side electrolytic water can be merged for utilization, water can be saved.

Third Embodiment

In the first embodiment and the second embodiment, a configuration in which the inlet and the outlet of water are shared on the anode side and on the cathode side has been described.

However, an implementation of a two-chamber type water electrolysis portion in which the inlet and the outlet of water are provided separately on the anode side and on the cathode side, and anode side electrolytic water and cathode side electrolytic water are generated in separate chambers without merging is also possible. In this case, the chamber on the anode side and the chamber on the cathode side are separated by the polymer electrolyte membrane 120.

Figure 4A:
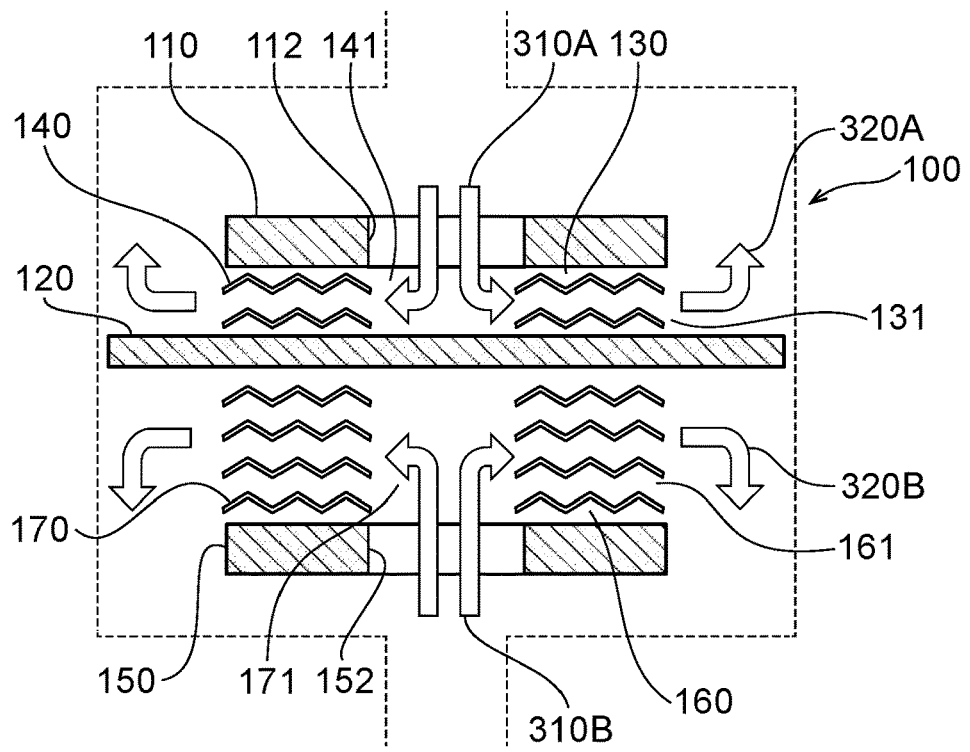
FIG. 4A illustrates flows of water in the water electrolysis portion of a third embodiment.

FIG. 4A is a diagram illustrating water flow in the water electrolysis portion 100 of the third embodiment. Hereinafter, the same symbol is assigned to a component that is similar to a component illustrated in FIG. 1, and a configuration that differs from the first embodiment will be described.

In the third embodiment, a first inlet 310A and a second inlet 310B are provided, and a first outlet 320A and a second outlet 320B are provided.

The first inlet 310A is connected to the inner side opening 141 of the anode side mesh electrode 140 via the inner side opening 112 of the anode 110. The second inlet 310B is connected to the inner side opening 171 of the cathode side mesh electrode 170 via the inner side opening 152 of the cathode 150.

The outer peripheral opening 131 of the anode side electrolytic domain 130 is connected to the first outlet 320A. The outer peripheral opening 161 of the cathode side electrolytic domain 160 is connected to the second outlet 320B.

Therefore, raw water that has flowed in the first inlet 310A flows in the anode side electrolytic domain 130 via the inner side opening 141 of the anode side mesh electrode 140. The raw water that has flowed in the second inlet 310B flows in the cathode side electrolytic domain 160 via the inner side opening 152 of the cathode 150 and the inner side opening 171 of the cathode side mesh electrode 170.

In the anode side electrolytic domain 130, flows are formed in the radial direction from the inner side opening 141 of the anode side mesh electrode 140 to the outer peripheral opening 131. Flows horizontal to the electrode surface of the anode side mesh electrode 140 are formed.

Gases such as ozone and oxygen, and hydrogen peroxide generated by water electrolysis in the anode side electrolytic domain 130 are dissolved in raw water in the anode side electrolytic domain 130, and anode side electrolytic water is generated. Gases such as ozone and oxygen, and hydrogen peroxide atomized by the anode side mesh electrode 140 come into contact with raw water, and high concentration anode side electrolytic water is generated. Anode side electrolytic water generated in the anode side electrolytic domain 130 flows out outward from the outer peripheral opening 131 of the anode side electrolytic domain 130. The anode side electrolytic water flowed out outward from the outer peripheral opening 131 of the anode side electrolytic domain 130 flows out via the first outlet 320A.

On the other hand, in the cathode side electrolytic domain 160, flows are formed in the radial direction from the inner side opening 171 of the cathode side mesh electrode 170 to the outer peripheral opening 161. Flows horizontal to the electrode surface of the cathode side mesh electrode 170 are formed.

Hydrogen gas, hydrogen peroxide, and the like generated by water electrolysis in the cathode side electrolytic domain 160 are dissolved in raw water in the cathode side electrolytic domain 160, and cathode side electrolytic water is generated. Hydrogen gas, hydrogen peroxide, and the like atomized by the cathode side mesh electrode 170 come into contact with raw water, and high concentration cathode side electrolytic water is generated. The cathode side electrolytic water generated in the cathode side electrolytic domain 160 flows out outward from the outer peripheral opening 161 of the cathode side electrolytic domain 160. The cathode side electrolytic water flowed out outward from the outer peripheral opening 161 of the cathode side electrolytic domain 160 flows out to the outside via the second outlet 320B.

According to the third embodiment, as in the first embodiment and the second embodiment, since flows are formed in the radial direction between the outer periphery of the mesh electrode and the inner side opening, the pressure loss of water passing through the water electrolysis apparatus is reduced, and a large flow rate of functional water can be generated despite the small size of the apparatus. Since dead portions of fluid and gas accumulation are difficult to occur, water electrolysis can be carried out more efficiently with fewer pipes than when using a conventional square mesh electrode. Since anode side electrolytic water and cathode side electrolytic water are generated separately without merging, functional water such as high concentration ozonated water and hydrogen water can be generated compared to cases in which anode electrolytic water and cathode electrolytic water are merged.

Fourth Embodiment

As in the third embodiment, a fourth embodiment is an embodiment of a two-chamber type water electrolysis portion in which the inlet and the outlet of water are separately provided on the anode side and the cathode side, and electrolytic water on the anode side and on the cathode side are separately generated without merging. In the third embodiment, as illustrated in FIG. 4A, the configuration in which flows are formed in the radial direction from the inner side opening of the mesh electrode to the outer periphery has been described.

Figure 4B:
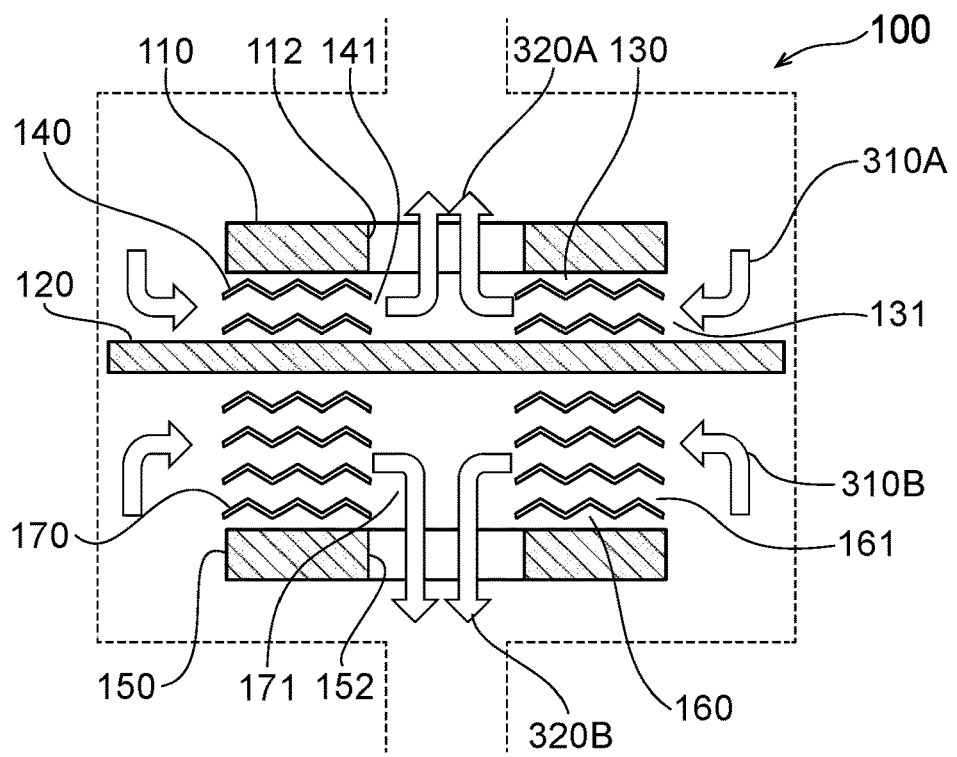
FIG. 4B illustrates flows of water in the water electrolysis portion of a fourth embodiment.

However, as illustrated in FIG. 4B, an implementation of a configuration in which flows are formed in the radial direction from the periphery of the mesh electrode to the inner side opening is also possible.

FIG. 4B is a diagram illustrating water flow in the water electrolysis portion 100 of the fourth embodiment. Hereinafter, the same symbol is assigned to a component that is similar to a component illustrated in FIG. 1, and a configuration that differs from the first embodiment will be described.

In the fourth embodiment, a first inlet 310A and a second inlet 310B are provided, and a first outlet 320A and a second outlet 320B are provided.

The first inlet 310A is connected to the outer peripheral opening 131 of the anode side electrolytic domain 130. The second inlet 310B is connected to the outer peripheral opening 161 of the cathode side electrolytic domain 160.

The first outlet 320A is connected to the inner side opening 141 of the anode side mesh electrode 140 via the inner side opening 112 of the anode 110. The second outlet 320B is connected to the inner side opening 171 of the cathode side mesh electrode 170 via the inner side opening 152 of the cathode 150.

Therefore, raw water flowed in the first inlet 310A flows in the anode side electrolytic domain 130 via the outer peripheral opening 131 of the anode side electrolytic domain 130.

In the anode side electrolytic domain 130, a radial flow is formed from the outer peripheral opening 131 to the inner side opening 141 of the anode side mesh electrode 140. A flow horizontal to the electrode surface of the anode side mesh electrode 140 is formed.

Gases such as ozone and oxygen and hydrogen peroxide generated by water electrolysis in the anode side electrolytic domain 130 are dissolved in raw water in the anode side electrolytic domain 130, and anode side electrolytic water is generated. Gases such as ozone, oxygen, and hydrogen peroxide that have been atomized by the anode side mesh electrode 140 come into contact with the raw water, and high concentration anode side electrolytic water is generated. The anode side electrolytic water generated in the anode side electrolytic domain 130 flows out to the outside via the inner side opening 141 of the anode side mesh electrode 140, the inner side opening 112 of the anode 110, and the first outlet 320A.

On the other hand, raw water flowed in the second inlet 310B flows in the cathode side electrolytic domain 160 via the outer peripheral opening 161 of the cathode side electrolytic domain 160.

In the cathode side electrolytic domain 160, a radial flow is formed from the outer peripheral opening 161 to the inner side opening 171 of the cathode side mesh electrode 170. A flow horizontal to the electrode surface of the cathode side mesh electrode 170 is formed.

Hydrogen gas, hydrogen peroxide, and the like generated by water electrolysis in the cathode side electrolytic domain 160 are dissolved in the raw water in the cathode side electrolytic domain 160, and cathode side electrolytic water is generated. Hydrogen gas, hydrogen peroxide, and the like atomized by the cathode side mesh electrode 170 come into contact with the raw water, and high concentration cathode side electrolytic water is generated. The cathode side electrolytic water generated in the cathode side electrolytic domain 160 flows out to the outside via the inner side opening 171 of the cathode side mesh electrode 170, the inner side opening 152 of the cathode 150, and the second outlet 320B.

According to the fourth embodiment, as in the first embodiment, the second embodiment, and the third embodiment, since flows are formed in the radial direction between the outer periphery of the mesh electrode and the inner side opening, the pressure loss of water passing through the water electrolysis apparatus is reduced, and a large flow rate of functional water can be generated despite the small size of the apparatus. Since dead portions of fluid and gas accumulation are difficult to occur, water electrolysis can be carried out more efficiently with fewer pipes than when using a conventional square mesh electrode. Since anode side electrolytic water and cathode side electrolytic water are generated separately without merging, functional water such as high concentration ozonated water and hydrogen water can be generated compared to cases in which anode electrolytic water and cathode electrolytic water are merged.

Fifth Embodiment

As in the third embodiment and the fourth embodiment, a fifth embodiment is an embodiment using a two-chamber type water electrolysis portion in which the inlet and the outlet of water are provided separately on the anode side and the cathode side, and anode side electrolytic water and cathode side electrolytic water are generated separately without merging.

Figure 5A:
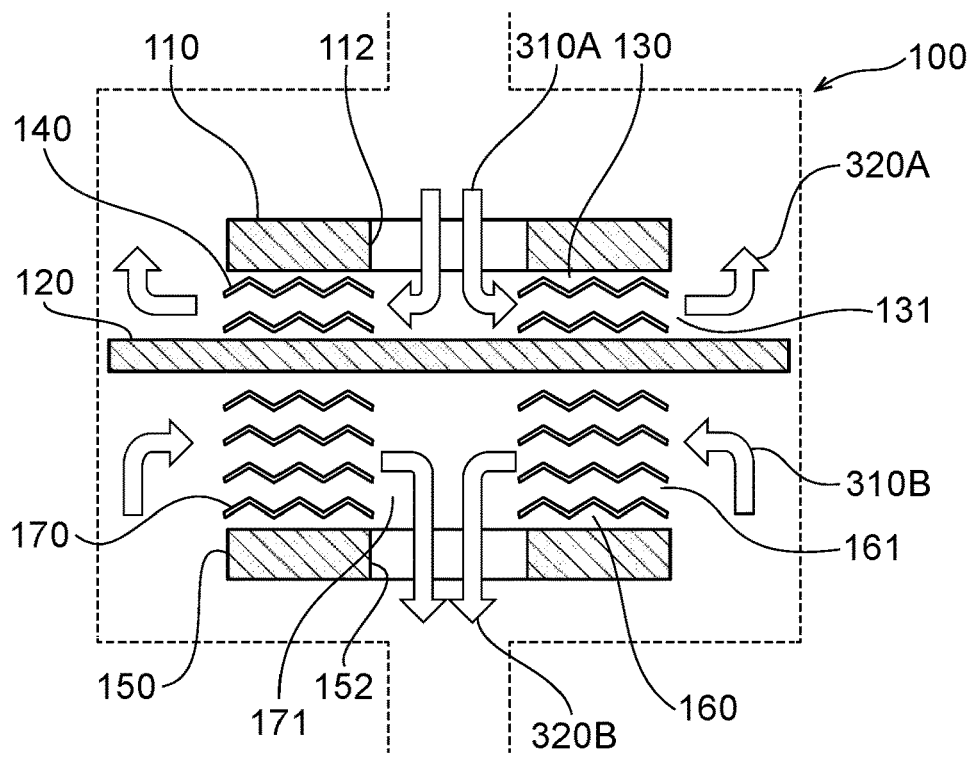
FIG. 5A illustrates flows of water in the water electrolysis portion of a fifth embodiment.

As illustrated in FIG. 5A, in the fifth embodiment, the anode side is configured in the same way as in the third embodiment, and flows are formed in the radial direction from the inner side opening of the mesh electrode to the outer periphery. On the other hand, the cathode side is configured in the same way as in the fourth embodiment, and flows are formed in the radial direction from the outer periphery of the mesh electrode toward the inner side opening.

Therefore, raw water flowed in the first inlet 310A flows in the anode side electrolytic domain 130 via the inner side opening 141 of the anode side mesh electrode 140.

In the anode side electrolytic domain 130, flows are formed in the radial direction from the inner side opening 141 of the anode side mesh electrode 140 to the outer peripheral opening 131. Flows horizontal to the electrode surface of the anode side mesh electrode 140 are formed.

Gases such as ozone and oxygen and hydrogen peroxide generated by water electrolysis in the anode side electrolytic domain 130 are dissolved in raw water in the anode side electrolytic domain 130, and anode side electrolytic water is generated. Gases such as ozone, oxygen, and hydrogen peroxide that have been atomized by the anode side mesh electrode 140 come into contact with the raw water, and high concentration anode side electrolytic water is generated.

The anode side electrolytic water generated in the anode side electrolytic domain 130 flows out outward from the outer peripheral opening 131 of the anode side electrolytic domain 130. The anode side electrolytic water flowed out outward from the outer peripheral opening 131 of the anodic side electrolytic domain 130 flows out to the outside via the first outlet 320A.

On the other hand, raw water flowed in the second inlet 310B flows in the cathode side electrolytic domain 160 via the outer peripheral opening 161 of the cathode side electrolytic domain 160.

In the cathode side electrolytic domain 160, a radial flow is formed from the outer peripheral opening 161 to the inner side opening 171 of the cathode side mesh electrode 170. A flow horizontal to the electrode surface of the cathode side mesh electrode 170 is formed.

Hydrogen gas, hydrogen peroxide, and the like generated by water electrolysis in the cathode side electrolytic domain 160 are dissolved in the raw water in the cathode side electrolytic domain 160, and cathode side electrolytic water is generated. Hydrogen gas, hydrogen peroxide, and the like atomized by the cathode side mesh electrode 170 come into contact with the raw water, and high concentration cathode side electrolytic water is generated. The cathode side electrolytic water generated in the cathode side electrolytic domain 160 flows out to the outside via the inner side opening 171 of the cathode side mesh electrode 170, the inner side opening 152 of the cathode 150, and the second outlet 320B.

According to the fifth embodiment, as in the first embodiment, the second embodiment, the third embodiment, and the fourth embodiment, since flows are formed in the radial direction between the outer periphery of the mesh electrode and the inner side opening, the pressure loss of water passing through the water electrolysis apparatus is reduced, and a large flow rate of functional water can be generated despite the small size of the apparatus. Since dead portions of fluid and gas accumulation are difficult to occur, water electrolysis can be carried out more efficiently with fewer pipes than when using a conventional square mesh electrode. Since anode side electrolytic water and cathode side electrolytic water are generated separately without merging, functional water such as high concentration ozonated water and hydrogen water can be generated compared to cases in which anode electrolytic water and cathode electrolytic water are merged.

Sixth Embodiment

As in the third embodiment, the fourth embodiment, and the fifth embodiment, a sixth embodiment is an embodiment using a two-chamber type water electrolysis portion in which the inlet and the outlet of water are provided separately on the anode side and the cathode side, and anode side electrolytic water and cathode side electrolytic water are generated separately without merging.

Figure 5B:
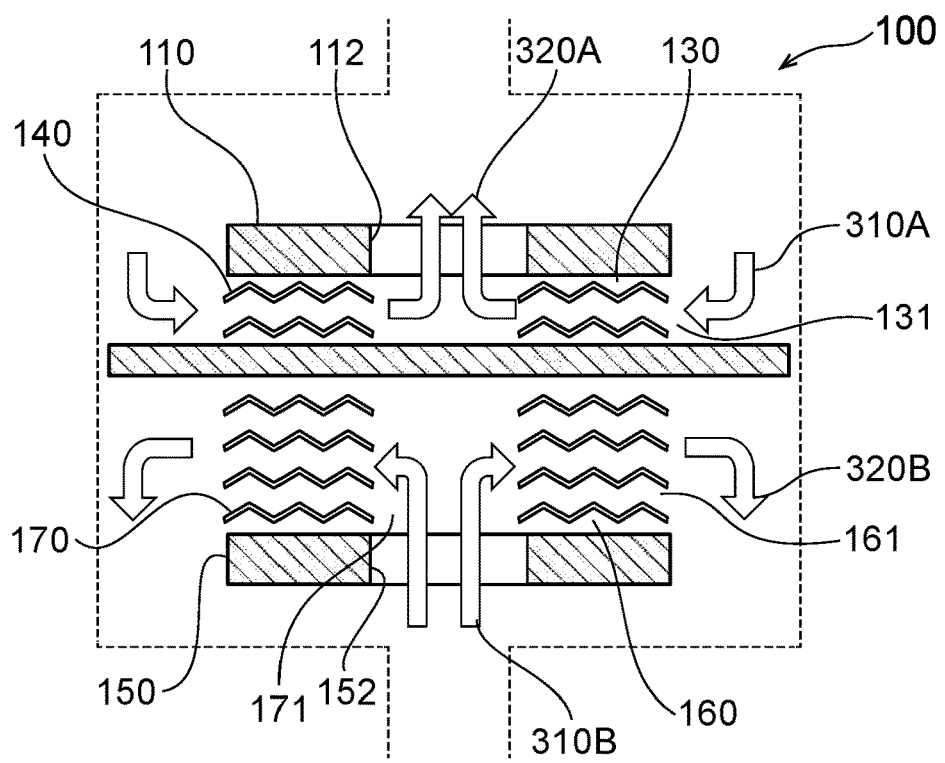
FIG. 5B illustrates flows of water in the water electrolysis portion of a sixth embodiment.

In the sixth embodiment, as illustrated in FIG. 5B, the anode side is configured in the same manner as in the fourth embodiment, and flows are formed in the radial direction from the outer periphery of the mesh electrode toward the inner side opening. On the other hand, the cathode side is configured in the same manner as in the third embodiment, and flows are formed in the radial direction from the inner side opening of the mesh electrode toward the outer periphery.

Accordingly, raw water flowed in the first inlet 310A flows in the anode side electrolytic domain 130 via the outer peripheral opening 131 of the anode side electrolytic domain 130.

In the anode side electrolytic domain 130, flows are formed in the radial direction from the outer peripheral opening 131 to the inner side opening 141 of the anode side mesh electrode 140. Flows horizontal to the electrode surface of the anode side mesh electrode 140 are formed.

Gases such as ozone and oxygen and hydrogen peroxide generated by water electrolysis in the anode side electrolytic domain 130 are dissolved in raw water in the anode side electrolytic domain 130, and anode side electrolytic water is generated. Gases such as ozone, oxygen, and hydrogen peroxide that have been atomized by the anode side mesh electrode 140 come into contact with the raw water, and high concentration anode side electrolytic water is generated. The anode side electrolytic water generated in the anode side electrolytic domain 130 flows out to the outside via the inner side opening 141 of the anode side mesh electrode 140, the inner side opening 112 of the anode 110, and the first outlet 320A.

On the other hand, raw water flowed in the second inlet 310B flows in the cathode side electrolytic domain 160 via the inner side opening 152 of the cathode 150 and the inner side opening 171 of the cathode side mesh electrode 170.

In the cathode side electrolytic domain 160, a radial flow is formed from the inner side opening 171 of the cathode side mesh electrode 170 to the outer peripheral opening 161. A flow horizontal to the electrode surface of the cathode side mesh electrode 170 is formed.

Hydrogen gas, hydrogen peroxide, and the like generated by water electrolysis in the cathode side electrolytic domain 160 are dissolved in the raw water in the cathode side electrolytic domain 160, and cathode side electrolytic water is generated. Hydrogen gas, hydrogen peroxide, and the like atomized by the cathode side mesh electrode 170 come into contact with the raw water, and high concentration cathode side electrolytic water is generated. The cathode side electrolytic water generated in the cathode side electrolytic domain 160 flows out from the outer peripheral opening 161 of the cathode side electrolytic domain 160. The cathode side electrolytic water flowed out outward from the outer peripheral opening 161 of the cathode side electrolytic domain 160 flows out to the outside via the second outlet 320B.

According to the sixth embodiment, as in the first embodiment, the second embodiment, the third embodiment, the fourth embodiment, and the fifth embodiment, since flows are formed in the radial direction between the outer periphery of the mesh electrode and the inner side opening, the pressure loss of water passing through the water electrolysis apparatus is reduced, and a large flow rate of functional water can be generated despite the small size of the apparatus. Since dead portions of fluid and gas accumulation are difficult to occur, water electrolysis can be carried out more efficiently with fewer pipes than when using a conventional square mesh electrode. Since anode side electrolytic water and cathode side electrolytic water are generated separately without merging, functional water such as high concentration ozonated water and hydrogen water can be generated compared to cases in which anode electrolytic water and cathode electrolytic water are merged.

Seventh Embodiment

Figure 6:
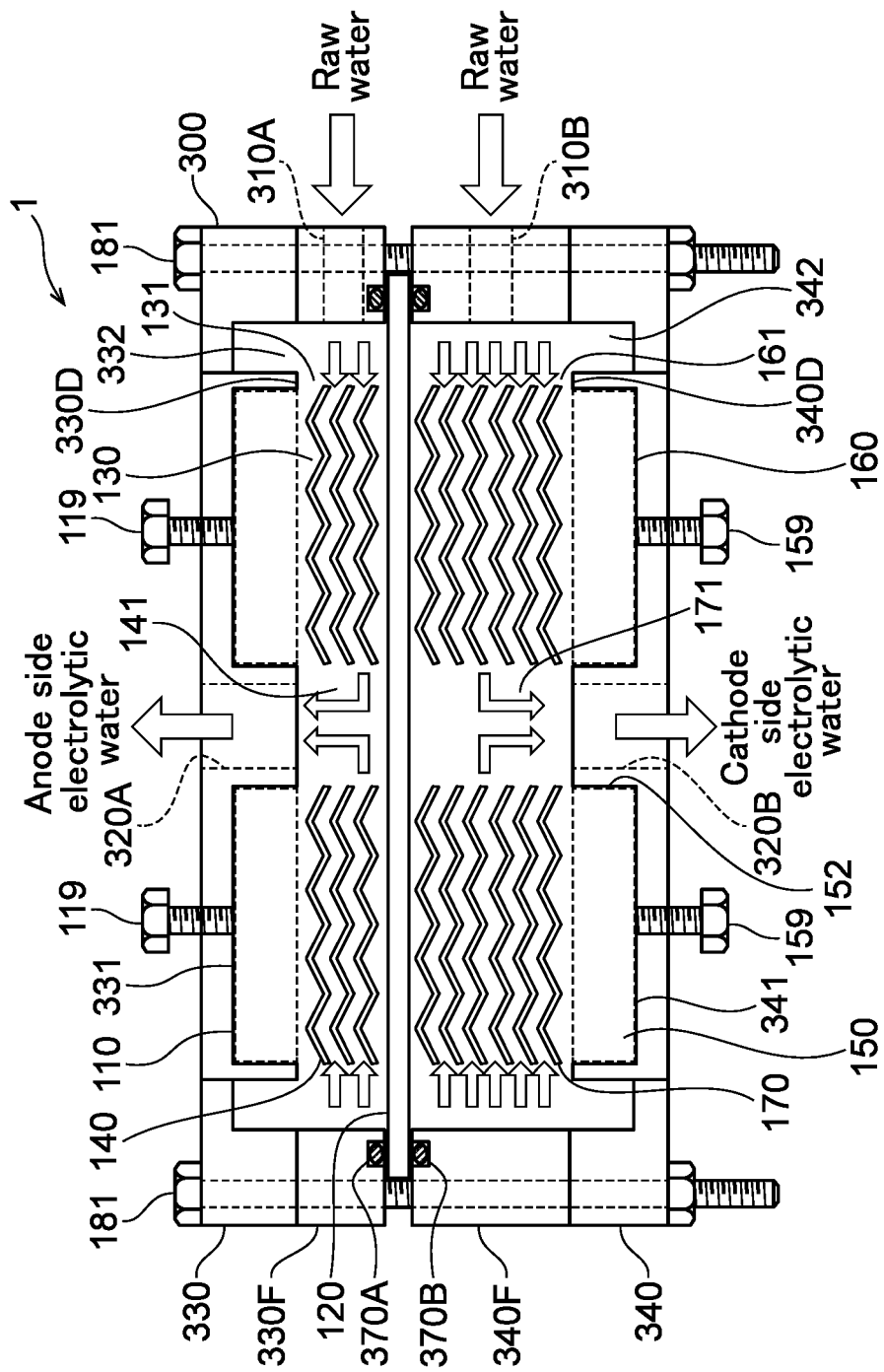
FIG. 6 is a diagram illustrating flows of water in a seventh water electrolysis portion.

FIG. 6 illustrates the configuration example of the fourth embodiment illustrated in FIG. 4B as a seventh embodiment.

Hereinafter, the same symbol is assigned to a component that is similar to a component illustrated in FIG. 1 and FIG. 4B, and a different configuration will be described.

The housing 300 of the water electrolysis apparatus 1 of the seventh embodiment is composed of an anode side flange 330 as the top plate and a cathode side flange 340 as the bottom plate.

A flange convex portion 330F facing a flange convex portion 340F of the cathode side flange 340 is formed on the outer periphery of the anode side flange 330. On the facing surface of the flange convex portion 330F, an annular groove is formed to accommodate an O-ring 370A that contacts the outer periphery of the polymer electrolyte membrane 120. A first inlet 310A is formed on a side wall of the flange convex portion 330F. On the inner side of the flange convex portion 330F, an annular groove recess 332 is formed that is connected to the first inlet 310A. Inside the groove recess 332, a convex portion 330D that contacts the anode side mesh electrode 140 is formed. In the convex portion 330D, an annular recess 331 is formed to accommodate the annular anode 110. At the center of the convex portion 330D and at the inner center of the recess 331, a first outlet 320A is formed.

On the other hand, the flange convex portion 340F is formed on the outer periphery of the cathode side flange 340 to face the flange convex portion 330F of the anode side flange 330. On the facing surface of the flange convex portion 340F, an annular groove is formed to accommodate an O-ring 370B that contacts the outer periphery of the polymer electrolyte membrane 120. A second inlet 310B is formed on a side wall of the flange convex portion 340F. On the inner side of the flange convex portion 340F, an annular groove recess 342 is formed that is connected to the second inlet 310B. Inside the groove recess 342, a convex portion 340D that contacts the cathode side mesh electrode 170 is formed. In the convex portion 340D, an annular recess 341 is formed to accommodate the annular cathode 150. At the center of the convex portion 340D and at the inner center of the recess 341, a second outlet 320B is formed.

The flange convex portion 330F of the anode side flange 330 and the flange convex portion 340F of the cathode side flange 340 are fastened by bolts 181. An anode side chamber and a cathode side chamber are separated by the polymer electrolyte membrane 120 and sealed by an O-ring 370A and an O-ring 370B, respectively.

The distance (depth) from the facing surface of the flange convex portion 330F of the anode side flange 330 to the contacting surface of the convex portion 330D defines the number of anode side mesh electrodes 140 to be accommodated. For example, when accommodating five anode side mesh electrodes 140 with a thickness of 0.3 mm, the above-described distance (depth) may be 1.5 mm. Similarly, the distance (depth) from the facing surface of the flange convex portion 340F of the cathode side flange 340 to the contacting surface of the convex portion 340D defines the number of cathode side mesh electrodes 170 to be accommodated.

For example, it is possible to implement a configuration in which three mesh electrodes 140 on the anode side are used and six cathode side mesh electrodes 170 are used, in which the number of cathode side mesh electrodes 170 is twice the number of anode side mesh electrodes 140, and in which a larger flow rate is applied to the cathode side chamber than to the anode side chamber. By applying a larger flow rate to the cathode side chamber than to the anode side chamber, the pH rise of the cathode side electrolytic water is suppressed, and the electrodeposition of minerals on the cathode side is suppressed. An embodiment of suppressing the electrodeposition of minerals will be described below.

In the above, a configuration example of the fourth embodiment illustrated in FIG. 4B has been described using FIG. 6.

Note that the configuration example in FIG. 6 can be applied similarly to the third embodiment illustrated in FIG. 4A, the fifth embodiment illustrated in FIG. 5A, and the sixth embodiment illustrated in FIG. 5B.

Eighth Embodiment

An embodiment of suppressing the electrodeposition of minerals in the first embodiment to the seventh embodiment will be described.

By changing the type and number of cathode side mesh electrodes 170, as well as the conditions of water electrolysis (flow rate and current density of cathode side electrolytic water), it is possible to adjust the generation rate of hydroxide ions $OH^-$ and suppress the pH rise of the cathode side electrolytic water.

Generation reaction of hydroxide ion $OH^-$ at the cathode side is given by the following Formula (1).

For example, a platinum (Pt) mesh with an almost zero hydrogen overvoltage or a stainless steel mesh with a hydrogen overvoltage of about 0.1 V is used as the cathode side mesh electrode 170 for water electrolysis at a low current density. This can reduce the generation rate of hydroxide ion $OH^-$ in the cathode side electrolytic water. As a result, the pH rise of the cathode side electrolytic water is suppressed to a minimum, and the decrease in the saturation solubility of minerals such as calcium carbonate $CaCO_3$ and magnesium hydroxide $Mg(OH)_2$ due to the pH rise is suppressed. This prevents the electrodeposition of these minerals on the cathode side. Such operation makes it possible to stably operate the water electrolysis apparatus 1 for a long period of time.

On the other hand, the use of meshes with high hydrogen overvoltage, such as titanium (Ti) and boron-doped diamond (BDD), is advantageous for the generation of hydrogen peroxide, but increases the generation rate of hydroxide ion $OH^-$ according to the above-described Formula (1). As a result, the pH of the cathode side electrolytic water rises, and the saturation solubility of minerals such as calcium carbonate $CaCO_3$ and magnesium hydroxide $Mg(OH)_2$ decreases. As a result, the minerals tend to electrodeposit on the cathode side. In particular, when hard water with high Ca' and Mg' ion concentrations is used as raw water, the pH rise needs to be kept close to zero. To achieve this, it is desirable to use platinum (Pt) mesh or stainless steel mesh for the cathode side mesh electrode 170, or further operation such as lowering the current density or increasing the flow rate of the cathode side electrolytic water. This prevents electrodeposition of minerals.

In the case of utilizing hard water as raw water, when using the merging type water electrolysis apparatus of the first embodiment and the second embodiment, operation with low current density and high flow rate of cathode side electrolytic water is needed in order to prevent electrodeposition of minerals. As a result, it is difficult to increase the concentration of ozonated water.

On the other hand, when the two-chamber type water electrolysis apparatuses of the third embodiment to the sixth embodiment are used, the ozonated water generated on the anode side does not merge cathode side electrolytic water, and the anode side electrolytic water can be taken out independently. As a result, in cases in which hard water is used as raw water, even when the flow rate of the cathode side electrolytic water is increased in order to prevent electrodeposition of minerals, the anode side is not affected. As a result, it is easy to increase the concentration of ozonated water.

Regardless of the material used for the cathode side mesh electrode 170, it is important to optimize the conditions of water electrolysis to control the pH rise of the cathode side electrolytic water and prevent electrodeposition of minerals to the cathode side for long time operation.

A generation reaction of hydrogen peroxide at the anode side can be expressed by the following Formula (2).

When a boron-doped diamond (BDD) electrode is used on the anode side, the reaction in Formula (2) is accelerated and hydrogen peroxide is generated on the anode side.

When generating hydrogen efficiently on the cathode side, a platinum (Pt) mesh with a low hydrogen overvoltage may be used as the cathode side mesh electrode 170 that contacts the surface of the polymer electrolyte membrane 120. As a result, the voltage applied to the electrode can be suppressed and the power efficiency of hydrogen generation can be increased.

By using a Pt mesh with a low hydrogen overvoltage as the cathode side mesh electrode 170, generation of hydroxide ions $OH^-$ according to Formula (1) can be suppressed. As a result, the pH rise of the cathode side electrolytic water can be suppressed without increasing the flow rate of the cathode side electrolytic water, and electrodeposition of minerals can be prevented.

On the other hand, when it is desired to generate hydrogen peroxide on the cathode side as well, an electrode with high hydrogen overvoltage such as titanium (Ti) or boron-doped diamond (BDD) may be used. These catalyst electrodes are also placed in contact with the polymer electrolyte membrane 120.

On the cathode side, dissolved oxygen and hydrogen ions $H^+$ in raw water react according to the following Formula (3), and hydrogen peroxide is generated.

It is expected that more hydrogen peroxide can be produced by using an electrode with a high hydrogen overvoltage on the cathode side from the standard potential $E_0$ in the above-described Formula (3). In particular, a boron-doped diamond (BDD) electrode can efficiently generate hydrogen peroxide on the cathode side because the hydrogen overvoltage is about −1V.

The number of mesh electrodes placed on the anode side and the cathode side may be determined depending on the ratio of the amount of water flowing to the anode side and to the cathode side. For example, when twice the amount of water flows to the cathode side as to the anode side, the total number of mesh electrodes placed on the cathode side is twice the total number of mesh electrodes placed on the anode side. This allows sufficient amount of water to be supplied to the cathode side, thus suppressing the pH rise of the cathode side electrolytic water. In addition, minerals such as calcium carbonate $CaCO_3$ and magnesium hydroxide $Mg(OH)_2$ generated by water electrolysis can be prevented from precipitating on the cathode side.

When the pH of the cathode side electrolytic water rises to 9 or higher, the saturation solubility of magnesium hydroxide $Mg(OH)_2$ in water decreases. As a result, magnesium hydroxide $Mg(OH)_2$ precipitates on the electrode on the cathode side where the pH is locally low. The concentration of $CO_2^{3-}$ ions in water, the raw material for calcium carbonate $CaCO_3$, is determined by the dissociation equilibrium of carbonic acid $H_2CO_3$.

However, when the pH is raised to about 8.3, only about 1% of carbonic acid $H_2CO_3$ present in tap water becomes $CO_2^{3-}$ ions.

Therefore, by adjusting the water flow rate, the current density, and the catalyst species on the cathode side, and adjusting the pH of cathode side electrolytic water to around 8.3, the electrodeposition of both magnesium hydroxide $Mg(OH)_2$ and calcium carbonate $CaCO_3$ can be suppressed.

Ninth Embodiment

Figure 7:
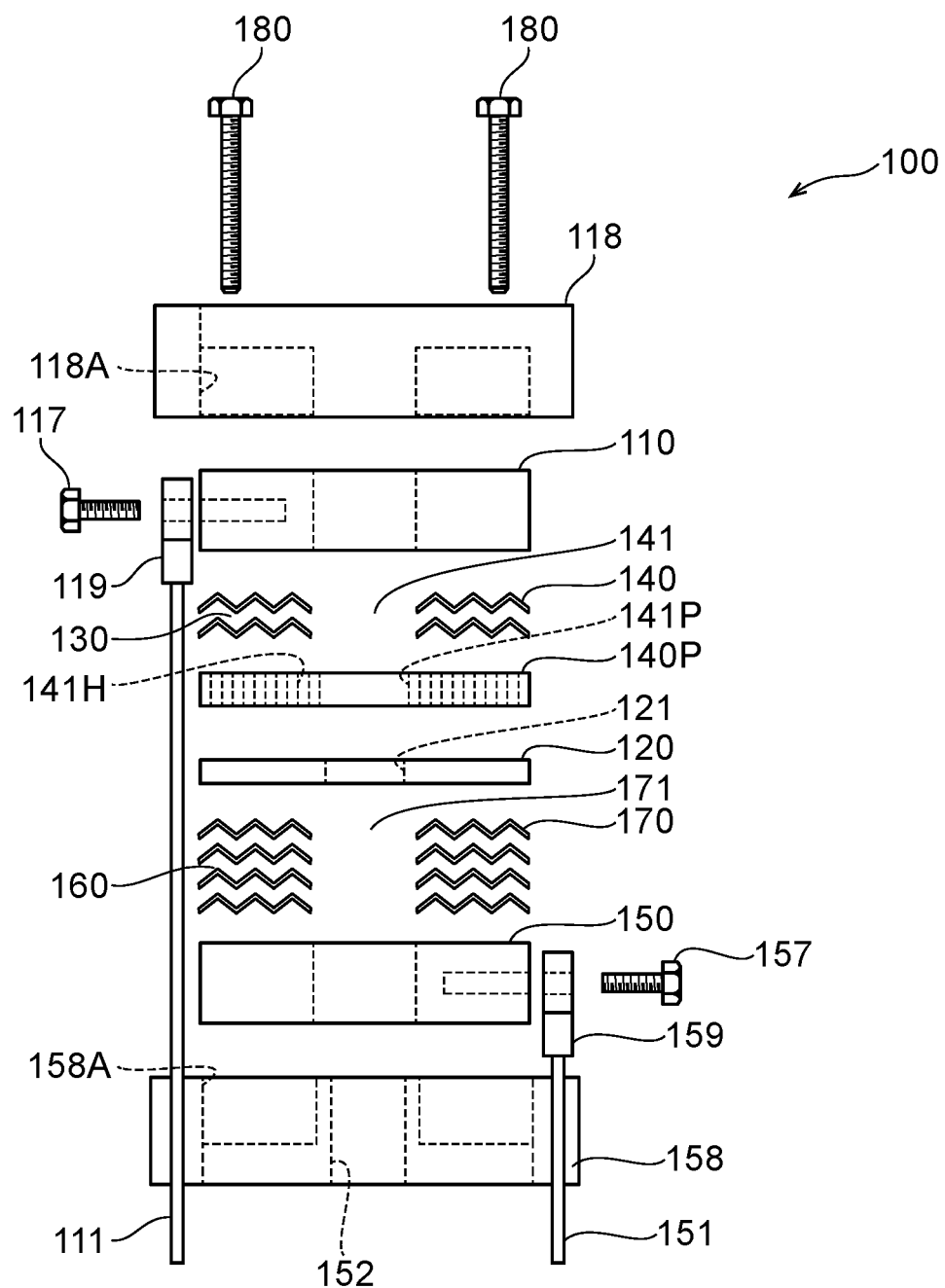
FIG. 7 is a diagram of a ninth embodiment, which is an exploded view illustrating an example of the configuration of the water electrolysis portion arranged in the housing of FIG. 1.

FIG. 7 is an exploded view illustrating an example of the configuration of the water electrolysis portion 100 arranged in the housing 300 of FIG. 1.

The annular anode 110 is accommodated in an annular recess 118A formed in an anode holding portion 118. On the other hand, the annular cathode 150 is accommodated in an annular recess 158A formed in a cathode holding portion 158.

The anode holding portion 118 and the cathode holding portion 158 are made of an acrylic resin, for example. The anode 110 is configured as a terminal plate made of titanium (Ti), for example. The cathode 150 is configured as a terminal plate made of stainless steel, for example.

The anode terminal 119, which is configured as a crimp terminal, is screwed into the anode 110, for example, with a screw 117 (for example, an M3 screw). A negative terminal 159, which is configured as a crimp terminal, is screwed into the cathode 150, for example, with a screw 157 (M3 screw).

On the anode side, two titanium (Ti) mesh electrodes (for example 80 mesh) and one substrate electrode 140P are provided as the anode side mesh electrode 140. The substrate electrode 140P includes an inner side opening 141N that is connected to the inner side opening 121 of the polymer electrolyte membrane 120 and the inner side opening 141 of the anode side mesh electrode 140. The substrate electrode 140P is a substrate electrode with a plurality of through holes 141H formed in the thickness direction, and is made of niobium (Nb), and a thin membrane of boron-doped diamond (BDD) is formed on a niobium (Nb) substrate. The substrate electrode 140P is arranged in such a manner to contact the polymer electrolyte membrane 120.

When a boron-doped diamond (BDD) substrate electrode 140P is used, mass transfer needs to be carried out rapidly. For this reason, there is a need to open a fine through hole 141H that penetrates a boron-doped diamond (BDD) membrane-formed surface (contact surface with the polymer electrolyte membrane 120) and a bare surface of niobium (Nb) (contact surface with the mesh electrode 140) of the substrate electrode 140P. For example, as the substrate electrode 140P, a substrate electrode with round through holes with a diameter of 1 mm or square through holes with a side of 1 mm opened at intervals of about 2 mm pitch is used.

As for the anode side mesh electrode 140 to be arranged on the anode side, at least one mesh electrode other than the substrate electrode 140P may be arranged in order to secure sufficient flow channel cross-sectional area.

On the cathode side, four titanium (Ti) mesh electrodes (for example, 80 mesh) are provided as cathode side mesh electrodes 170.

The reason for selecting mesh electrodes or the like made of materials as described above is to generate advanced oxidation water in which ozone and hydrogen peroxide coexist.

The water electrolysis portion 100 illustrated in FIG. 7 is arranged in the housing 300 illustrated in FIG. 1.

The anode side mesh electrode 140 and the substrate electrode 140P are sandwiched between the anode 110 and the polymer electrolyte membrane 120, the cathode side mesh electrode 170 is sandwiched between the polymer electrolyte membrane 120 and the cathode 150, and the threaded portion of the bolt 180 (for example, M3 screw) is screwed into the screw holes formed in the anode holding portion 118, the cathode holding portion 158, and the bottom plate 340 of the housing 300. By screwing in the bolt 180 and fastening in the thickness direction, the water electrolysis portion 100 is fixed to the bottom plate 340 of the housing 300.

The material of the housing 300 is preferably Teflon (registered trademark), which is ozone-resistant. However, when the dissolved ozone concentration is low, the material of the housing 300 may be composed of a general-purpose resin such as an acryl or polypropylene. In particular, when the housing 300 is composed of an acrylic resin, the housing will not deteriorate even after being exposed to ozonated water with a concentration of about 10 mg/L for several years. Acrylic resin does not deform under pressure unlike Teflon (registered trademark). Acrylic resin is suitable as the material for the housing 300 because of also having favorable processability.

On a center portion of a top plate 330 and a bottom plate 340 of the housing 300, the inlet 310 and the outlet 320 are opened, respectively, and a female thread for connecting a joint is cut on the inner circumferential surface thereof. The housing 300, in the embodiment, is made of transparent acrylic resin. A joint is connected to each of the inlet 310 and the outlet 320, and a pipe or a tube is connected to the joint.

The housing 300, for example, has an inner diameter of 50 mm and the distance between the top plate 330 and the bottom plate 340 is 35 mm. In this housing 300, the circular column-shaped water electrolysis portion 100 with an outer diameter of 47 mm and a height of 22 mm, illustrated in FIG. 7, is arranged. The thickness of the anode 110 and the cathode 150 can be, for example, 6 mm each.

The outer diameter of the anode side mesh electrode 140, the substrate electrode 140P, and the cathode side mesh electrode 170 can be 3.5 cm, and the inner diameter (diameter of the inner side opening) can be 1.1 cm. In this case, the area of the mesh and substrate electrodes is about 8.6 $cm^2$.

On the anode side, two to four mesh electrodes are provided, and on the cathode side, four to eight mesh electrodes are provided to form water channels. A substrate electrode 140P with a thickness of 0.5 mm can be used. For the polymer electrolyte membrane 120, a Nafion 117 membrane or the like with a thickness of 0.2 mm can be used. The gap between the water electrolysis portion 100 and the bottom plate 340 of the housing 300 is sealed by an O-ring 360.

To each of the anode 110 and the cathode 150 of the water electrolysis portion 100, for example, a power cord 111 and a power cord 151 with a thickness of about 3 mm in diameter are electrically connected, and the power cord 111 and the power cord 151 are respectively pulled out via a hole 348 and a hole 349 opened in the housing 300. The gaps between the power cord 111 and the power cord 151 and the hole 348 and the hole 349 are sealed with an adhesive or the like. The power cord 111 and the power cord 151 are electrically connected to the positive terminal and the negative terminal of a variable power supply or a constant voltage direct current power supply, respectively.

The flow rate ratio of the anode side electrolytic water to the cathode side electrolytic water is determined according to the ratio of the flow channel cross-sectional areas of the outer peripheral opening 131 of the anode side electrolytic domain 130 and the outer peripheral opening 161 of the cathode side electrolytic domain 160, or the ratio of the numbers of mesh electrodes of the domains. When two mesh electrodes are provided on the anode side and four mesh electrodes are provided on the cathode side, the flow rate ratio of the electrolytic water on the anode side and the cathode side electrolytic water flowing in the water electrolysis portion 100 is (flow rate of anode side electrolytic water)/(flow rate of cathode side electrolytic water)=½.

By flowing more water at twice the flow rate to the cathode side compared to the anode side, the pH rise of the cathode side electrolytic water is suppressed and precipitation of minerals such as calcium carbonate $CaCO_3$ and magnesium hydroxide $Mg(OH)_2$ is prevented.

In the water electrolysis portion 100 illustrated in FIG. 7, the substrate electrode 140P is used in addition to the mesh electrode. In this case, since water flows horizontally to the substrate electrode 140P, a cross-sectional area corresponding to the substrate electrode 140P damps water, and the area is not included in the above-described flow channel cross-sectional area. Therefore, the flow rate ratio between the anode side electrolytic water and the cathode side electrolytic water is determined by the ratio of the number of mesh electrodes excluding the substrate electrode 140P.

In the water electrolysis portion 100, anode side electrolytic water generated on the anode side and cathode side electrolytic water generated on the cathode side merge and flow out to the outside via the inner side opening 152 of the cathode holding portion 158. Functional water in which three gases ozone, oxygen, and hydrogen as well as hydrogen peroxide are dissolved can be obtained.

Ozonated water generated on the anode side and hydrogen water generated on the cathode side merge, and electrolytic water in which ozone and hydrogen are dissolved is obtained.

When boron-doped diamond (BDD) as the catalyst electrode in contact with the polymer electrolyte membrane 120 is used on the anode side and mesh electrode supported with titanium (Ti), stainless steel, or boron-doped diamond (BDD) as the catalyst electrode in contact with the polymer electrolyte membrane 120 is used on the cathode side, hydrogen peroxide can be produced at both electrodes. This allows the concentration of hydrogen peroxide to be increased.

In the water electrolysis portion 100 illustrated in FIG. 7, anode side electrolytic water and cathode side electrolytic water in the anode side electrolytic domain 130 and cathode side electrolytic domain 160 are separated by the polymer electrolyte membrane 120. This prevents electrolytic water from flowing between the anode side and the cathode side. When the water electrolysis is completed, anode side electrolytic water and cathode side electrolytic water merge at the inner side opening in the center of the water electrolysis portion 100 and flow out from the inner side opening 152 of the cathode holding portion 158 at the lower side in the figure. This suppresses reduction of ozone and oxygen by hydrogen ions (W) during a water electrolysis reaction.

In the water electrolysis apparatus 1, which has a configuration in which the water electrolysis portion 100 illustrated in FIG. 7 is arranged in the housing 300 illustrated in FIG. 1, water is supplied from above in the figure, but water may also be supplied from below in the figure, and the direction in which the water is supplied is any direction. The water electrolysis portion 100 may be arranged horizontally, and the angle of the arrangement may be set at any angle. Therefore, the water electrolysis apparatus 1 can be connected to a rubber hose or the like and used for showering or sprinkling applications.

Tenth Embodiment

Figure 8:
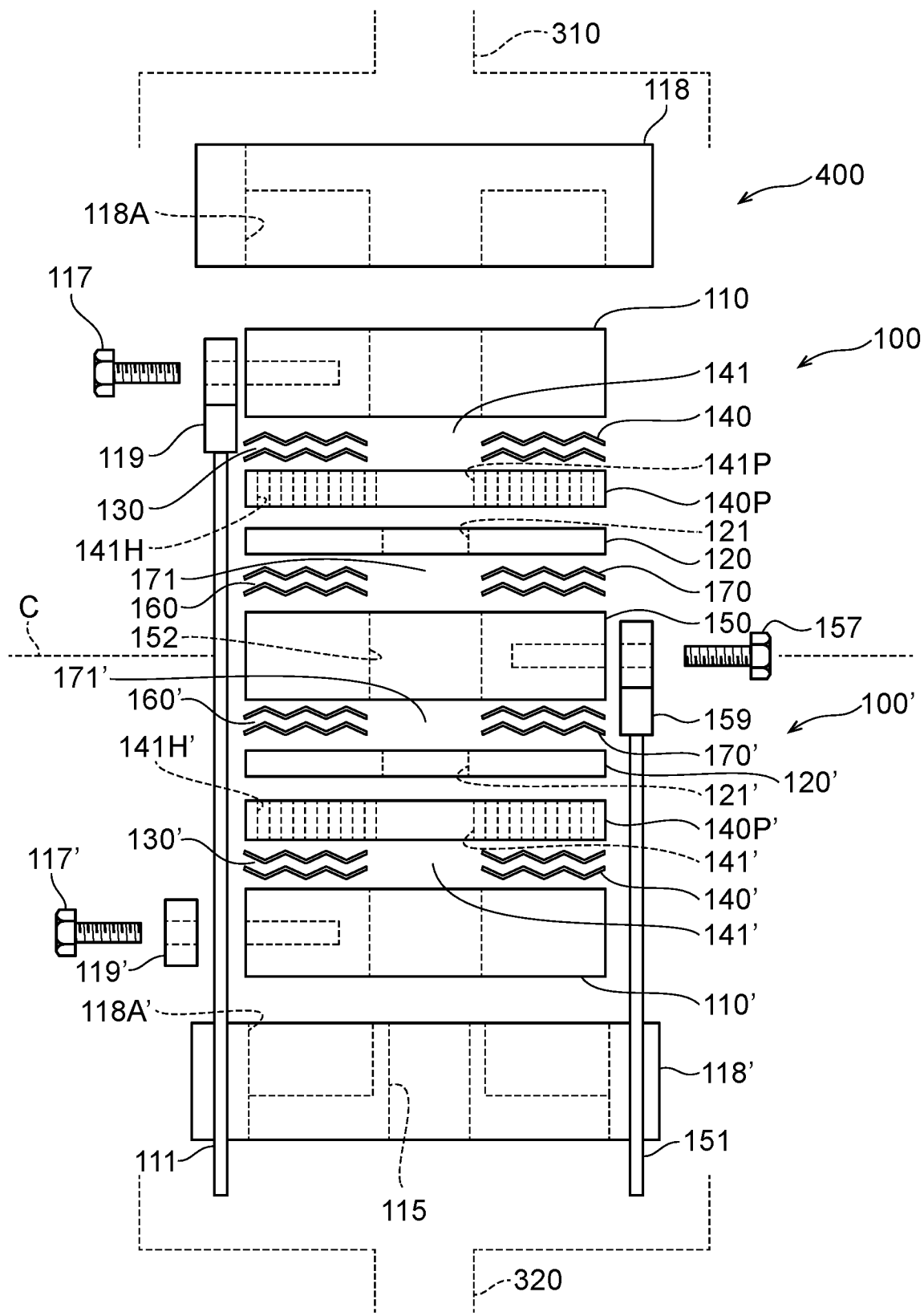
FIG. 8 is an exploded view illustrating an example of the configuration of a water electrolysis portion of the tenth embodiment.

A modified example of a tenth embodiment will be described. FIG. 8 is an exploded view illustrating a configuration example of a water electrolysis portion 400 of the tenth embodiment.

The water electrolysis portion 400 is configured such that two water electrolysis portions 100 and 100' are interposed between the inlet 310 and the outlet 320.

The water electrolysis portion 400 is configured to be vertically symmetrical with the symmetry axis C in the figure as the symmetry center. The water electrolysis portion 100 (referred to as one electrolysis portion 100), which is similar to the water electrolysis portion 100 illustrated in FIG. 7, is provided above the symmetry axis C. A water electrolysis portion 100' (referred to as the other electrolysis portion), which is similar to the water electrolysis portion 100 illustrated in FIG. 7, is provided below the symmetry axis C. Each component of the other water electrolysis portion 100', which is the same as the component of the one water electrolysis portion 100, is assigned a dash.

Water flows in the anode side electrolytic domain 130 and the cathode side electrolytic domain 160 of one water electrolysis portion 100 and water flows in the anode side electrolytic domain 130' and the cathode side electrolytic domain 160' of the other water electrolysis portion 100' are arranged to be parallel to each other.

The cathode 150 of one water electrolysis portion 100 is in common with the cathode of the other water electrolysis portion 100'.

The configuration of one water electrolysis portion 100 is as follows.

The annular anode 110 is accommodated in the annular recess 118A formed in the anode holding portion 118.

To the anode 110, the anode terminal 119, which is configured as a crimp terminal, is screwed and fixed, for example, with a screw 117. To the cathode 150, a negative terminal 159, which is configured as a crimp terminal, is screwed and fixed, for example, with a screw 157.

On the anode side, two mesh electrodes and one substrate electrode 140P are provided as the anode side mesh electrode 140. The substrate electrode 140P includes an inner side opening 141P that is connected to the inner side opening 121 of the polymer electrolyte membrane 120 and the inner side opening 141 of the anode side mesh electrode 140. The substrate electrode 140P is arranged in such a manner to contact the polymer electrolyte membrane 120.

On the cathode side, two mesh electrodes are provided as the cathode side mesh electrodes 170.

The configuration of the other water electrolysis portion 100' is as follows.

The same components of one water electrolytic portion 100 are arranged symmetrically as the components of the other water electrolytic portion 100', with the symmetry axis C as the symmetry center.

Note, however, that in the anode holding portion 118' of the other water electrolysis portion 100', the outlet 320 and an inner side opening 115 that is connected to the inner side opening 141' of the anode side mesh electrode 140' are formed.

When water flows in the inlet 310 from above, water flows simultaneously in the anode side electrolytic domain 130 and the cathode side electrolytic domain 160 of one water electrolysis portion 100 and in the anode side electrolytic domain 130' and the cathode side electrolytic domain 160' of the other water electrolytic domain 100', which are arranged in parallel thereto, and water electrolysis is performed simultaneously.

Electrolytic water generated in one water electrolysis portion 100 and electrolytic water generated in the other water electrolysis portion 100' merge and flow out to the outside via the inner side opening 115 of the anode holding portion 118' of the other water electrolysis portion 100' and the outlet 320.

The water electrolysis apparatus 1 may be configured such that the water electrolysis portion 400 illustrated in FIG. 8 is arranged in the housing 300 illustrated in FIG. 1.

Water may be supplied to the water electrolysis portion 400 illustrated in FIG. 8 from above in the figure, or from below in the figure. The direction in which water is supplied to the water electrolysis portion 400 is any direction. The water electrolysis portion 400 may be arranged horizontally, and the angle of the arrangement may be set at any angle.

In the water electrolysis portion 400 of the tenth embodiment, two water electrolysis portions 100 and 100' having the same electrode area are provided. As a result, the flow channel cross-sectional area is twice as large as that of a single water electrolysis portion 100, and the pressure loss can be drastically reduced, and a large flow rate of electrolytic water can be generated.

In the configuration example of FIG. 8, the cathode 150 of one water electrolysis portion 100 is common to the cathode 150 of the other water electrolysis portion 100'. However, implementation in which the anode 110 is used as a common electrode is also possible. The water electrolysis portion 400 may be configured such that the anode 110 of one water electrolysis portion 100 is common to the anode of the other water electrolysis portion 100'.

Although, in the configuration example of FIG. 8, two-stage water electrolysis portions 100 and 100' arranged in parallel are used, the configuration may be composed of water electrolysis portions with three, four, or more stages if necessary.

Eleventh Embodiment

In the first and second embodiments, configuration examples in which the water electrolysis portion 100 is arranged in the housing 300 are described.

However, an implementation in which the water electrolysis portion 100 and a gas-liquid mixing portion are arranged in the housing 300 is also possible. The gas-liquid mixing portion is provided to redissolve gases generated in the water electrolysis portion 100 in electrolytic water flowing out from the water electrolysis portion 100.

FIG. 9 is a diagram illustrating an example of the configuration of a water electrolysis apparatus 1, in which the water electrolysis portion 100 and the gas-liquid mixing portion 200 of the second embodiment are arranged in a housing 300, which is a sectional view from a side of the water electrolysis apparatus 1. The water electrolysis portion 100 having the structure of the ninth embodiment illustrated in FIG. 7 can be applied.

As illustrated in FIG. 9, the inlet 310 is provided in the bottom plate 340 of the housing 300, and the outlet 320 is provided in the top plate 330.

The water electrolysis portion 100 is arranged in the housing 300, and the gas-liquid mixing portion 200 is interposed between the water electrolysis portion 100 and the outlet 320 in the housing 300.

The gas-liquid mixing portion 200 includes a gas-liquid mixing inlet portion 202 that is connected to the outer peripheral opening 131 of the anode side electrolytic domain 130 and the outer peripheral opening 161 of the cathode side electrolytic domain 160 of the water electrolysis portion 100. The gas-liquid mixing portion 200 includes a gas-liquid mixing outlet portion 203 that discharges a fluid that has been gas-liquid mixed and that is connected to the outlet 320.

The gas-liquid mixing portion 200 having the configuration disclosed in JP-A No. 2017-165651 can be applied.

The gas-liquid mixing portion 200 includes a plurality of partitioning portions 230 interposed between the gas-liquid mixing inlet portion 202 and the gas-liquid mixing outlet portion 203. The plurality of partitioning portions 230 include a plurality of openings 230A, which are spaced apart in the axial direction (vertical direction in the figure) of the housing 300 to partition the inside of the housing 300 in the axial direction.

The holding member 210 is arranged between adjacent partitioning portions 230 in the axial direction, and holds the distance between the partitioning portions 230.

The partitioning portion 230 is composed of a partitioning member 220 with a plurality of openings 230A.

For the partitioning member 220, a plain weave or twill weave mesh, an expanded metal, a plate member with a plurality of through holes, or the like can be used. The partitioning member 220 can be composed of, for example, two layers of titanium (Ti) mesh.

The holding member 210 can be an O-ring or packing. The holding member 210 can be composed of an ozone-resistant Teflon (registered trademark) O-ring, for example.

The gas-liquid mixing inlet portion 202 of the gas-liquid mixing portion 200 is formed by the ring member 201. For example, a square cross-sectional ring member 201 is fixed to the inner circumferential surface of the cylindrical portion 350 of the housing 300 by adhesion or the like. The inner diameter of the ring member 201, or the diameter of the gas-liquid mixing inlet portion 202, is smaller than the inner diameter of the cylindrical portion 350. The ring member 201 can be composed of acrylic resin, for example. The ring member 201 is in contact with the holding member 210 provided at the bottom of the gas-liquid mixing portion 200, and functions as a support member that supports a plurality of holding members 210 and a plurality of partitioning portions 230 from below.

The diameter of the gas-liquid mixing outlet portion 203 of the gas-liquid mixing portion 200 is equal to the inner diameter of the cylindrical portion 350 of the housing 300. The diameter of the outlet 320 is smaller than the diameter of the gas-liquid mixing outlet portion 203 of the gas-liquid mixing portion 200.

When raw water is supplied to the inlet 310 of the water electrolysis apparatus 1 configured as described above, electrolytic water flows out from the outer peripheral openings 131 of the anode side electrolytic domain 130 and the outer peripheral openings 161 of the cathode side electrolytic domain 160 of the water electrolysis portion 100.

The electrolytic water flowing out from the water electrolysis portion 100 flows in the gas-liquid mixing inlet portion 202 of the gas-liquid mixing portion 200.

Electrolytic water flows perpendicular to the surface of the partitioning portion 230 of the gas-liquid mixing portion 200, for example, two partitioning members 220 (two titanium (Ti) meshes). As a result, gases generated in the water electrolysis portion 100 are trapped in a space portion between adjacent partitioning portions 230 in the axial direction, forming gas accumulation. When electrolytic water passes through the partitioning portion 230 of the gas-liquid mixing portion 200, the electrolytic water is atomized (subdivided) by the openings 230A (for example, mesh holes). When the electrolytic water, which has been atomized (subdivided) and has a larger gas-liquid contact area, flows through the gas accumulation, the electrolytic water absorbs the gas.

Each time the electrolytic water passes through a plurality of partitioning portions 230, the gas is absorbed into the electrolytic water, promoting mixing of the gas and the electrolytic water, and dissolving the gas into the electrolytic water with high efficiency.

The electrolytic water in which the gas has been dissolved with high efficiency flows out to the outside via the gas-liquid mixing outlet portion 203 of the gas-liquid mixing portion 200 and the outlet 320.

According to the eleventh embodiment, it is possible to save space compared to cases in which the water electrolysis portion and the gas-liquid mixing portion are connected by piping. Gas can be dissolved in water with high efficiency, and electrolytic water with high solubility can be generated.

Since the cross-sectional area of the gas-liquid mixing portion 200 is the area obtained by subtracting the area of the holding member 210 from the inner diameter of the cylindrical portion 350 of the housing 300, the flow channel cross-sectional area is large, and the pressure loss can be reduced. The pressure loss of the water electrolysis portion 100 itself is small, and a large flow rate of functional water can be generated despite the small size of the apparatus.

This can realize a water electrolysis apparatus with low pressure loss and large gas solubility despite the small size.

The number of stages (number of sets) as the number of holding members 210 (for example, Teflon (registered trademark) O-rings) and partitioning members 220 (for example, titanium (Ti) mesh) can be determined by the concentration of ozonated water or the like to be generated. For example, when generating low-concentration ozonated water with a concentration of 0.5 mg/L, 12 to 13 stages may be used. When generating medium-concentration ozonated water of about 2 mg/L, the number of stages may be from 20 to 25. The larger the number of stages and the inner diameter of the gas-liquid mixing portion 200, the more improved the gas dissolving performance becomes.

However, when the inner diameter of the gas-liquid mixing portion 200 is made too large and a large flow rate of electrolytic water is applied, the water flow may cause the partitioning member 220 made of titanium (Ti) mesh to become concave, resulting in uneven flow. As a result, the gas dissolving efficiency decreases. In such a case, for the purpose of supporting the titanium (Ti) mesh, a micro expanded metal made of titanium (Ti) or stainless steel with a thickness of about 0.5 mm may be used to support the titanium (Ti) mesh.

When the water electrolysis apparatus 1 illustrated in FIG. 9 is configured using the water electrolysis portion 100 with an outer diameter of 47 mm and the gas-liquid mixing portion 200 with 13 stages, the housing 300 has dimensions of 50 mm in inner diameter and 100 mm in height, resulting in a considerably small size.

When tap water flows through the water electrolysis apparatus 1 illustrated in FIG. 9 at a flow rate of about 3 L/min (total of electrolytic water on the anode side and on the cathode side), and a voltage of about 8 V direct current is applied between the anode 110 and the cathode 150 via the power cord 111 and the power cord 151, a current of about 1.77 A (0.2 A/cm$^2$) flows. This causes water electrolysis and generates functional water containing 0.5 mg/L of dissolved ozone, 0.2 mg/L of dissolved hydrogen, 10 mg/L of dissolved oxygen, and from 0.2 to 0.3 mg/L of hydrogen peroxide.

Since all ozone gas is dissolved in the functional water, no harmful gas phase ozone gas is generated from the water electrolysis apparatus 1.

However, if this functional water is stored in a container or the like, the dissolved ozone will gradually evaporate as a gas. With the functional water continuously flowing in a 4 L wash basin, the gas-phase ozone concentration at 10 cm above the wash basin is about 0.05 ppmv. This value meets the instantaneous maximum value of 0.1 ppmv, which is the environmental standard.

The gas-phase ozone concentration at 20 cm directly above the wash basin drops to 0 ppmv, which is below the 24-hour average regulation value of 0.05 ppmv, causing no safety issues at all.

In the configuration example of FIG. 9, the gas-liquid mixing portion 200 having the configuration disclosed in JP-A No. 2017-165651 is applied.

However, the gas-liquid mixing portion 200 to be arranged in the housing 300 is not limited to the configuration disclosed in JP-A No. 2017-165651. The gas-liquid mixing portion 200 to be arranged in the housing 300 may be of a configuration that can eliminate the need for piping with the water electrolysis portion 100.

In the above, a configuration example combining the water electrolysis portion 100 and the gas-liquid mixing portion 200 of the second embodiment has been described.

The water electrolysis apparatus 1 may be configured by combining the water electrolysis portion 100 and the gas-liquid mixing portion 200 of the first embodiment and arranging the portions in the housing 300.

For example, the water electrolysis portion 100 of the first embodiment illustrated in FIG. 1 may be arranged upside down in the figure in place of the water electrolysis portion 100 of the second embodiment in the housing 300 of the water electrolysis apparatus 1 illustrated in FIG. 9.

The eleventh embodiment described above may be implemented in combination with the eighth embodiment, the ninth embodiment, or the tenth embodiment.

Twelfth Embodiment

In the ninth embodiment and the tenth embodiment, the example in which the substrate electrode 140P on which the thin membrane of boron-doped diamond (BDD) is formed is arranged on the anode side to generate advanced oxidation water has been described.

However, boron-doped diamond (BDD) deposited substrates with a large number of through holes 141H are expensive, which increases the cost of the entire water electrolysis apparatus.

Therefore, an embodiment in which a catalyst electrode for generating advanced oxidation water can be produced inexpensively will be described.

A method for producing a boron-doped diamond (BDD) supported mesh electrode 147, in which boron-doped diamond (BDD) powder is supported on a titanium (Ti) mesh, will be described below with reference to FIG. 10. Boron-doped diamond (BDD) powder can be obtained at low cost.

(Process 1)

Boron-doped diamond (BDD) powder is prepared. Boron-doped diamond (BDD) powder is hydrophobic and receives interfacial force from water, and thus floats on the water surface. Such Boron-doped diamond (BDD) powder that floats on the water surface is prepared. The particle size distribution of the boron-doped diamond (BDD) powder can be adjusted by sieving or the like to a predetermined size distribution that allows floating on the water surface.

(Process 2)

Figure 10A:
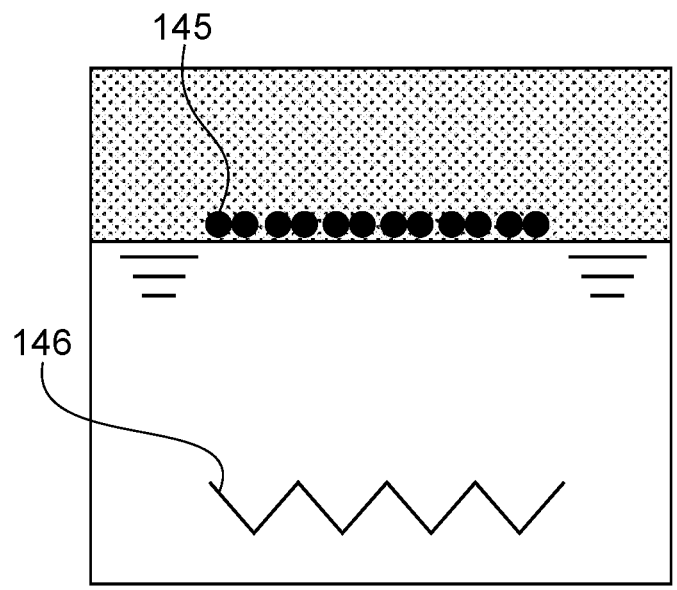
FIG. 10A is a diagram illustrating a method for producing a boron-doped diamond (BDD) supported mesh electrode, in which boron-doped diamond (BDD) powder is supported on a titanium (Ti) mesh.

As illustrated in FIG. 10A, boron-doped diamond (BDD) powder 145 is floated on the water surface. The boron-doped diamond (BDD) powder 145 self-organizes by interfacial forces and is self-aligned on the water surface in a single layer (monolayer) without overlapping and in a dense manner.

On the other hand, a metal mesh with a mesh even finer than the particles of boron-doped diamond (BDD) powder 145 is arranged in the water. An 80-mesh titanium (Ti) mesh 146, for example, is arranged in the water in such a manner that the mesh is positioned below the boron-doped diamond (BDD) powder 145 on the water surface.

(Process 3)

Figure 10B:
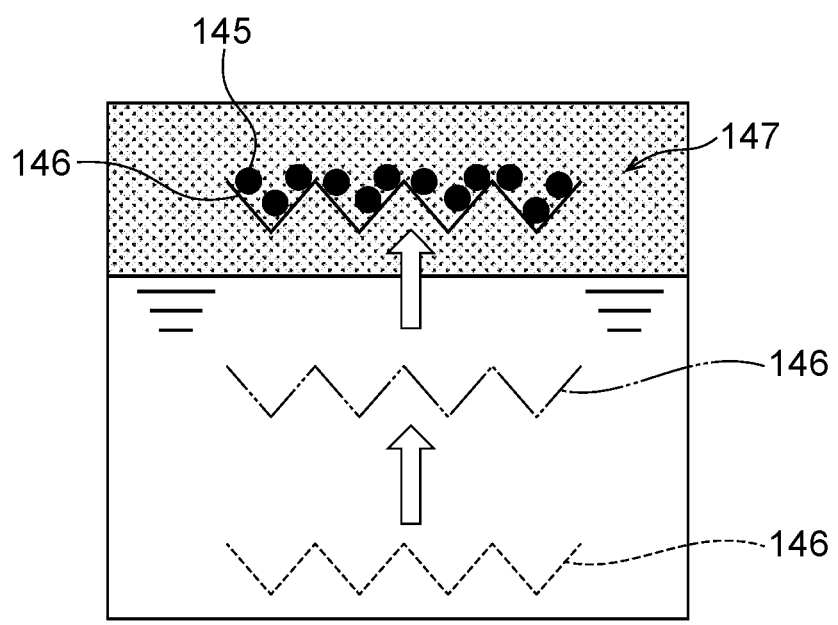
FIG. 10B is a diagram illustrating a method for producing a boron-doped diamond (BDD) supported mesh electrode, in which boron-doped diamond (BDD) powder is supported on a titanium (Ti) mesh.

As illustrated in FIG. 10B, the titanium (Ti) mesh 146 is pulled upward from the water, and boron-doped diamond (BDD) powder 145 on the water surface is scooped out by the titanium (Ti) mesh 146.

(Process 4)

The boron-doped diamond (BDD) powder 145 scooped out by the titanium (Ti) mesh 146 is fixed on the titanium (Ti) mesh 146 by spraying a solution (for example, Nafion solution) of the polymer electrolyte membrane 120 or by other means.

As described above, the boron-doped diamond (BDD) supported mesh electrode 147 is produced, in which boron-doped diamond (BDD) powder 145 is supported on the titanium (Ti) mesh 146. On the titanium (Ti) mesh 146, boron-doped diamond (BDD) particles are uniformly aligned in a single layer (monolayer).

By arranging this boron-doped diamond (BDD) supported mesh electrode 147 on the anode side of the water electrolysis portion 100 of each embodiment, advanced oxidation water can be generated. Since only the minimum amount of catalyst particles is required, a catalyst electrode can be produced at a low cost.

An implementation in which boron-doped diamond (BDD) powder 145 is supported in a single layer on the polymer electrolyte membrane 120 is also possible. A method for producing such a polymer electrolyte membrane 120 with a catalyst electrode will be described below. For example, a method of transferring boron-doped diamond (BDD) powder 145 onto the polymer electrolyte membrane 120 is used.

First, the above-described process 1, process 2, and process 3 are carried out to align boron-doped diamond (BDD) powder 145 on the titanium (Ti) mesh 146.

Next, the boron-doped diamond (BDD) powder 145 aligned on the titanium (Ti) mesh 146 is transferred onto a swollen polymer electrolyte membrane.

Next, the boron-doped diamond (BDD) powder 145 transferred onto the swollen polymer electrolyte membrane is fixed by spraying a polymer electrolyte membrane solution (for example, Nafion solution).

When the polymer electrolyte membrane solution is sprayed onto the swollen polymer electrolyte membrane, wrinkles and bumps are likely to occur on the membrane. Therefore, it is desirable to fix the polymer electrolyte membrane with an air chuck to prevent deformation of the membrane.

The following method may also be used. This method can prevent deformation of the polymer electrolyte membrane without using an air chuck.

First, before transferring the boron-doped diamond (BDD) powder 145, a polymer electrolyte membrane is attached to a glass coated with a polymer electrolyte membrane solution, dried, and fixed.

Next, the polymer electrolyte membrane solution is applied to the surface of the polymer electrolyte membrane on the glass.

Next, the boron-doped diamond (BDD) powder 145 aligned on the titanium (Ti) mesh 146 is transferred to the polymer electrolyte membrane that has been coated with the polymer electrolyte membrane solution.

Next, the polymer electrolyte membrane 120 and boron-doped diamond (BDD) powder 145 are integrated by crimping at about 120° C. using a hot plate.

As described above, a polymer electrolyte membrane with a catalyst electrode in which a single layer of boron-doped diamond (BDD) powder 145 is supported on the polymer electrolyte membrane 120 is produced. By arranging the catalyst electrode surface of this polymer electrolyte membrane with catalyst electrode on the anode side of the water electrolysis portion 100 of each embodiment, advanced oxidation water can be generated. Since only the minimum amount of catalyst particles is required, a catalyst electrode can be produced at a low cost.

In the above, a titanium (Ti) mesh was used as the mesh electrode, and an implementation using a metal mesh other than titanium (Ti) is also possible.

The implementation of supporting boron-doped diamond (BDD) powder has been described, and an implementation of supporting other hydrophobic catalyst particles is similarly possible.

In the above, the implementation of supporting hydrophobic catalyst particles has been described, and an implementation of supporting hydrophilic catalyst particles is also possible.

A method for producing a mesh electrode 149 in which hydrophilic catalyst particles such as metal oxides, for example, iridium oxide ($IrO_2$) powder, are supported on a titanium (Ti) mesh will be described below using FIG. 11.

(Process 1)

Figure 11A:
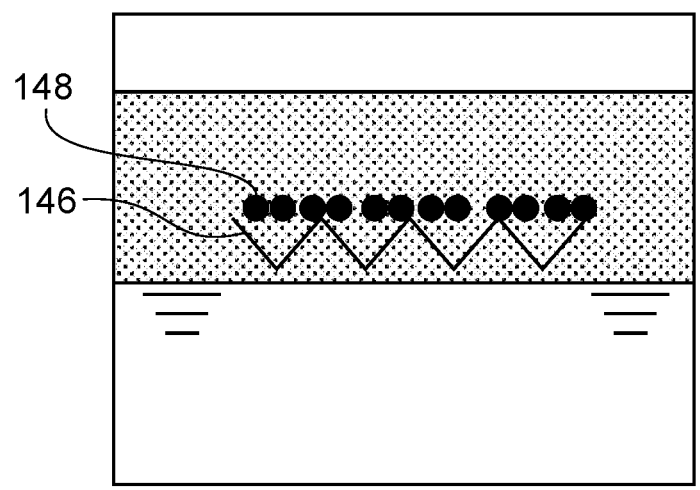
FIG. 11A is a diagram illustrating a method for producing a mesh electrode in which iridium oxide ($IrO_2$) powder is supported on a titanium (Ti) mesh.

As illustrated in FIG. 11A, the titanium (Ti) mesh 146 is floated on the bottom surface in oil, such as silicon oil, and at the interface between oil such as silicon oil and water. This allows the oil to soak into the surface of the titanium (Ti) mesh 146.

(Process 2)

Spread iridium oxide ($IrO_2$) powder 148 over the titanium (Ti) mesh 146. Iridium oxide ($IrO_2$) powder 148 is hydrophilic, and therefore self-aligns in a single layer (monolayer) and densely at the interface of water and oil.

(Process 3)

Figure 11B:
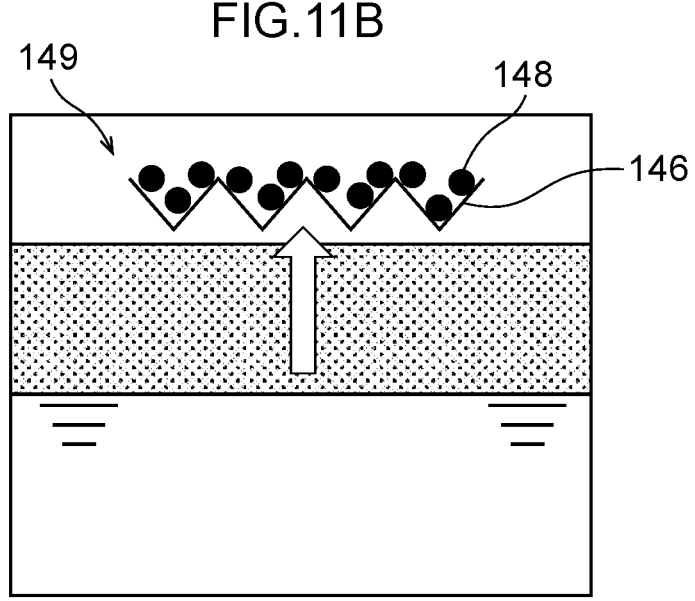
FIG. 11B is a diagram illustrating a method for producing a mesh electrode in which iridium oxide ($IrO_2$) powder is supported on a titanium (Ti) mesh.

The titanium (Ti) mesh 146 is once submerged in water. As illustrated in FIG. 11B, the titanium (Ti) mesh 146 is pulled upward from the water, and the titanium (Ti) mesh 146 scoops out the self-aligned iridium oxide ($IrO_2$) powder 148 at the interface of water and oil.

(Process 4)

The iridium oxide ($IrO_2$) powder 148 scooped out by the titanium (Ti) mesh 146 is fixed on the titanium (Ti) mesh 146 by spraying a polymer electrolyte membrane solution (such as Nafion solution) or other means.

In this way, the iridium oxide ($IrO_2$) supported mesh electrode 149 in which iridium oxide ($IrO_2$) powder 148 is supported on the titanium (Ti) mesh 146 is produced. On the titanium (Ti) mesh 146, the iridium oxide ($IrO_2$) particles are uniformly arranged in a single layer (monolayer). By arranging this iridium oxide ($IrO_2$) supported mesh electrode 149 on the anode side of the water electrolysis portion 100 of each embodiment, oxygen water can be generated. Since only the minimum amount of catalyst particles is required, a catalyst electrode can be produced at a low cost.

An implementation in which iridium oxide ($IrO_2$) powder 148 is supported in a single layer on the polymer electrolyte membrane 120 is also possible. The same method of transferring boron-doped diamond (BDD) powder 145 onto the polymer electrolyte membrane 120 as described above can be applied to the method of producing such a polymer electrolyte membrane with a catalyst electrode.

In the above, a titanium (Ti) mesh was used as the mesh electrode, and an implementation using a metal mesh other than titanium (Ti) is also possible.

The implementation of supporting iridium oxide ($IrO_2$) powder has been described, and an implementation of supporting hydrophilic catalyst particles such as other metal oxides is also possible in a similar manner.

The catalyst particle-supported mesh electrode or the polymer electrolyte membrane with catalyst electrode of the twelfth embodiment can be applied to the first embodiment to the eleventh embodiment.

The size of the water electrolysis apparatus 1 of each embodiment is determined according to the flow rate of water. When a large flow rate of water is required, the housing 300 and the water electrolysis portion 100 may be enlarged to increase the electrode area and the volume of the gas-liquid mixing portion 200.

The water electrolysis apparatus 1 of each embodiment can be produced in consideration of the pressure loss. For example, when the water electrolysis apparatus 1 illustrated in FIG. 9 is to be produced as a device to flow water at 10 L/min, the pressure loss is about 0.1 MPa. When further reduction of the pressure loss is desired, sectional areas of the housing 300, the water electrolysis portion 100, and the gas-liquid mixing portion 200 may be increased, or the parallel type water electrolysis portion 400 illustrated in FIG. 8 may be used.

Hereinafter, Examples will be described.

Example 1

Figure 12:
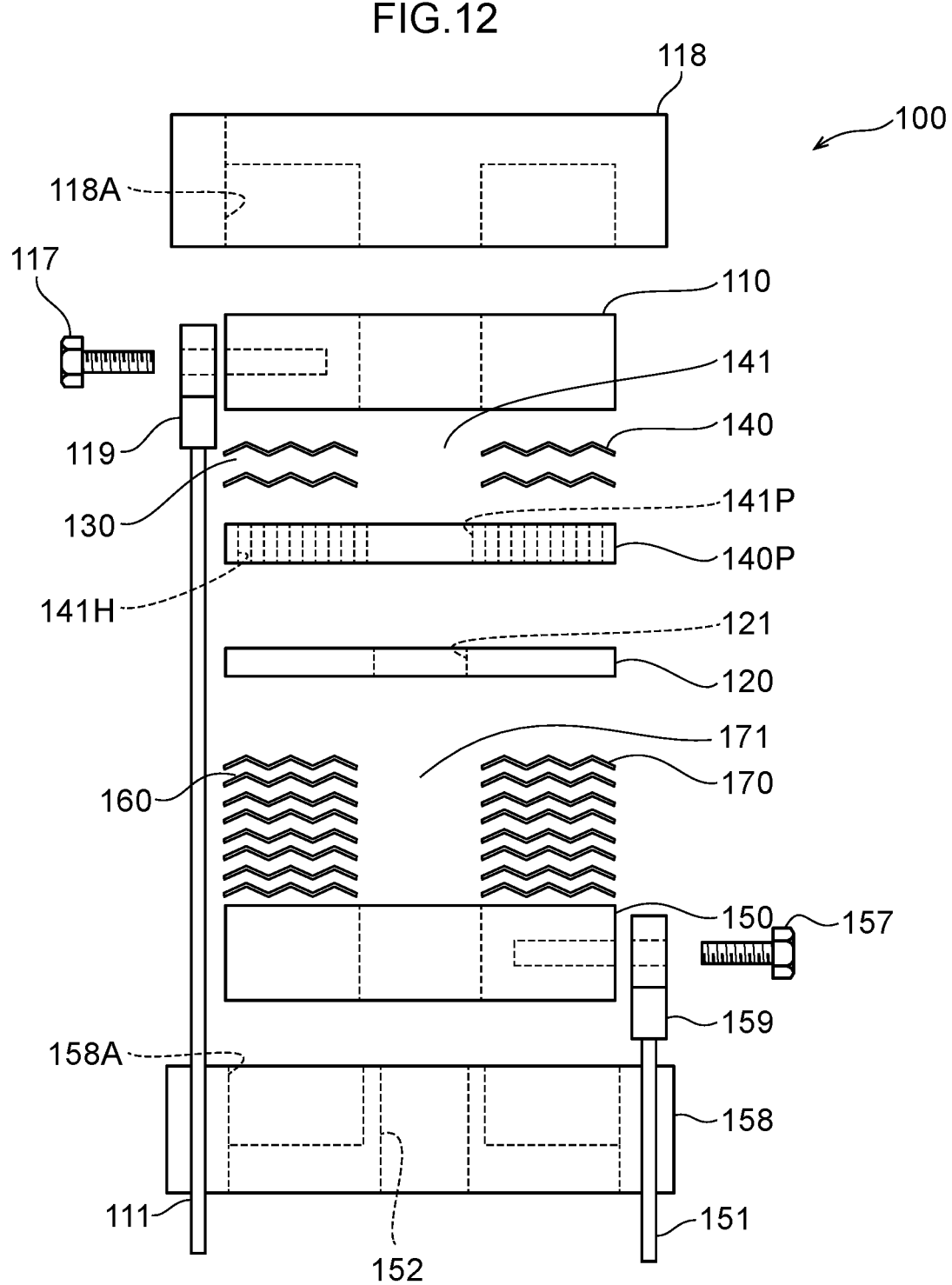
FIG. 12 is a diagram illustrating Example 1, which is an exploded view of the water electrolysis portion.

A water electrolysis apparatus 1 was configured by placing a water electrolysis portion 100 with an outer diameter of 47 mm and a height of 22 mm having the configuration illustrated in FIG. 12 in a housing 300 with an inner diameter of 50 mm having the configuration illustrated in FIG. 1.

FIG. 12 illustrates the water electrolysis portion 100 in an exploded view in the same manner as FIG. 7. On the anode side, two 80-mesh titanium (Ti) mesh electrodes 140 and a 0.5-mm-thick boron-doped diamond (BDD) substrate electrode 140P were placed. On the cathode side, eight 80-mesh titanium (Ti) mesh electrodes 170 were placed. An anode side mesh electrode 140, a substrate electrode 140P, and a cathode side mesh electrode 170 are annular with an outer diameter of 35 mm and an inner diameter (diameter of an inner side opening) of 11 mm. A Nafion 117 membrane was inserted between the anode side and the cathode side as a polymer electrolyte membrane 120. The size of the polymer electrolyte membrane 120 is 10 mm in inner diameter and 36 mm in outer diameter.

Water electrolysis was carried out by flowing tap water at a flow rate of 2.4 L/min from an inlet 310 on the upper side of the housing 300 illustrated in FIG. 1, and applying a current of from 1 to 3 A between the anode 110 and the cathode 150 illustrated in FIG. 12. Functional water as electrolytic water in which anode water and cathode water were mixed was taken out from the outlet 320 on the lower side of the housing 300.

It is considered that water flowed to the anode side at a flow rate of 0.5 L/min and to the cathode side at a flow rate of 1.9 L/min.

Figure 13:
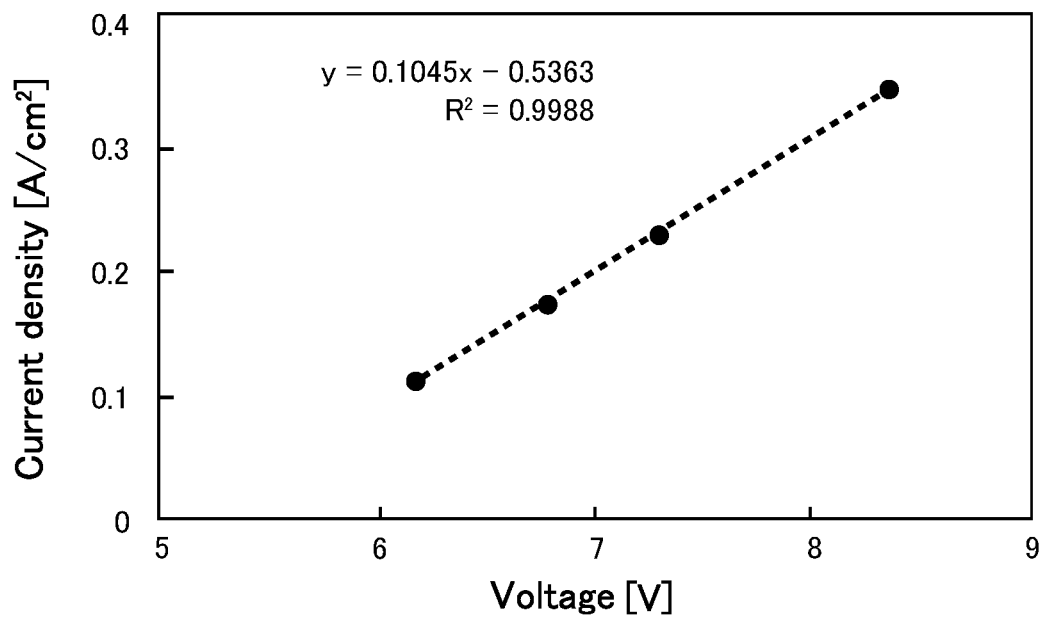
FIG. 13 is a diagram illustrating the voltage-current characteristics of the water electrolysis apparatus of Example 1.

The voltage-current characteristics of the water electrolysis apparatus 1 of Example 1 is illustrated in FIG. 13.

From FIG. 13, it can be seen that the resistance of the water electrolysis apparatus 1 was low and a current of 1 A (0.12 A/cm$^2$) flowed at a voltage of 6.2 V and a current of 3 A (0.35 A/cm$^2$) flowed at a voltage of 8.4 V. It can be seen that the current increases in proportion to the voltage.

Figure 14:
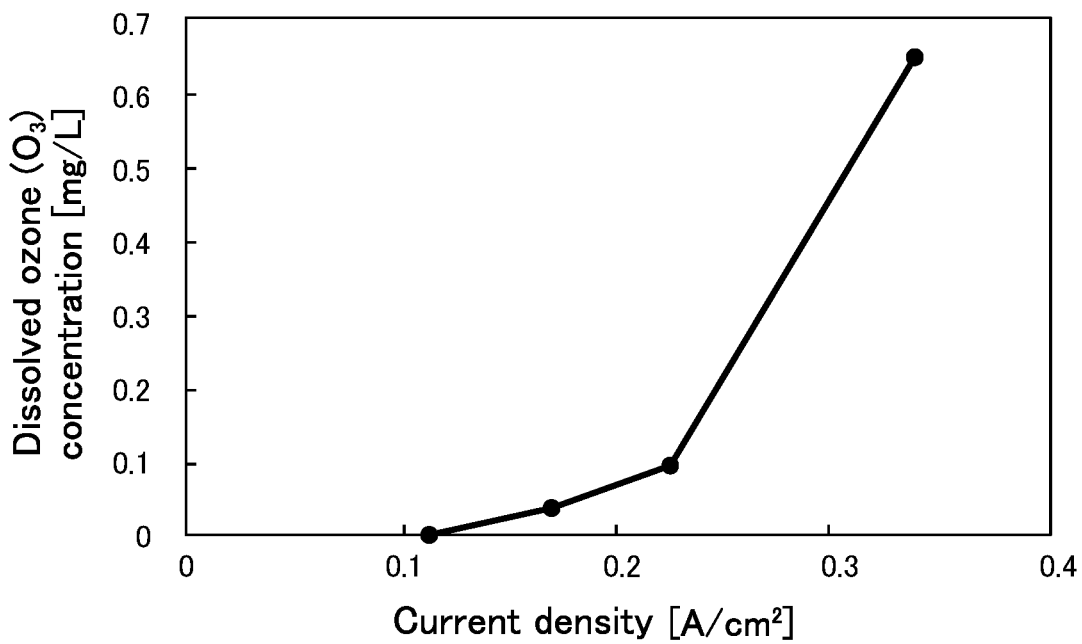
FIG. 14 is a diagram illustrating the dissolved ozone concentration in generated functional water in Example 1.

The dissolved ozone concentration in the generated functional water is illustrated in FIG. 14.

From FIG. 14, it can be seen that the dissolved ozone concentration increases significantly when the current density exceeds 0.2 A/cm$^2$.

Figure 15:
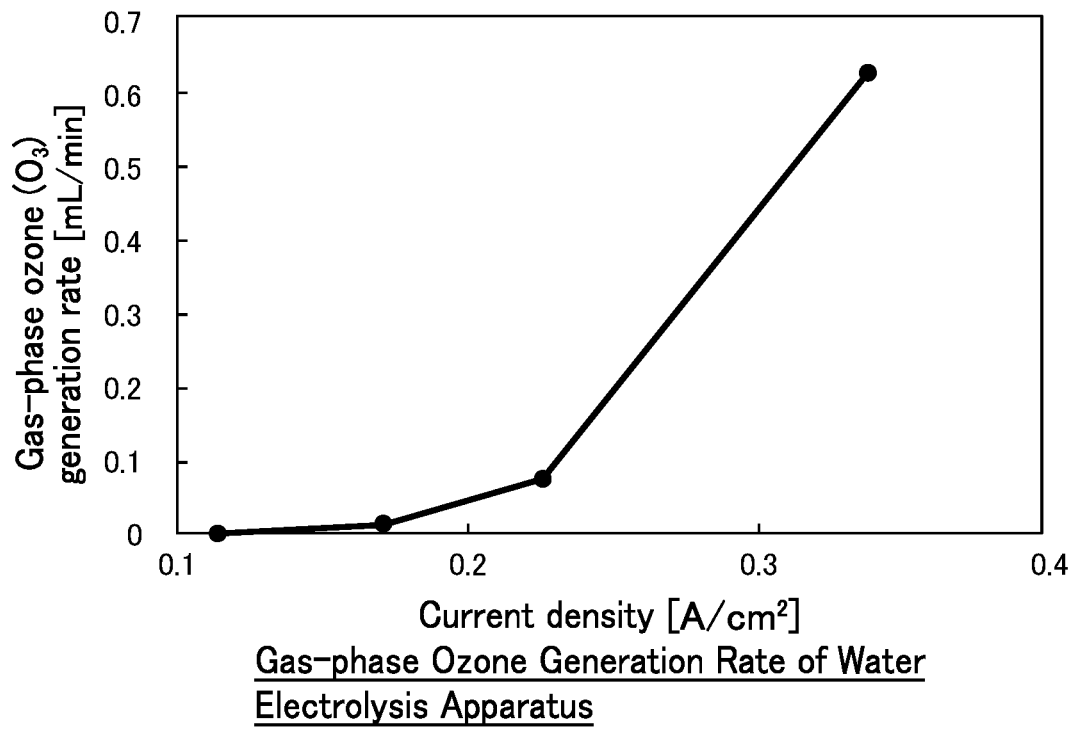
FIG. 15 is a diagram illustrating the gas-phase ozone generation rate in Example 1.

The gas-phase ozone generation rate is illustrated in FIG. 15.

From FIG. 15, it can be seen that when the current density is from 0.12 A/cm$^2$ (1 A) to 0.17 A/cm$^2$ (1.5 A), generation of gas-phase ozone is small and the apparatus can be operated safely. However, it can be seen that when the current density exceeds 0.23 A/cm$^2$ (2 A), generation of gas-phase ozone increases and is dangerous.

Figure 16:
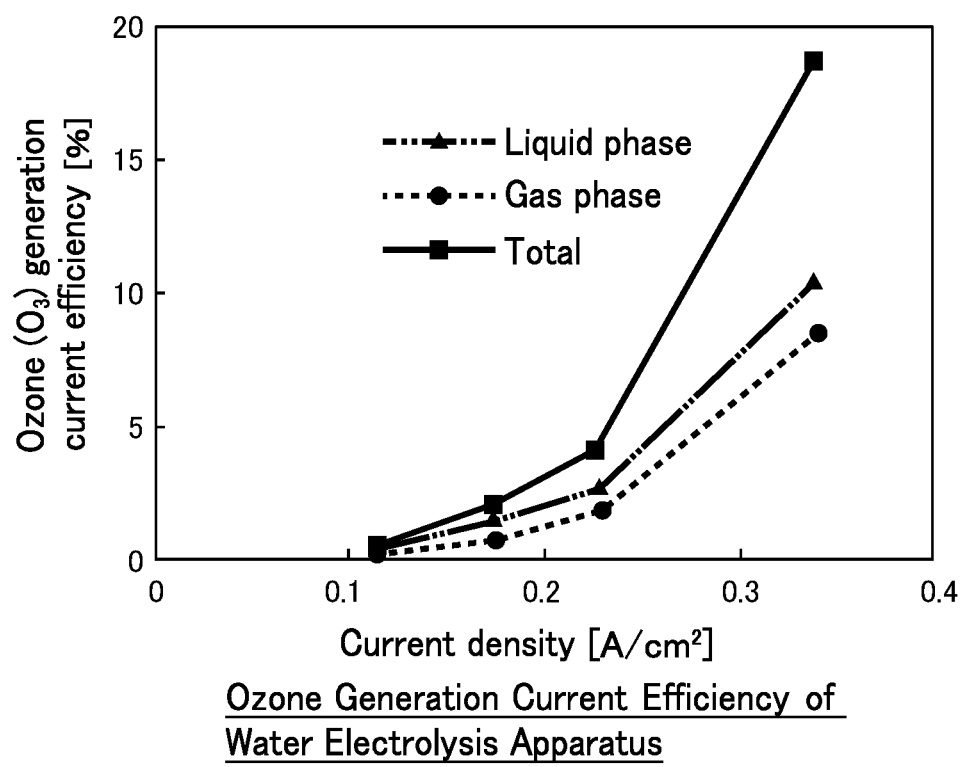
FIG. 16 is a diagram illustrating the ozone generation current efficiencies of gas-phase ozone, liquid-phase ozone, and the sum of gas-phase and liquid-phase ozone in Example 1.

FIG. 16 illustrates the ozone generation current efficiencies of gas-phase ozone, liquid-phase ozone, and the sum of gas-phase and liquid-phase ozone.

As can be seen from FIG. 16, a current efficiency of nearly 20% was obtained when the current density was 0.35 A/cm$^2$ (3 A), but at lower current densities, the current efficiency was less than 5%.

At both current densities, the generation efficiency of gas-phase ozone and liquid-phase ozone was almost equal (about 1:1), and the ozone gas was not well dissolved in the water and was released as gas. The reason for this is thought to be due to reasons such as gas-liquid mixing was not promoted because the water flow rate to the anode side was low, or gas accumulated between anode side mesh electrodes, covering the electrodes and reducing the effective catalytic area.

Figure 17:
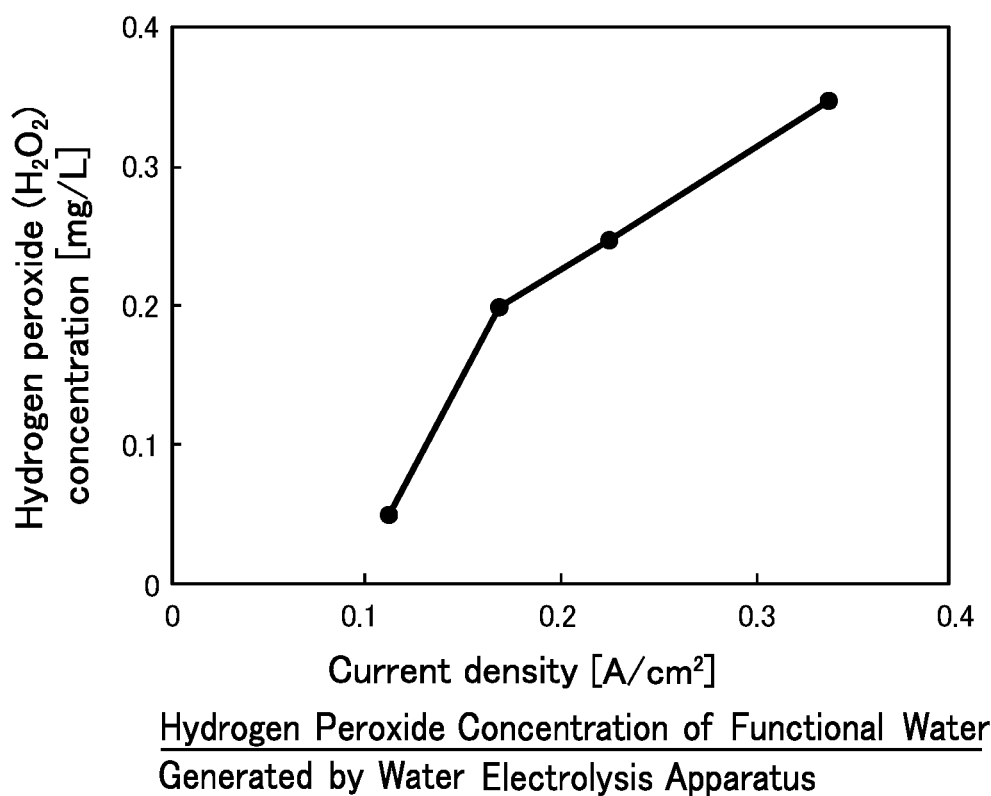
FIG. 17 is a diagram illustrating the hydrogen peroxide concentration in the generated functional water in Example 1.

FIG. 17 illustrates the hydrogen peroxide concentration in the generated functional water.

From FIG. 17, it can be seen that at current densities of 0.23 A/cm$^2$ (2 A) or lower, more hydrogen peroxide is generated than dissolved ozone.

According to Example 1, it was found that even a simple water electrolysis apparatus 1 can obtain an ozone generation current efficiency of nearly 20% (see FIG. 16) by selecting operation conditions. It was found that hydrogen peroxide of the same concentration as dissolved ozone could be generated. It was found that the flow rate of water on the anode side should be increased.

Example 2

Experiments to examine the effects of the material of the electrode used on the cathode side, the flow rate of water to the cathode side, and the current density on the pH of cathode side electrolytic water generated during water electrolysis were conducted.

In this experiment, a two-chamber type water electrolysis apparatus 1, similar to the two-chamber type water electrolysis apparatus 1 illustrated in FIG. 6, was used.

On the anode side, two 80-mesh titanium (Ti) mesh electrodes (anode side mesh 140) and one 0.5-mm thick boron-doped diamond (BDD) substrate electrode 140P were placed. On the cathode side, three 80-mesh titanium (Ti) mesh electrodes (cathode side mesh 170) were placed on the cathode 150 side.

On the cathode side, one 80-mesh titanium (Ti) mesh electrode 170 or one 80-mesh platinum (Pt) mesh electrode 170 was placed as an electrode in contact with the polymer electrolyte membrane 120 (Nafion 117 membrane), and the change in pH of cathode side electrolytic water due to the difference in the material of the electrode on the cathode side was examined. The anode side mesh electrode 140, the anode side substrate electrode 140P, and the cathode side mesh electrode 170 are all electrodes formed in an annular shape. The electrode area of all electrodes is 7.6 cm$^2$.

The flow rate of tap water flowing into the water electrolysis apparatus 1 was set at 1.1 L/min for the anode side and 2.0 L/min for the cathode side, and water flowed from the outer periphery of the anode side mesh electrode 140 and the cathode side mesh electrode 170 toward the inner side opening as illustrated in FIG. 6.

Figure 18:
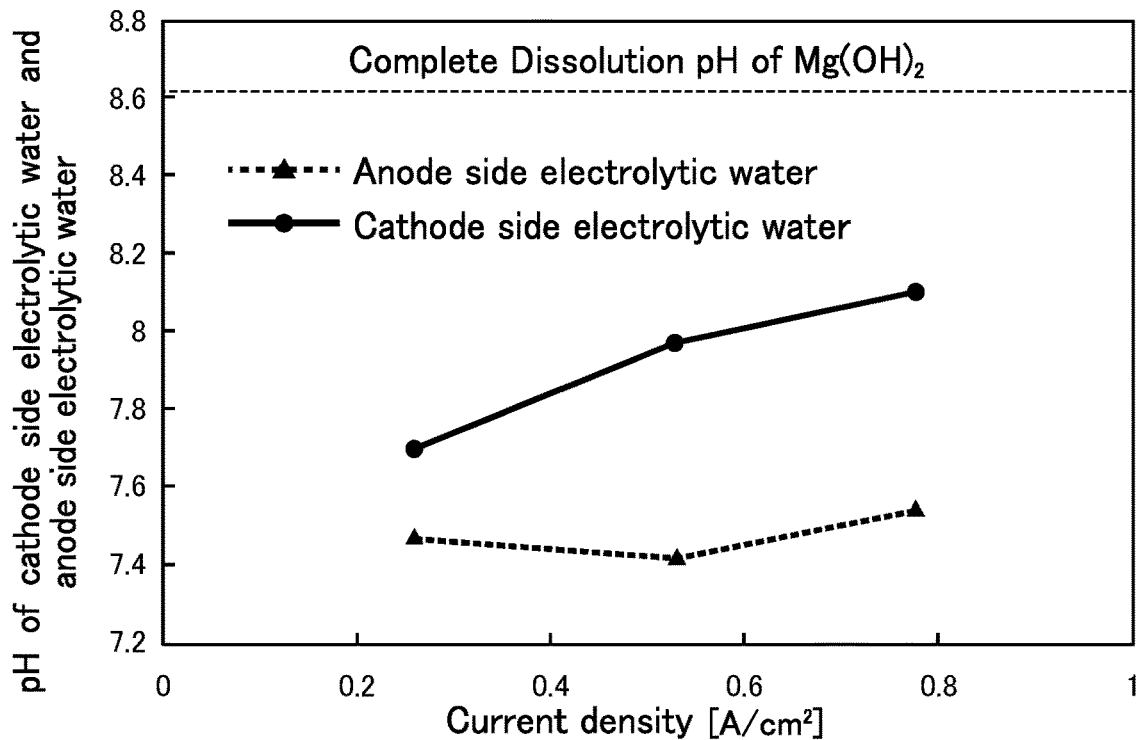
FIG. 18 is a diagram illustrating the pH of the anode side electrolytic water and the cathode side electrolytic water in Example 2.

FIG. 18 illustrates the pH of anode side electrolytic water and cathode side electrolytic water when an 80-mesh platinum (Pt) mesh electrode (cathode side mesh 170) is used as the cathode side mesh electrode (cathode side mesh 170) in contact with the polymer electrolyte membrane 120.

Figure 19:
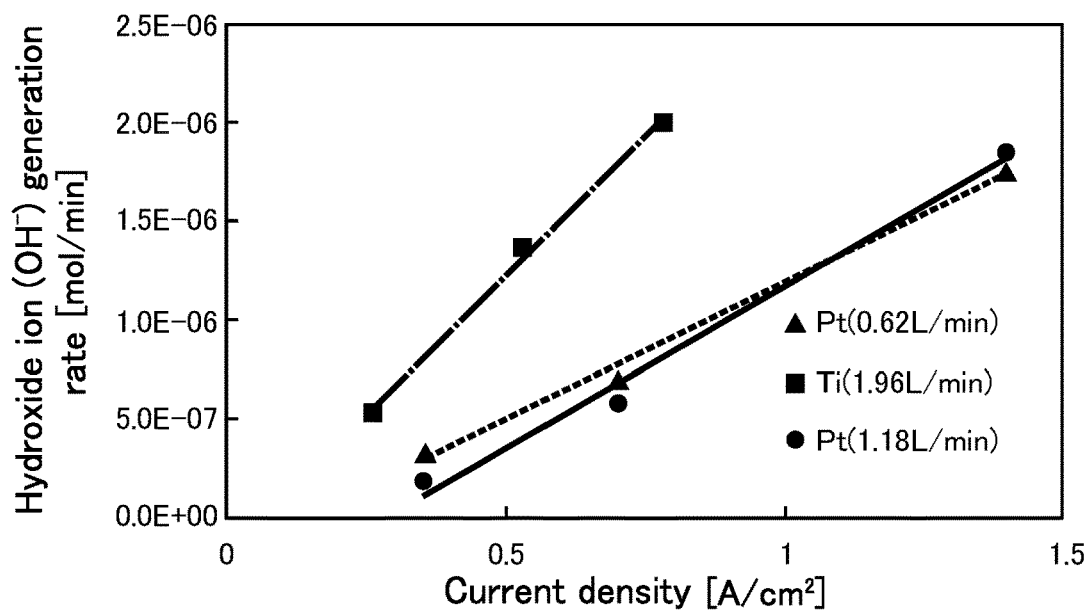
FIG. 19 is a diagram illustrating the difference in the generation rate of hydroxide ion $OH^-$ when a platinum (Pt) mesh electrode and a titanium (Ti) mesh electrode are used as the cathode side mesh electrode in contact with the polymer electrolyte membrane in Example 2.

FIG. 19 illustrates the difference in generation rate of hydroxide ion OH$^-$ when a platinum (Pt) mesh electrode and a titanium (Ti) mesh electrode were used as the cathode side mesh electrode 170 in contact with the polymer electrolyte membrane 120. The numerical value in parentheses ( ) in the figure is the flow rate of the cathode side electrolytic water.

Currents of 2 A, 4 A, and 6 A were flowed between the anode 110 and the cathode 150 of the water electrolysis apparatus 1, and the pH change of cathode side electrolytic water and the generation rate of hydroxide ion OH$^-$ were measured.

From FIG. 18, it can be seen that when an 80-mesh platinum (Pt) mesh electrode 170 is used on the cathode side, the pH rise of the cathode side electrolytic water is small at any current density. It can be seen that the pH of the cathode side electrolytic water is below the pH value of 8.6, which is the saturation solubility expected when all of the Mg$^{2+}$ ions (about 5 mg/L) contained in raw water become magnesium hydroxide Mg(OH)$_2$.

From FIG. 18, it can be determined that by using a platinum (Pt) mesh for the cathode side mesh electrode 170, operation can be carried out for a long time without mineral deposition on the cathode side electrode.

On the other hand, when an 80-mesh titanium (Ti) mesh electrode (cathode side mesh 170) was used as the cathode side mesh electrode 170 in contact with the polymer electrolyte membrane 120, the pH of cathode side electrolytic water, or the generation rate of hydroxide ion OH$^-$, increased, as illustrated in FIG. 19.

From FIG. 19, it can be seen that the generation rate of hydroxide ion OH$^-$ when using a platinum (Pt) mesh electrode (cathode side mesh electrode 170) is about half that of the generation rate of hydroxide ion OH$^-$ when using a titanium (Ti) mesh electrode (cathode side mesh electrode 170).

It is found that the flow rate of cathode side electrolytic water has no effect on the generation rate of hydroxide ions OH$^-$, and that the generation rate of hydroxide ions OH$^-$ is determined by the electrode material and the current density.

In particular, when a platinum (Pt) mesh electrode (cathode side mesh electrode 170) is used, the generation rate of hydroxide ion OH$^-$ can be made nearly zero when the current density is 0.5 A/cm' or less.

Therefore, the water electrolysis apparatus 1 using a platinum (Pt) mesh electrode for the cathode side mesh electrode 170 is optimal for applications of electrolyzing water with high hardness, such as tap water in China and Europe.

In the experiment of Example 2, since soft water was used as raw water, no deposition of minerals occurred even when either a platinum (Pt) mesh electrode or a titanium (Ti) mesh electrode was used as the cathode side mesh electrode 170.

However, when using raw water with high hardness, such as tap water in China or Europe, it is desirable to use a platinum (Pt) mesh electrode for the cathode side mesh electrode 170. By using a platinum (Pt) mesh electrode for the cathode side mesh electrode 170 and conducting water electrolysis at a low current density of 0.5 A/cm' or less, electrodeposition of minerals can be prevented.

When soft water with low hardness, such as Japanese tap water, is used as the raw water, a titanium (Ti) mesh electrode or stainless-steel mesh electrode with a relatively high hydrogen overvoltage can be used for the cathode side mesh electrode 170.

From FIG. 19, it can be seen that, for example, when a titanium (Ti) mesh electrode is used as the cathode side mesh electrode 170, it is preferable to set the current density to 0.75 A/cm' or less and flow water at a flow rate of 1 L/min or more on the cathode side in order to suppress electrodeposition of minerals.

Since the generation rate of hydroxide ions OH$^-$ at this time is $2\times10^{-8}$ mol/min, even when the pH of tap water used as the raw water is as high as 8.0, the pH of the cathode side electrolytic water is about 8.5, which is thought to suppress electrodeposition of minerals.

Comparative Example 1

Comparative Examples to Example 2 will be described.

An experiment to determine whether or not electrodeposition of minerals would be a problem when boron-doped diamond (BDD), which has a relatively high hydrogen overvoltage, was used as the cathode side mesh electrode 170 was conducted.

In this experiment, as in Example 2, a two-chamber type water electrolysis apparatus 1 illustrated in FIG. 6 was used.

On the anode side, two 80-mesh titanium (Ti) mesh electrodes (anode side mesh electrode 140) and one 0.5-mm-thick boron-doped diamond (BDD) substrate electrode 140P were placed. On the cathode side, two 80-mesh titanium (Ti) mesh electrodes (cathode side mesh electrode 170) were placed in contact with the cathode 150.

On the cathode side, one 0.5 mm thick boron-doped diamond (BDD) substrate electrode 170P was placed as the electrode in contact with the polymer electrolyte membrane 120 (Nafion 117 membrane).

The anode side mesh electrode 140, the anode side substrate electrode 140P, the cathode side mesh electrode 170, and cathode side substrate electrode 170P are all electrodes formed in an annular shape. The electrode area of all electrodes is 7.6 cm$^2$.

The flow rate of tap water which is raw water flowing into the water electrolysis apparatus 1 was set at 2 L/min and 1 L/min for the anode side and 1 L/min for the cathode side, and water flowed from the outer periphery of the anode side mesh electrode 140 and the cathode side mesh electrode 170 toward the inner side opening as illustrated in FIG. 6.

When a current of 0.4 A/cm$^2$ (3 A) was applied to the water electrolysis apparatus 1, the pH of cathode side electrolytic water increased to 9.3, and the voltage increased from 9 V to 13 V during 4 hours of operation, confirming deterioration of the water electrolysis apparatus 1.

After operation was stopped, the water electrolysis apparatus 1 was disassembled and inspected, and a large amount of minerals were deposited on the cathode surface of the boron-doped diamond (BDD) substrate electrode 170P and the polymer electrolyte membrane 120 on the cathode side.

As described above, when a boron-doped diamond (BDD) substrate electrode 170P is used on the cathode side, the generation rate of hydroxide ions OH$^-$ increases and the pH of cathode side electrolytic water rises, resulting in mineral precipitation, which is determined to be unfavorable. It is desirable to use an electrode made of a material such as platinum (Pt) or titanium (Ti) with low hydrogen overvoltage for the cathode side in order to suppress mineral precipitation.

Example 3

Based on the results of Example 1, Example 2, and Comparative Example 1, an experiment of generating advanced oxidation water by optimizing the type of mesh electrodes used in the water electrolysis apparatus 1 and operating conditions was conducted.

In this experiment, the water electrolysis apparatus 1 in which the water electrolysis portion 100 and the gas-liquid mixing portion 200 are arranged in the housing 300 illustrated in FIG. 9 was used.

Figure 20:
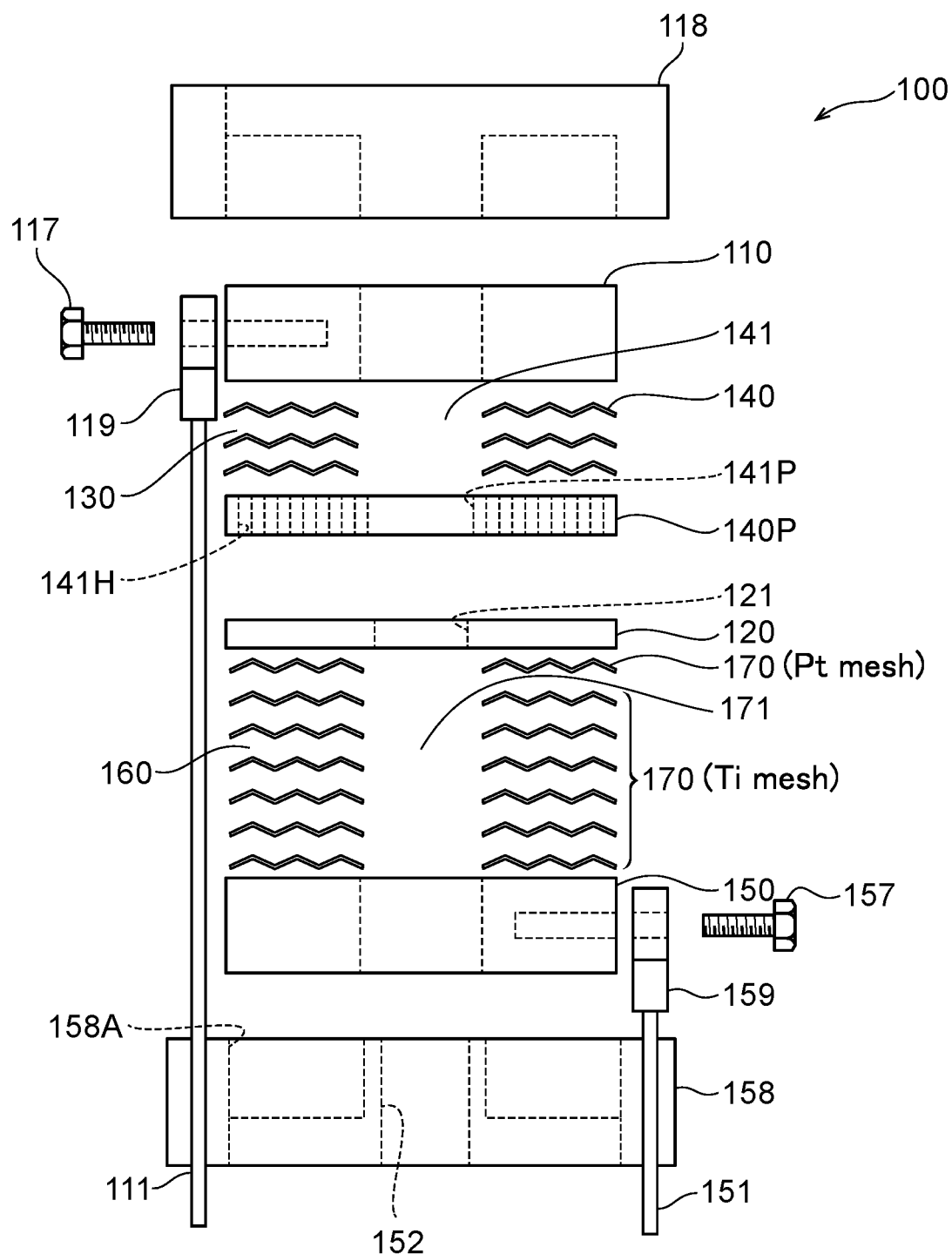
FIG. 20 is a diagram illustrating Example 3, which is an exploded view of the water electrolysis portion.

A water electrolysis portion 100 with an outer diameter of 47 mm having the configuration illustrated in FIG. 20 was placed in the housing 300 with an inner diameter of 50 mm having the configuration illustrated in FIG. 9. FIG. 20 illustrates the water electrolysis portion 100 in an exploded view as in FIG. 7 and FIG. 12.

On the anode side, three 80-mesh titanium (Ti) mesh electrodes 140 and one 0.5-mm thick boron-doped diamond (BDD) substrate electrode 140P were placed. On the cathode side, six 80-mesh titanium (Ti) mesh electrodes 170 were placed in contact with the cathode 150.

On the cathode side, one 80-mesh platinum (Pt) mesh electrode (cathode side mesh electrode 170) was placed as an electrode in contact with the polymer electrolyte membrane 120 (Nafion 117 membrane).

The anode side mesh electrode 140, the anode side substrate electrode 140P, and the cathode side mesh electrode 170 are circular with an outer diameter of 35 mm and an inner diameter of 11 mm, and the electrode area is 8.6 cm$^2$.

As illustrated in FIG. 9, water was supplied from the lower side of the water electrolysis apparatus 1 and flowed from the inner side openings of the anode side mesh electrode 140 and the cathode side mesh electrode 170 toward the outer periphery.

Tap water at 3.0 L/min was supplied as raw water, and water electrolysis was carried out by applying a current of from 0.12 A/cm$^2$ to 0.35 A/cm$^2$ (1 to 3 A) between the anode 110 and the cathode 150. Advanced oxidation water in which ozone and hydrogen peroxide were mixed was taken out from the outlet 320 of the housing 300.

Figure 21:
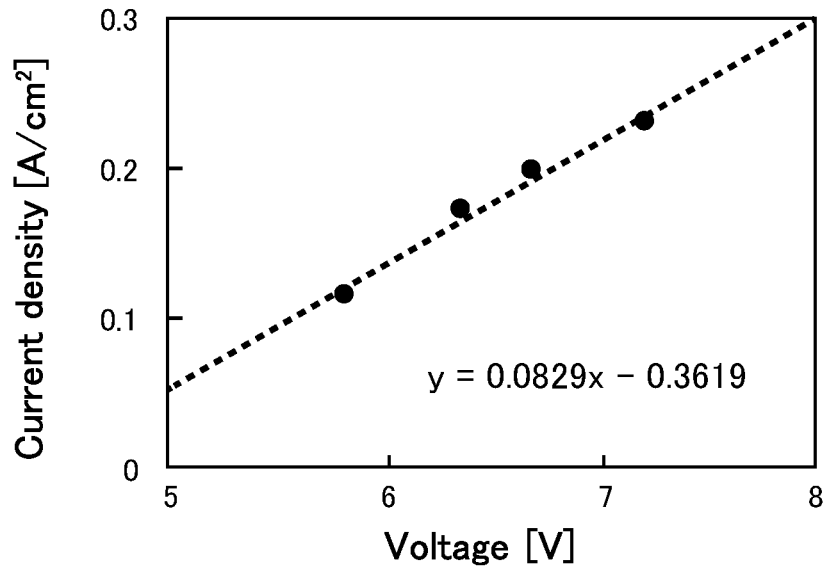
FIG. 21 is a diagram illustrating the voltage-current characteristics of the water electrolysis apparatus of Example 3.

The voltage-current characteristics of the water electrolysis apparatus 1 of Example 3 are illustrated in FIG. 21.

From FIG. 21, it can be seen that due to the optimized electrode structure in Example 3, a current of from 1 to 3 A can flow at a lower voltage compared to the voltage-current characteristics in Example 1 in FIG. 17.

Figure 22:
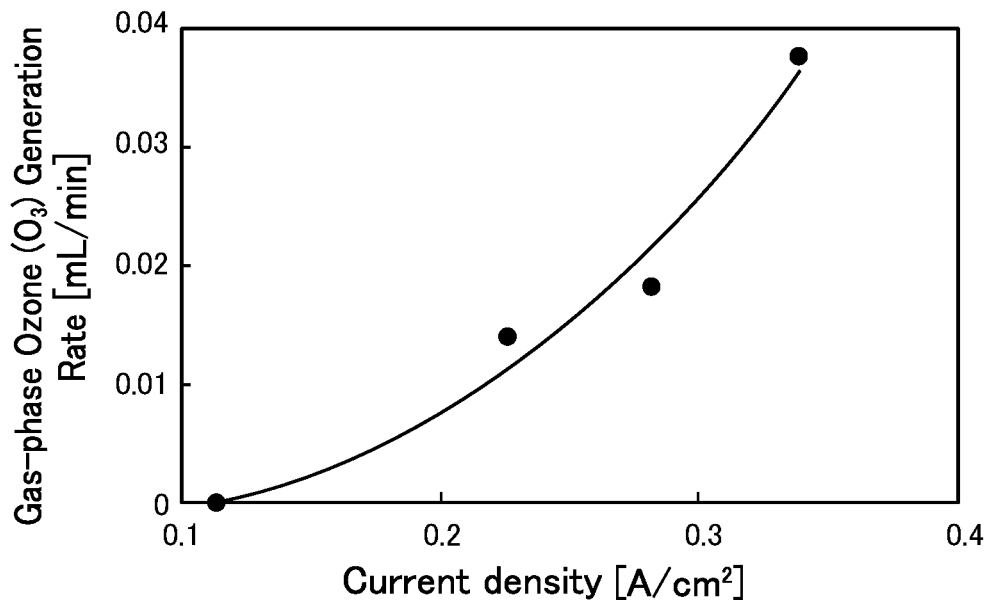
FIG. 22 is a diagram illustrating the gas-phase ozone generation rate in Example 3.

The gas-phase ozone generation rate was examined by changing the current density. The gas-phase ozone generation rate is illustrated in FIG. 22.

The standard gas-phase ozone generation rate that makes the gas-phase ozone free is considered to be 0.01 mL/min. From FIG. 22, it can be seen that gas-phase ozone can be made free when the current density is 0.2 A/cm$^2$ (1.7 A) or less.

Figure 23:
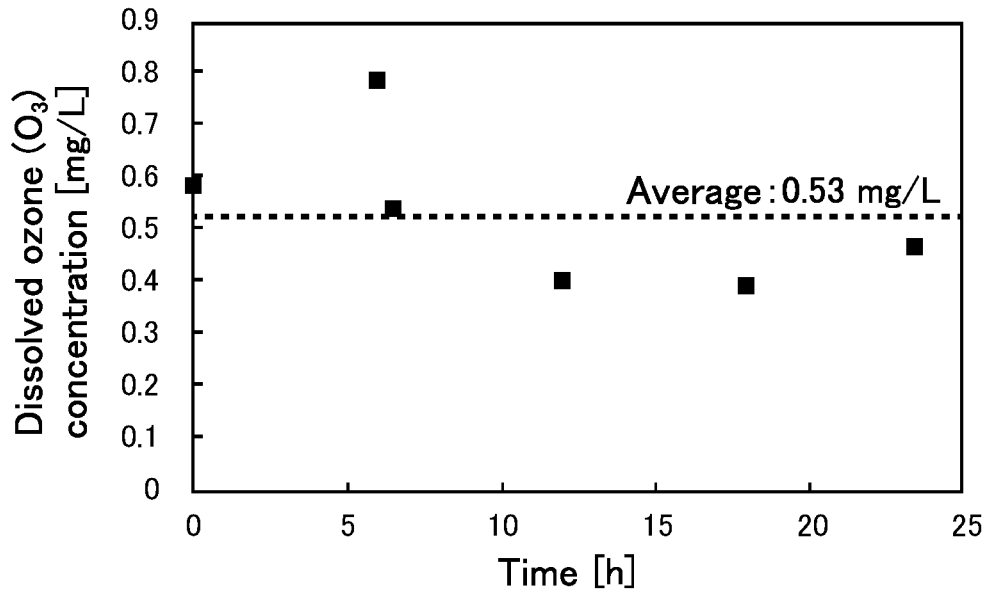
FIG. 23 is a diagram illustrating the dissolved ozone concentration after 24 hours of water electrolysis at a current density of 0.2 A/cm$^2$ (1.7 A) in Example 3.

FIG. 23 illustrates the dissolved ozone concentration when water electrolysis is continued for 24 hours at 0.2 A/cm$^2$ (1.7 A), which is the current density that can make gas-phase ozone free.

Figure 24:
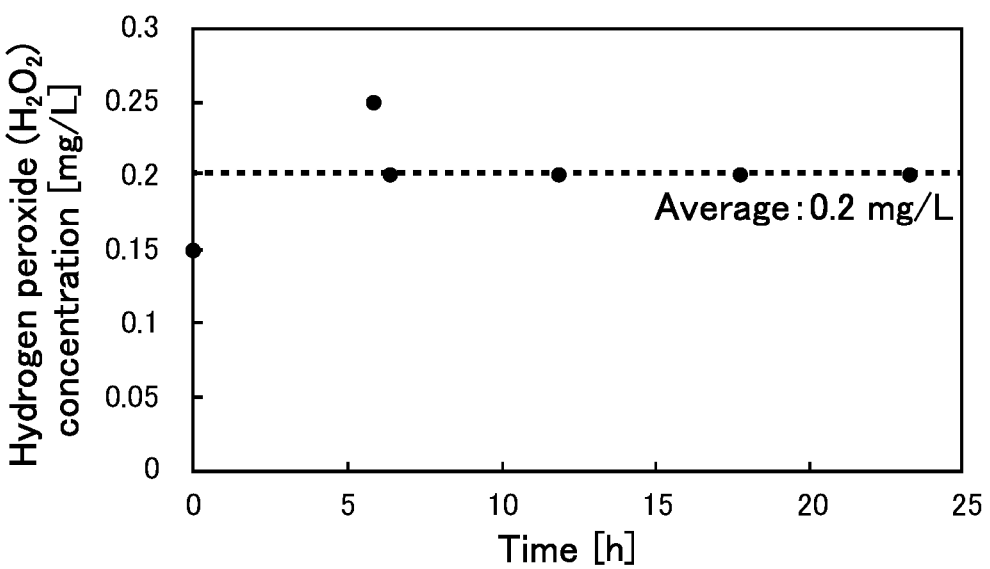
FIG. 24 is a diagram illustrating the hydrogen peroxide concentration after 24 hours of operation at a current density of 0.2 A/cm$^2$ (1.7 A) in Example 3.

The hydrogen peroxide concentration is illustrated in FIG. 24.

From FIG. 23 and FIG. 24, it can be seen that the water electrolysis apparatus 1 of Example 3 stably generates advanced oxidation water containing 0.5 mg/L of ozone and 0.2 mg/L of hydrogen peroxide in a gas-phase ozone-free state.

Figure 25:
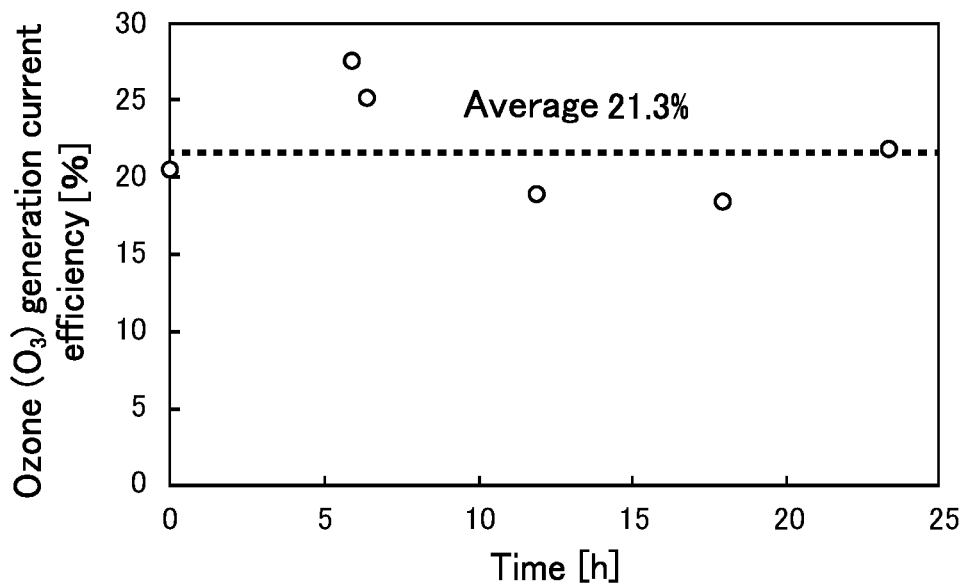
FIG. 25 is a diagram illustrating the change in ozone generation current efficiency over time when operating for 24 hours at a current density of 0.2 A/cm$^2$ (1.7 A) in Example 3.

FIG. 25 illustrates the change over time of the ozone generation current efficiency during 24 hours of operation at a current density of 0.2 A/cm$^2$ (1.7 A).

From FIG. 25, it is found that the average ozone generation current efficiency is stable at as high as 21.3%.

As described above, according to the water electrolysis apparatus 1 in Example 3, advanced oxidation water can be generated with high efficiency.

Example 4

Using the water electrolysis apparatus 1 of Example 3, an endurance test was conducted with only the polymer electrolyte membrane 120 (Nafion 117 membrane) of the water electrolysis apparatus 1 in a new state.

The flow rate of water and other conditions were the same as in Example 3, and continuous operation was carried out for 120 hours (7,200 minutes) at a constant current density of 0.2 A/cm$^2$.

During continuous operation, advanced oxidation water containing 0.5 mg/L of dissolved ozone and 0.2 mg/L of hydrogen peroxide could be generated stably except when water was supplied at a flow rate of 4.0 L/min.

Figure 26:
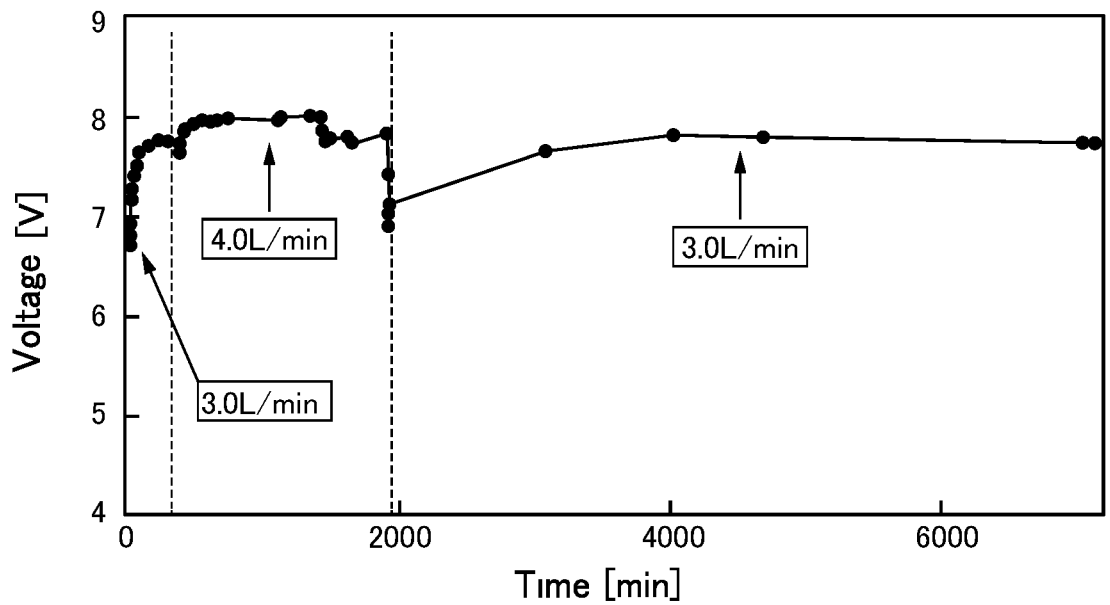
FIG. 26 is a diagram illustrating the change in voltage over time in an endurance test of Example 4.

The change in voltage over time in this endurance test is illustrated in FIG. 26.

From FIG. 26, it can be seen that when the flow rate of water is increased to 4.0 L/min, the voltage increases by about from 0.2 to 0.3 V, but when the flow rate of water is returned to the original 3.0 L/min, the voltage also returns to the original level.

The ozone generation current efficiency after 120 hours of operation was 20.6%, which is almost the same value as in Example 3. This indicates that no degradation of the water electrolysis apparatus 1 occurred at all.

At a water flow rate of 4.0 L/min, advanced oxidation water containing dissolved ozone with a concentration of 0.4 mg/L could be generated.

After 120 hours of continuous operation, electrodeposition of minerals on the electrode was examined using an electronic balance. As a result of the measurement, no electrodeposition occurred at all, and there was no change in the weight of the cathode side mesh electrode before and after the experiment.

It was found that by optimizing the type of catalyst used in the water electrolysis apparatus 1 and the operating conditions, long and stable operation was possible.

While the advanced oxidation water generated during the experiment was poured into a 4 L bucket and overflowed, the ozone gas concentration was examined at the heights of 10 cm and 20 cm just above the water surface of the bucket using the Kitagawa ozone gas detector. As a result, the ozone gas concentration was 0.05 ppmv at 10 cm directly above the bucket and 0 ppmv at 20 cm directly above the bucket, confirming safety.

During the operation, the advanced oxidation water was collected into a spectroscopic cell with a 1 cm optical path length, and the change in dissolved ozone concentration in the cell was examined over time.

Figures 27, 28:
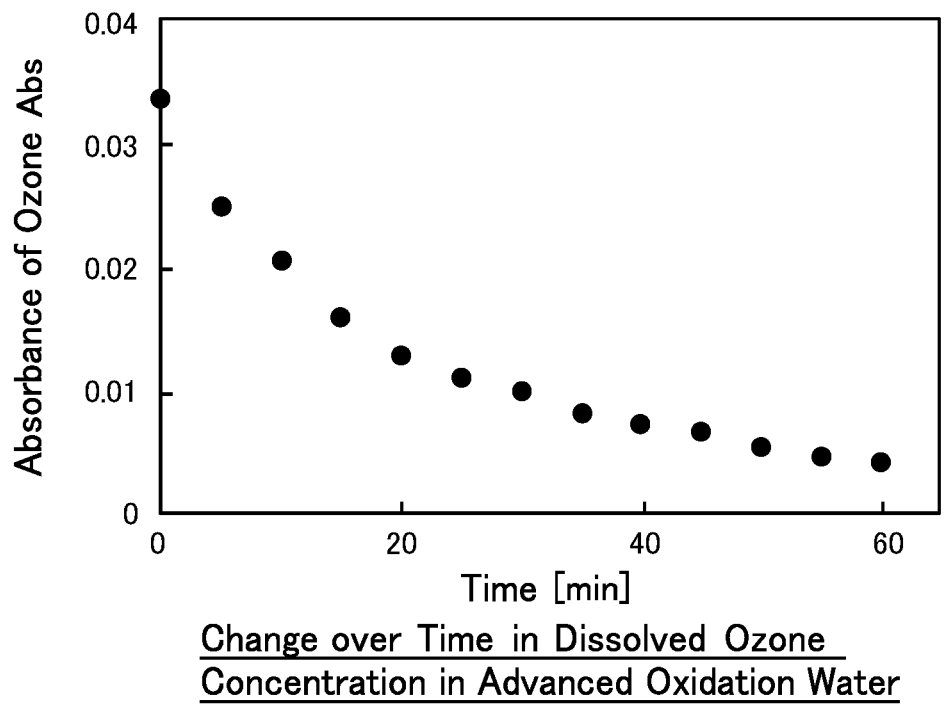
FIG. 27 is a diagram illustrating the decrease in dissolved ozone concentration over time in Example 4.
FIG. 28 is a diagram illustrating the concentrations of liquid-phase ozone ($O_3$) and hydrogen peroxide ($H_2O_2$) at various current densities in Example 5 as a table.

The decrease in dissolved ozone concentration over time is illustrated in FIG. 27.

The initial ozone absorbance (Abs.) was 0.034 (dissolved ozone concentration; 0.54 mg/L), and it took only 15 minutes for the absorbance to be halved.

Since the half-life of ozone in normal ozonated water is about from 45 to 60 minutes, it was confirmed that ozone was consumed in the advanced oxidation reaction by hydrogen peroxide.

From the above, it was confirmed that the water electrolysis apparatus 1 of Example 3 can efficiently generate safe advanced oxidation water for a long time.

Example 5

Using the same apparatus as the water electrolysis apparatus 1 in Example 3, a water electrolysis experiment was conducted by replacing only the boron-doped diamond (BDD) substrate electrode 140P of the anode with a boron-doped diamond (BDD) supported mesh electrode 147 (80-mesh titanium (Ti) mesh).

A method of supporting boron-doped diamond (BDD) powder 145 on the titanium (Ti) mesh 146 is as described in FIG. 10.

Boron-doped diamond (BDD) powder 145 manufactured by Changsha 3 Better Ultra-hard Materials Co., Ltd. was used.

The particle size of the boron-doped diamond (BDD) powder 145 is 40/45 (large enough to pass through 40-mesh but not 45-mesh). The thickness of the mesh electrode 147 after supporting the boron-doped diamond (BDD) powder 145 was 0.53 mm.

The boron-doped diamond (BDD)-supported mesh electrode 147, like the anode side mesh electrode 140 and cathode side mesh electrode 170, is annular in shape with an outer diameter of 35 mm and an inner diameter of 11 mm, and has an electrode area of 8.6 cm$^2$.

The boron-doped diamond (BDD) powder 145 used in the experiment was adjusted with a low concentration of boron dopant to increase the resistance.

However, even when water electrolysis was carried out under the same conditions as in Example 4 (tap water flow rate; 3.0 L/min), a current of 1 A (0.115 A/cm$^2$) at 17.5 V and 1.32 A (0.153 A/cm$^2$) at 20 V could be achieved. The ozone generation current efficiency varied slightly depending on the current density, but as a whole from 7 to 10% was obtained.

It was confirmed that advanced oxidation water containing ozone and hydrogen peroxide could be stably generated even with boron-doped diamond (BDD) powder 145 in which the boron dopant concentration was adjusted to a low level to increase the resistance.

The concentrations of ozone ($O_3$) and hydrogen peroxide ($H_2O_2$) in the liquid phase at each current density are shown as a table in FIG. 28.

From FIG. 28, it can be seen that at a current of 1 A (0.115 A/cm$^2$), functional water containing 0.125 mg/L of ozone and 0.15 mg/L of hydrogen peroxide could be generated.

When the current was 1.32 A (0.153 A/cm$^2$), the dissolved ozone concentration increased to 0.193 mg/L.

The gas-phase ozone generation rate was much lower than 0.01 mL/min, which is a standard for gas-phase ozone free, and it was confirmed that functional water was generated safely under all conditions. The reason for this is thought to be that the amount of ozone generated was small and most of the ozone dissolved in water.

An endurance test was carried out with only the polymer electrolyte membrane 120 (Nafion 117 membrane) of the water electrolysis apparatus 1 in a new state.

The water electrolysis apparatus 1 was operated continuously for 4 hours with the current set to a constant current of 1.5 A (0.115 A/cm$^2$) and the flow rate of tap water, the raw water, set to 3.0 L/min.

Figure 29:
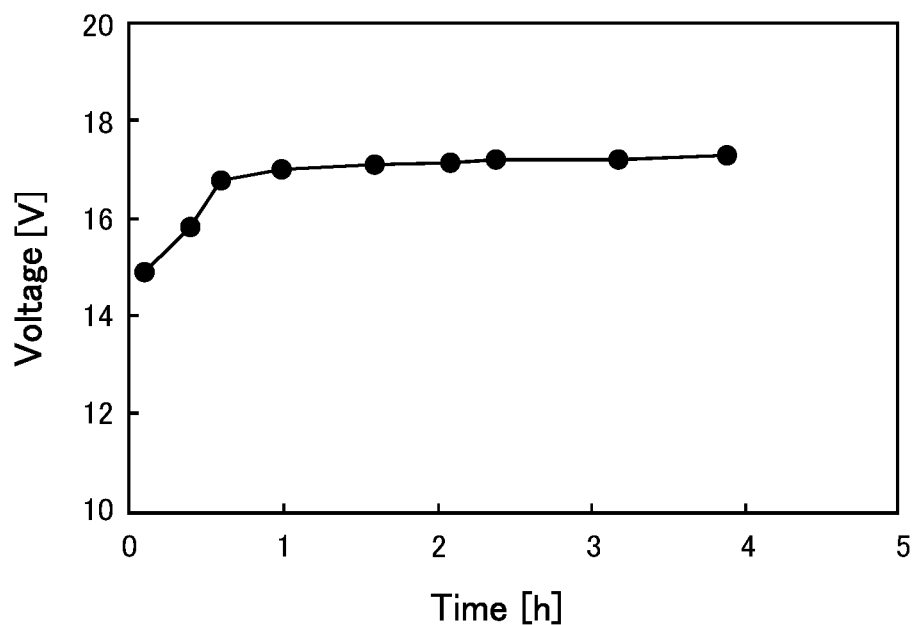
FIG. 29 is a diagram illustrating the change in voltage over time in an endurance test of Example 5.

The change in voltage over time in the endurance test is illustrated in FIG. 29.

From FIG. 29, it was confirmed that the voltage was stable and no degradation occurred in the water electrolysis apparatus 1. As long as the voltage is stable after from 4 to 5 hours of operation at constant current, no degradation of the water electrolysis apparatus 1 is expected to occur afterwards.

After 4 hours of operation, the water electrolysis apparatus 1 was disassembled and examined for the presence or absence of electrodeposition of minerals. As a result, it was confirmed that no electrodeposition occurred at all.

Therefore, it was confirmed that the water electrolysis apparatus 1 using boron-doped diamond (BDD) supported mesh electrode 147 as the anode side can be stably operated for a long time under a current density of 0.115 A/cm$^2$.

Furthermore, by using boron-doped diamond (BDD) powder with high boron dopant concentration and low resistance, a high quality boron-doped diamond (BDD) supported mesh electrode 147 can be produced. By placing such high-quality mesh electrodes 147 in the water electrolysis apparatus 1, it is expected that advanced oxidation water with high concentrations of ozone and hydrogen peroxide dissolved therein can be generated for a long time without degradation of the water electrolysis apparatus 1.

Reference Example

Hereinafter, the water electrolysis apparatus of Reference Example will be described below.

According to Example 3, advanced oxidation water containing 0.5 mg/L of ozone and 0.2 mg/L of hydrogen peroxide can be stably generated when 3.0 L/min of tap water is supplied as raw water and the current density is 0.2 A/cm$^2$ (1.7 A) or less. In this case, no damage to the polymer electrolyte membrane 120 (Nafion 117 membrane) was observed in the gas-phase ozone-free condition.

The electrode area of the water electrolysis apparatus 1 in Example 3 is as small as 8.6 cm$^2$, achieving miniaturization.

Therefore, Reference Example that addresses the following problems will be described.

(Problems)

(1) To increase the concentration of dissolved ozone (DO$_3$) and hydrogen peroxide (H$_2$O$_2$) in advanced oxidation water.

(2) To increase the flow rate of water.

(3) To prevent damage to the electrolyte membrane 120 (Nafion 117 membrane).

In order to achieve the above (1), (2) and (3), the electrode area of the water electrolysis portion needs to be increased.

However, it is a problem to provide a water electrolysis apparatus that combines conflicting characteristics of a large electrode area and yet a small size.

(Production Targets for Advanced Oxidation Water)

To achieve the above (1) and (2), the concentrations of dissolved ozone (DO$_3$) and hydrogen peroxide (H$_2$O$_2$) in advanced oxidation water and the target values of water flow rate are defined as follows.

(4) Concentration of dissolved ozone (DO$_3$)=1.0 mg/L, concentration of hydrogen peroxide (H$_2$O$_2$)=about from 0.4 to 0.6 mg/L (5) Advanced oxidation water flow rate=10 L/min or more (Constraints)

The following constraints are imposed, including the size of the housing 300.

(6) The inner diameter of the housing 300 does not exceed 60 mm.

Assuming that the gas-liquid mixing portion 200 is arranged in the housing 300, the size of the housing is such that no expanded metal is needed for the partitioning member 220. This is to reduce costs, since the metal of expended metal made of titanium (Ti) is expensive.

(7) Even when expanded metal is used, the inner diameter of the housing 300 is 80 mm or less.

(8) Similar to the boron-doped diamond (BDD) supported mesh electrode 147 and the polymer electrolyte membrane with catalyst electrode of the twelfth embodiment, those in which boron-doped diamond (BDD) powder is supported on titanium (Ti) mesh or on the electrolyte membrane 120 (Nafion 117 membrane) are used.

This is to avoid the use of expensive platinum (Pt) mesh for catalyst electrodes and to reduce the cost, since the electrodes have a large area.

(Calculation of Required Current Value and Electrode Area)

(9) Comparative Example

Using the water electrolysis apparatus 1 of Example 3 as Comparative Example, advanced oxidation water with a concentration of dissolved ozone (DO$_3$)=0.5 mg/L and hydrogen peroxide (H$_2$O$_2$)=0.2 mg/L can be generated at a flow rate of 3 L/min with electrode area=8.6 cm$^2$, current density=0.2 A/cm$^2$, and current value=1.73 A. The ozone generation current efficiency is about 20%.

(10) Current Value and Electrode Area Required for Water Electrolysis Apparatus 1 of Reference Example Assuming that the required current value is X [A], using the values in (4), (5), and (9) above, 1.73: (3 L/min×0.5 mg/L)=X: (10 L/min×1 mg/L). Therefore, the required current value is X=11.5 [A]. It is desirable to be able to apply a current of 15 A.

In order to prevent damage to the electrolyte membrane 120 (Nafion 117 membrane), when operating at a low current density of 0.1 A/cm$^2$, the required electrode area is 15 [A]÷0.1 [A/cm$^2$]=150 [cm$^2$]. This is about 17.4 times larger than the electrode area of Comparative Example (=8.6 cm$^2$).

(Configuration of Water Electrolysis Portion of Reference Example)

The water electrolysis portion of Reference Example is contrasted with the configuration of the water electrolysis portion of each Comparative Example.

(11) Comparative Example 1: One-stage Water Electrolysis Portion 100 (Ninth Embodiment or the Like)

Water electrolysis apparatus 1 composed of a one-stage type water electrolysis portion 100, such as the ninth embodiment, is used as Comparative Example 1.

When the size of the mesh electrode is set to outer diameter=14 cm and inner diameter (diameter of the opening)=2 cm, the electrode area=150.8 cm$^2$, achieving the required electrode area (=150 cm$^2$) for the water electrolysis apparatus 1 of Reference Example.

Considering placement of screw holes and clearance in the housing 300, the inner diameter of the housing 300 is 20 cm.

(12) Comparative Example 2: Three-stage Water Electrolysis Portion (Tenth Embodiment)

In the tenth embodiment, the water electrolysis apparatus 1 composed of a three-stage water electrolysis apparatus has been described along with the water electrolysis apparatus 1 composed of a two-stage water electrolysis portion.

The size of the mesh electrode is set to outer diameter=8 cm, inner diameter (diameter of the opening)=1 cm, and a structure with three stages of 100 water electrolysis portions arranged in parallel. The electrode area is $$\{(8^2-1^2)/4\}\pi \times 3 = 148.4 \text{ [cm}^2\text{]}.$$

This electrode area can satisfy the required electrode area (=150 cm$^2$) of the water electrolysis apparatus 1 of Reference Example.

Considering placement of screw holes and clearance in the housing 300, the inner diameter of the housing 300 is 11 cm.

(13) Configuration of Water Electrolysis Portion 1500 of Reference Example

FIG. 30 illustrates the configuration of the water electrolysis portion 1500 of Reference Example.

Figure 30A:
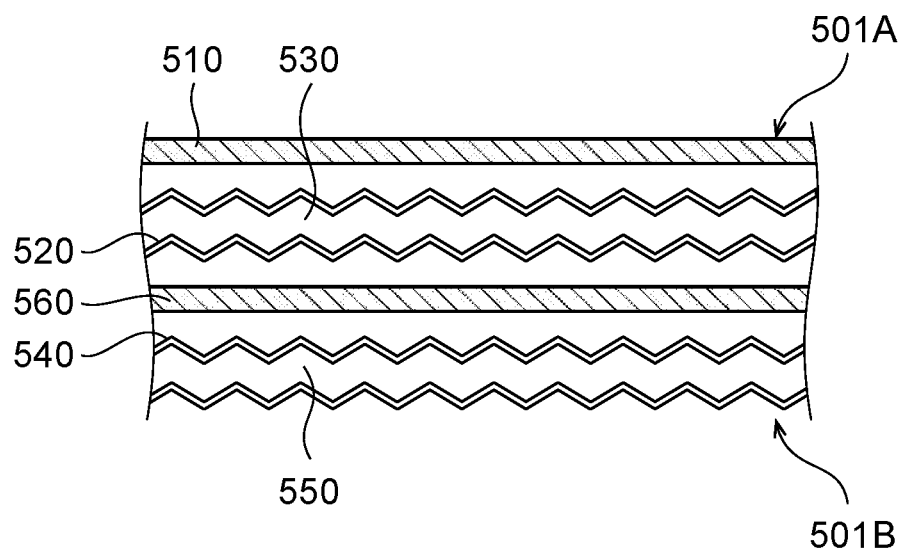
FIG. 30A is a diagram illustrating a sectional structure of enlarged and flattened rolled electrode portion illustrated in FIG. 30B.
Figure 30B:
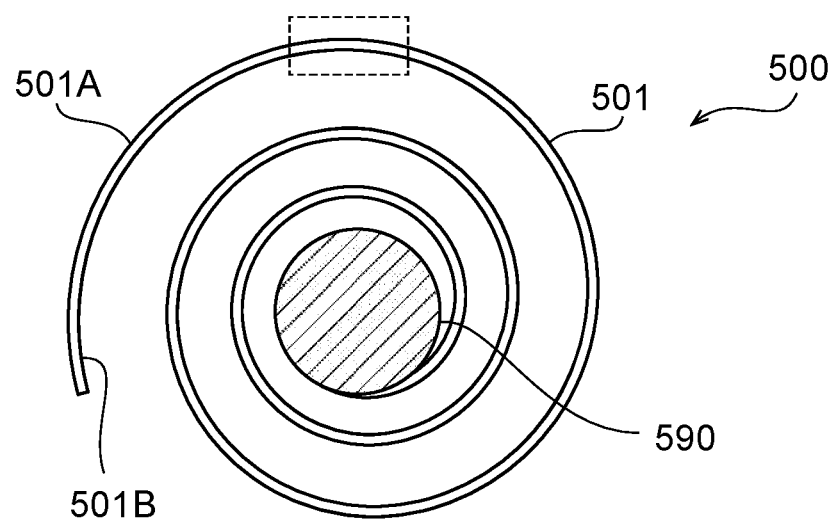
FIG. 30B is a sectional view of a water electrolysis portion.

FIG. 30B is a sectional view of the water electrolysis portion 1500, and FIG. 30A is a diagram illustrating a sectional structure of the rolled electrode portion 1501 illustrated in FIG. 30B, enlarged and flattened.

As illustrated in FIG. 30B, the water electrolysis portion 1500 is composed of a circular column-shaped core rod 1590 and a rolled electrode portion 1501.

The rolled electrode portion 1501 is rolled around the core rod 1590 and closely adhered thereto. The rolled electrode portion 1501 is wound in such a manner that the surface 1501A of the inner rolled electrode 1501 overlaps the back surface 1501B of the outer rolled electrode 1501, with the back surface 1501B on the 1590 side (inner side) of the core rod and the opposite outer surface 1501A on the opposite side.

As illustrated in FIG. 30A, the rolled electrode portion 1501 is composed of a separator 1510, a cathode side mesh electrode 1540, a polymer electrolyte membrane with a catalyst electrode 1560, and an anode side mesh electrode 1520, which are layered and closely adhered in the thickness direction from the surface 1501A side toward the back 1501B side.

The separator 1510 is made of an electrically insulating material. The separator is wrapped around the inner side rolled electrode 1501 in such a manner that the surface 1501A of the inner side rolled electrode 1501 overlaps the back surface 1501B of the outer side rolled electrode 1501. At this time, the separator 1510 prevents a short circuit or the like from occurring due to electrical contact between the cathode side of the inner side rolled electrode 1501 and the anode side of the outer side rolled electrode 1501.

The anode side mesh electrode 1520 corresponds to the anode side mesh electrode 140 of the embodiment. The material, the number of mesh electrodes, and the like may be any.

The cathode side mesh electrode 1540 corresponds to the anode side mesh electrode 170 of the embodiment. The material, the number of mesh electrodes, and the like may be any.

The polymer electrolyte membrane with catalyst electrode 1560 corresponds to the polymer electrolyte membrane with catalyst electrode of boron-doped diamond (BDD) of the twelfth embodiment. The polymer electrolyte membrane with catalyst electrode 1560 is composed of boron-doped diamond (BDD) powder supported on the electrolyte membrane 120 (Nafion 117 membrane). The catalyst electrode surface (boron-doped diamond (BDD) powder) of the polymer electrolyte membrane with catalyst electrode 1560 is arranged on the anode side.

A domain formed between the separator 1510 and the polymer electrolyte membrane with catalyst electrode 1560 constitutes a cathode side electrolytic domain 1550. The cathode side electrolytic domain 1550 corresponds to the cathode side electrolytic domain 160 of the embodiment.

A domain formed between the polymer electrolyte membrane with catalyst electrode 1560 and the separator 1510 arranged on the surface 1501A of the inner side rolled electrode portion 1501 constitutes the anode side electrolytic domain 1530. The anode side electrolytic domain 1530 corresponds to the anode side electrolytic domain 130 of the embodiment.

For the water electrolysis portion 1500 illustrated in FIG. 30, raw water is flowed in the vertical direction of the paper surface, and water is distributed within the anode side electrolytic domain 1530 and cathode side electrolytic domain 1550 from the surface to the back of the paper surface or from the back to the surface of the paper surface, and electrolysis takes place.

For example, a water electrolysis portion 500 is configured by wrapping a 5 cm wide rolled electrode portion 501 around three times on a core rod 590 such as a film case of 3 cm diameter (1.5 cm radius) and 5 cm length. The electrode area of this water electrolysis portion 1500 is $$2 \times \pi \times 1.5 \text{ [cm]} \times 5 \text{ [cm]} \times 3 = 141.4 \text{ [cm}^2\text{]}.$$

This electrode area can satisfy the required electrode area (=150 cm$^2$) of the water electrolysis apparatus 1 of Reference Example.

This allows a small water electrolysis portion 1500 to have a large electrode area. Since the inflow sectional area of the water flow channels, the anode side electrolytic domain 1530 and the cathode side electrolysis area 1550, is large, the pressure loss is small and a large flow rate of water can flow.

(Configuration of Water Electrolysis Apparatus 1 of Reference Example)

FIG. 31 illustrates the configuration of the water electrolysis apparatus 1 of Reference Example.

Figure 31A:
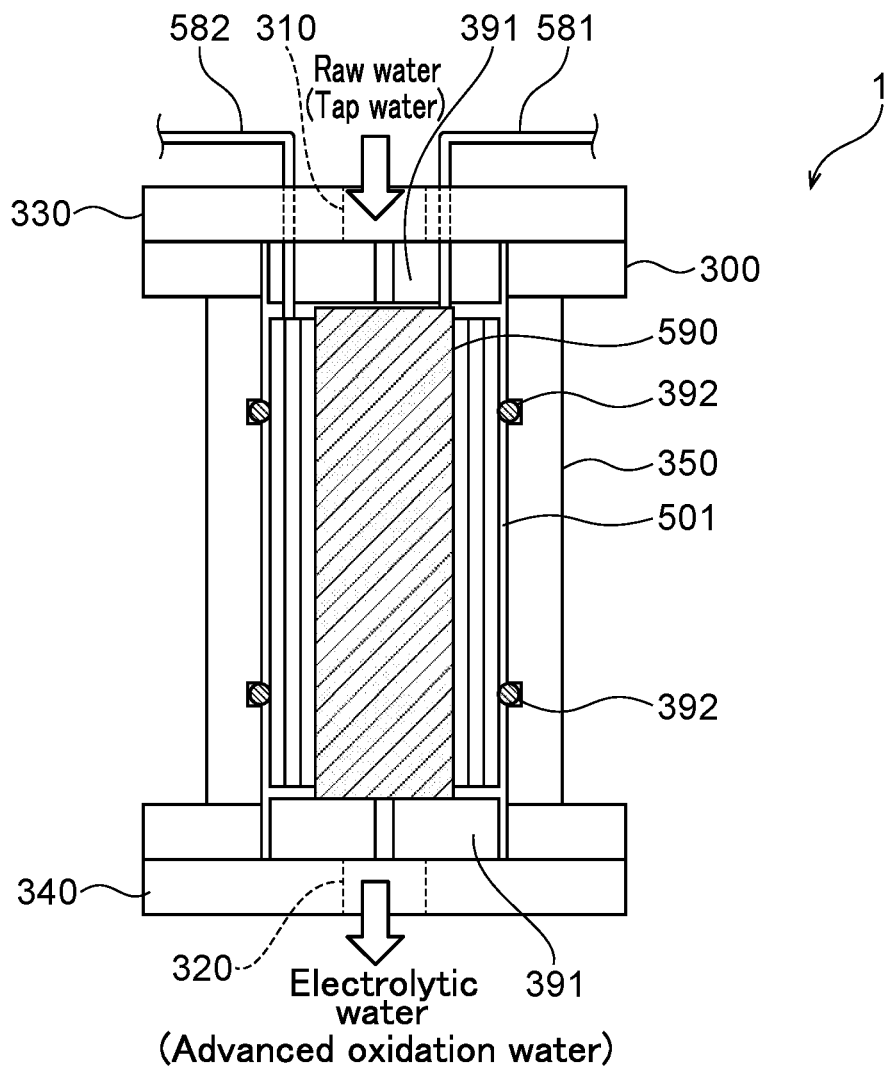
FIG. 31A is a diagram illustrating a configuration in which a water electrolysis portion is arranged inside a housing.

FIG. 31A illustrates a configuration in which the water electrolysis portion 1500 is arranged in the housing 300. For the housing 300, the same symbols are assigned to the same components as in the eleventh embodiment and the like.

Figure 31B:
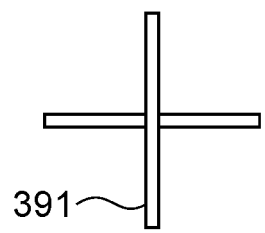
FIG. 31B is a plan view of a spacer arranged between a housing and a water electrolysis portion.

FIG. 31B is a plan view of a spacer 391 that is arranged between the housing 300 and the water electrolysis portion 1500. In other words, FIG. 31B is a view of the spacer 391 of FIG. 31A from the top or the bottom.

As illustrated in FIG. 31A, the water electrolysis portion 1500 is arranged in the housing 300 in such a manner that the vertical direction with respect to the paper surface in FIG. 30B is the vertical direction in the figure of FIG. 31A.

A crisscross-shaped spacer 391 is arranged at the upper end of the interior of the housing 300, viewed from the upper surface in the figure. The spacer 391 is arranged between the top plate 330 and the top edge of the water electrolysis portion 1500.

The spacer 391 forms a flow channel that is connected to the inlet 310 on the top plate 330 with a water flow inlet at the upper end of the water electrolysis portion 1500 (inlet of the anode side electrolytic domain 1530 and cathode side electrolytic domain 1550).

A crisscross-shaped spacer 391 is arranged at the lower end of the interior of the housing 300, viewed from the lower surface in the figure. The spacer 391 is arranged between the bottom plate 340 and the bottom edge of the water electrolysis portion 1500.

The spacer 391 forms a flow channel that is connected to the outlet 320 on the bottom plate 340 with a water flow outlet at the lower end of the water electrolysis portion 1500 (outlet of the anode side electrolytic domain 1530 and cathode side electrolytic domain 1550).

O-rings 392 are provided on the inner circumference of the cylindrical portion 350 on the inner upper side and the inner lower side of the housing 300, respectively. O-rings 392 are closely attached to the outer circumference of the water electrolysis portion 1500.

To the inlet 310 on the upper side of the figure in FIG. 31A, tap water, for example, is supplied as raw water. This causes the raw water to flow in the downward direction in the figure to the water electrolysis portion 1500.

On the anode side of the rolled electrode portion 1501, one end of the power cord 1581 is electrically connected, and the other end of the power cord 1581 is electrically connected to the positive terminal of the direct current power supply not illustrated. One end of the power cord 1582 is electrically connected to the cathode side of the rolled electrode portion 1501, and the other end of the power cord 1582 is electrically connected to the negative terminal of the above-described direct current power supply. Current flows from the positive terminal of the above-described direct current power supply to the negative terminal of the above-described direct current power supply via the power cord 1581, the anode side of the rolled electrode portion 1501, the cathode side of the rolled electrode portion 1501, and the power cord 1582, and water electrolysis is performed in the anode side electrolytic domain 1530 and the cathode side electrolytic domain 1550 of the water electrolysis portion 1500.

Electrolysis is performed in the anode side electrolytic domain 1530 and the cathode side electrolytic domain 1550 while water is distributed from the upper side to the lower side in the figure. Electrolytic water that has undergone water electrolysis, such as advanced oxidation water, flows out to the outside from the outlet 320 on the lower side of the figure in FIG. 31A.

The water electrolysis portion 1500 is configured by rolling three times the rolled electrode portion 1501 on the core rod 1590.

When the thickness of one roll of the rolled electrode portion 1501 is 2.8 mm, the rolled electrode portion 1501 with three rolls has a thickness of 8.4 mm. The diameter of the core rod 1590 is set to 30 mm.

At this time, the outer diameter of the water electrolysis portion 1500 is 47 mm. Therefore, the water electrolysis portion 1500 can be accommodated in the housing 300 with an inner diameter of 50 mm.

Therefore, the water electrolysis apparatus 1 having conflicting characteristics of large electrode area and yet small size can be provided.

As in the eleventh embodiment or the like, the water electrolysis apparatus 1 may be configured by interposing the gas-liquid mixing portion 200 between the water electrolysis portion 1500 and the outlet 320 in the housing 300 of FIG. 30A.

Example 6

Hereinafter, an example of a water electrolysis apparatus that can flow a large flow rate of water with a large electrode area will be described. Example 6 can be applied to each of the above-described embodiments and Examples and Reference Examples.

(Selection of Electrode Material)

When increasing the size of the water electrolysis portion, it is necessary to pay attention to the characteristics of the electrode material. In order to achieve high ozone generation efficiency using an electrode with a large area, it is necessary to apply a voltage of at least 8 V, preferably 10 V or higher.

Therefore, the current-voltage characteristics (hereinafter referred to as I-V characteristics) were compared and examined for each material of the electrode used on the anode side of the water electrolysis portion.

Examples and Comparative Examples

Examples: A boron-doped diamond (BDD) supported mesh electrode, in which boron-doped diamond (BDD) powder is supported on a titanium (Ti) mesh, is used on the anode side. The boron-doped diamond (BDD) supported mesh electrode is an electrode using boron-doped diamond (BDD) powder with a low concentration of boron dopant adjusted to increase resistance, as in Example 5. The I-V characteristics are about 17 V-1.0 A with an electrode area of 8 cm².

Comparative Example 1: A platinum (Pt) mesh electrode is used on the anode side. With an electrode area of 8 cm², the I-V characteristics are about 10V-15 A.

Comparative Example 2: On the anode side, a boron-doped diamond (BDD) substrate electrode with a thin membrane of boron-doped diamond (BDD) deposited on a niobium (Nb) substrate is used. The electrode area is 8.6 cm², and the I-V characteristics are about 8 V-1.73 A.

(Constraints)

As in Reference Example, the following conditions are used.

(1) Dissolved ozone ($DO_3$) concentration=1.0 mg/L, hydrogen peroxide ($H_2O_2$) concentration=about from 0.4 to 0.6 mg/L (2) Advanced oxidation water flow rate=10 L/min or more (3) To prevent damage to the electrolyte membrane 120 (Nafion 117 membrane), operation is performed at a low current density of 0.1 A/cm².

Therefore, the required electrode area is 150 [cm²], and a current of 15 A (0.1 A/cm²) needs to be applied to an electrode area of 150 [cm²].

In order to increase the ozone generation efficiency, a voltage of 8 V or higher needs to be applied between the anode and the cathode.

(Calculation Results of Applied Voltage and Current)

Under the above-described constraints, the applied voltage and the current are calculated for Comparative Example 1, Comparative Example 2, and Examples.

Comparative Example 1

The resistance value of a platinum (Pt) mesh electrode with an electrode area of 8 [cm²] is 10[V]/15[A]=0.667 [Ω].

The electrode area ratio of an electrode with an electrode area of 150 [cm²] to an electrode with an area of 8 [cm²] is 150 [cm²]/8 [cm²]=18.8 times.

Therefore, the resistance value R of the water electrolysis portion using a platinum (Pt) mesh electrode with an electrode area of 150 [cm²] assuming a parallel circuit is $$1/R=(1/0.667[\Omega])\times 18.8=28.2, \text{ and}$$

$$R=1/28.2=0.0354[\Omega].$$

Therefore, the applied voltage when a current of 15 A is applied is 15×0.0354=0.53 [V].

At this voltage of 0.53 [V], no ozone is expected to be produced at all. The moment the water electrolysis starts with an applied voltage of from 2 to 3V, the current of 15 A, which is the upper limit of the constraint condition, will flow.

Comparative Example 2

The resistance value of a boron-doped diamond (BDD) substrate electrode with an electrode area of 8.6 [cm²] is about seven times that of a platinum (Pt) mesh electrode in Comparative Example 1. The resistance value is $$8[V]/1.73[A]=4.62[\Omega].$$

The electrode area ratio of an electrode with an area of 150 [cm²] to an electrode with an area of 8.6 [cm²] is 150 [cm²]/8.6 [cm²]=17.4 times.

Therefore, the resistance value R of the water electrolysis portion using a boron-doped diamond (BDD) substrate electrode with an electrode area of 150 [cm²] assuming a parallel circuit is $$1/R=(1/4.62[\Omega])\times 17.4=3.78, \text{ and}$$

$$R=1/3.78=0.265[\Omega].$$

Therefore, the applied voltage when a current of 15 A is applied is 15×0.265=3.97 [V].

This voltage of 3.97 [V] is the value at which ozone begins to form slightly, and the ozone generation current efficiency is considered to be almost zero.

Examples

The resistance value of the boron-doped diamond (BDD) supported mesh electrode with an electrode area of 8 [cm$^2$] is about 2.4 times that of the boron-doped diamond (BDD) substrate electrode of Comparative Example 2. The resistance value is 14 [V]/1.5 [A]=9.33 [Ω].

The electrode area ratio of an electrode with an electrode area of 140 [cm$^2$] to an electrode with an area of 8 [cm$^2$] is 140 [cm$^2$]/8 [cm$^2$]=17.5 times.

Therefore, the resistance value R of the water electrolysis portion using a boron-doped diamond (BDD) supported mesh electrode with an electrode area of 140 [cm$^2$] assuming a parallel circuit is $$1/R=(1/9.33[\Omega])\times 17.5=1.88, \text{ and}$$

$$R=1/1.88=0.531[\Omega].$$

Therefore, the applied voltage when a current of 15 A is applied is 15×0.531=7.97 [V].

When this voltage of about 7.97 [V] is applied between the anode and the cathode, ozone can be generated sufficiently. The ozone generation current efficiency is expected to be about 9%. However, the power consumption is 120 W. The applied voltage rises to 10.6V when a current of 20 A (0.133 A/cm$^2$) is applied. Therefore, the above-described voltage of 7.97 [V] is applied between the anode and the cathode, and when the ozone generation current efficiency is low, operation may be performed by slightly increasing the current density.

In Example, the configuration in which the mesh electrode supported with boron-doped diamond (BDD) powder is arranged on the anode side of the water electrolysis apparatus has been described.

However, any electrode supported with boron-doped diamond (BDD) powder may be used. An implementation in which the catalyst electrode surface of a polymer electrolyte membrane with a catalyst electrode composed of boron-doped diamond (BDD) powder supported on an electrolyte membrane (Nafion membrane) is arranged on the anode side may also be used.

As described above, according to Examples, an electrode supported with boron-doped diamond (BDD) powder, whose boron dopant concentration is adjusted to be low to obtain a resistance value of 0.531 [Ω] or more, and with an electrode area of 140 [cm$^2$] or more is arranged on the anode side of the water electrolysis apparatus. As a result, the following remarkable effects can be obtained.

1) Advanced oxidation water with a flow rate of 10 L/min or higher can be generated.

2) A voltage of 7.97 [V] or higher can be applied between the anode and the cathode to achieve an ozone generation current efficiency of 9% or higher.

3) Since operation is performed at a low current density of 0.1 A/cm$^2$ or less, damage to the electrolyte membrane (Nafion membrane) is suppressed. The water electrolysis apparatus can be operated stably for a long time.

The following embodiments and Examples are added to the first embodiment to the twelfth embodiment and Examples 1 to 6 disclosed in JP-A No. 2019-031029 filed on Feb. 22, 2019. In the following, the same symbol is assigned to the same component and the same description is omitted as appropriate. In the following, the length, the area, and other numerical values of each component, the names of materials, and the like are clearly indicated, but the scope of Claims is not limited in any way by these indications.

Thirteenth Embodiment

In the first embodiment to the ninth embodiment, the eleventh embodiment and the twelfth embodiment, metal mesh electrodes 140 and 170 are provided in a single water electrolysis portion 100, and by distributing water horizontally against the surface of the metal mesh electrodes 140 and 170, ozone and hydrogen peroxide, which have been atomized in the metal mesh electrodes 140 and 170, are brought into contact with water to produce, for example, advanced oxidation water as electrolytic water. Furthermore, in the tenth embodiment, it has been described that even higher flow rates of, for example, advanced oxidation water can be generated as electrolytic water by configuring two-stage water electrolysis portions 100 and 100' arranged in parallel (Configuration Example in FIG. 8), or by configuring three, four, or more stages of water electrolysis portions if necessary.

Figure 32:
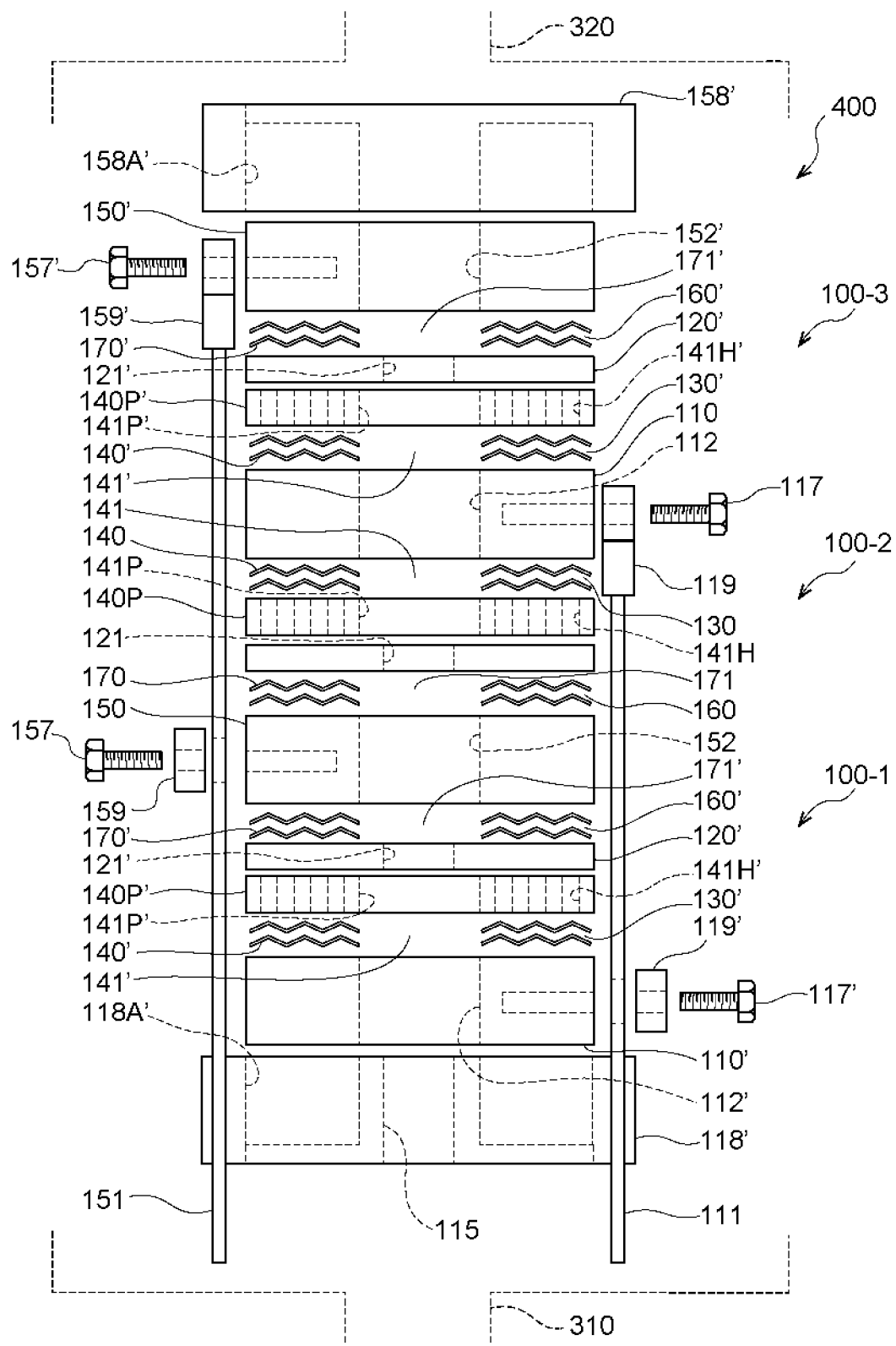
FIG. 32 is an exploded view illustrating an example of the configuration of a water electrolysis portion of a thirteenth embodiment.

FIG. 32 is an exploded view of a water electrolysis apparatus in which water electrolysis portions are stacked in three parallel stages. The water electrolysis portion 100-3 is provided above the water electrolysis portions 100 and 100' illustrated in FIG. 8, stacked in the thickness direction of the water electrolysis portions 100 and 100'. The water electrolysis portions 100 and 100' illustrated in FIG. 8 are replaced by the water electrolysis portions 100-1 and 100-2, respectively. Thus, the overall water electrolysis portion 400 is composed of three stages of water electrolysis portions 100-1, 100-2, and 100-3, which are stacked and arranged in the thickness direction. Hereinafter, descriptions that overlap with the description of the configuration example in FIG. 8 are omitted as appropriate.

The water electrolysis portion 400 is interposed between the inlet 310 and the outlet 320. Unlike FIG. 8, raw water flows upward from the inlet 310 arranged at the bottom of the figure, and electrolytic water flows out from the outlet 320 arranged at the top of the figure.

Like the configuration example of FIG. 8, each component of the bottom stage water electrolysis portion 100-1 and each component of the middle stage water electrolysis portion 100-2 are configured vertically symmetrically with the longitudinal center axis of the cathode 150 of the bottom stage water electrolysis portion 100-1 as the symmetry center. Among the components of the bottom stage water electrolysis portion 100-1, the same components as those of the middle stage water electrolysis portion 100-2 are assigned the same symbol with a dash.

A cathode 150 of two water electrolysis portions 100-1 and 100-2 adjacent to each other in the thickness direction is composed of a common electrode.

With the longitudinal center axis of the anode 110 of the middle stage water electrolysis portion 100-2 as the center of symmetry, each component of the top water electrolysis portion 100-3 and each component of the middle stage water electrolysis portion 100-2 are configured vertically symmetrically. Among the components of the top water electrolysis portion 100-3, the same components as those of the middle stage water electrolysis portion 100-2 are given the same symbol with a dash.

The anode 110 of the two water electrolysis portions 100-2 and 100-3 adjacent to each other in the thickness direction is composed of a common electrode.

The annular cathode 150' of the top water electrolysis portion 100-3 is accommodated in the annular recess 158A' formed in the cathode holding portion 158'. To the cathode 150' and the common cathode 150, negative terminals 159', 159, configured as crimp terminals, are screwed and fixed, for example, by screws 157', 157 (M3 screws). A power cord 151 is electrically connected to the negative terminals 159' and 159.

Similar to the configuration example in FIG. 8, the annular anode 110' of the bottom stage water electrolysis portion 100-1 is accommodated in the annular recess 118A' formed in the anode holding portion 118'. To the anode 110' and the common anode 110, anode terminals 119' and 119, configured as crimp terminals, are screwed and fixed, for example, by screws 117' and 117 (e.g., M3 screws).

In the anode holding portion 118', an inner side opening 115 that is connected to the inlet 310 and the inner side opening 141' of the anode side mesh electrode 140' is formed.

The anode holding portion 118', which is arranged at the bottom of the figure of the water electrolysis portion 400, and the cathode holding portion 158', which is arranged at the top of the figure, are made of an acrylic resin, for example. The common anode 110 and the anode 110' are configured as terminal plates made of titanium (Ti), for example. The common cathode 150 and the cathode 150' are configured as terminal plates made of stainless steel, for example.

On the anode side, three titanium mesh electrodes and one boron-doped diamond (BDD) are provided as the anode side mesh electrodes 140, 140', and a perforated substrate electrode 140P, 140P', which is supported by deposition or the like. The substrate electrodes 140P and 140P' constitute a catalyst electrode containing boron-doped diamond provided on the anode side of the water electrolysis portion. On the cathode side, three titanium mesh electrodes are provided as cathode side mesh electrodes 170, 170'.

As the catalyst electrode, a BDD substrate electrode with BDD deposited on a metal substrate with holes (for example, Nb) may be used, a membrane electrode integrated-type catalyst electrode with BDD powder supported on a polymer electrolyte membrane may be used, or a mesh-type BDD catalyst electrode with boron-doped diamond (BDD) powder supported on a metal mesh may be used. This allows generation of advanced oxidation water in which ozone and hydrogen peroxide coexist. Metal mesh catalyst electrodes of platinum, stainless steel, or titanium can be used for the cathode side mesh catalyst electrode.

Figure 33:
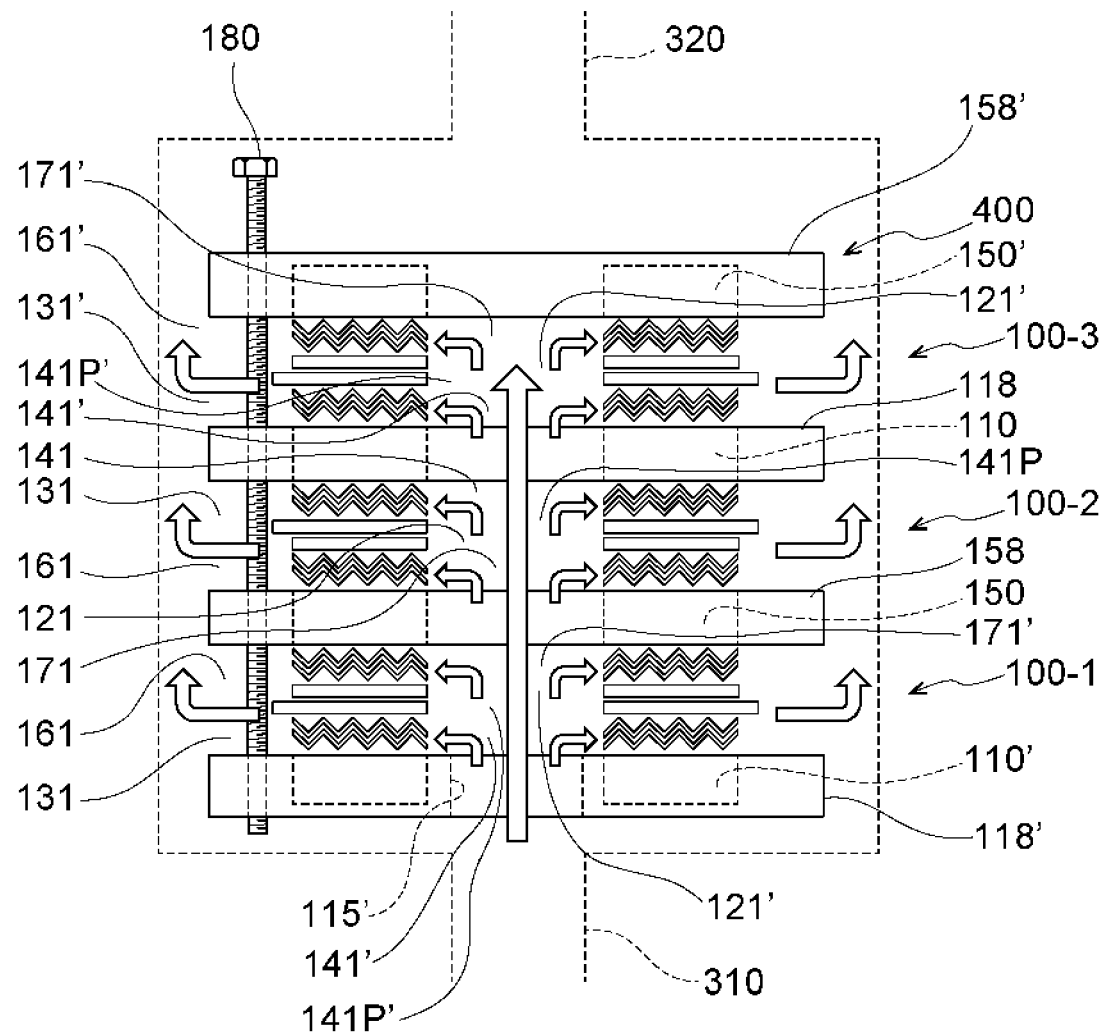
FIG. 33 is a diagram illustrating flows of water in the water electrolysis portion of the thirteenth embodiment.

FIG. 33 illustrates another configuration example of a water electrolysis portion 400 composed of three water electrolysis portions 100-1, 100-2, and 100-3 illustrated in FIG. 32 and the flow of water.

Not only the top cathode 150' and the bottom anode 110', but also the common cathode 150 and the common anode 110 are held by the cathode holding portion 158 and anode holding portion 118 similar to the cathode holding portion 158' and anode holding portion 118'.

The cathode holding portion 158', the anode holding portion 118, the cathode holding portion 158, and the anode holding portion 118' are tightened together in the thickness direction by screwing the threaded portion of the bolt 180 into the screw holes formed in each.

The inner side openings 141', 141P', 121', 171', 141, 141P, 121, 171 of the mesh electrode, the catalyst electrode, and the polymer electrolyte membrane in each of the three water electrolysis portions 100-1, 100-2, 100-3 communicate with a common inlet 310. Furthermore, the outer peripheral openings 131, 161, 131', 161' of each of the three water electrolysis portions 100-1, 100-2, 100-3 communicate with a common outlet 320.

When water flows in the common inlet 310 from below, water flows via each of the inner side openings 141', 141P', 121', 171', 141, 141P, 121, and 171 to the anode side electrolytic domain 130' and cathode side electrolytic domain 160' of the bottom stage water electrolysis portion 100-1, the anode side electrolytic domain 130' and cathode side electrolytic domain 160' of the middle stage water electrolysis portion 100-2, and the anode side electrolytic domain 130' and the cathode side electrolytic domain 160' of the top water electrolysis portion 100-3 respectively, and water electrolysis takes place (see FIG. 32).

The electrolytic water generated in the bottom stage water electrolysis portion 100-1, the middle stage water electrolysis portion 100-2, and the top water electrolysis portion 100-3, respectively, merges via the respective outer peripheral openings 131, 161, 131', and 161', and flows out from the common outlet 320 to the outside.

When raw water flows through the gap between the anode side mesh electrodes 140 and 140' of each of the water electrolysis portions 100-1, 100-2, and 100-3 and is electrolyzed, the water becomes anode water containing ozone, oxygen, and hydrogen peroxide.

When raw water flows through the gap between the cathode side mesh electrodes 170 and 170' of each of the water electrolysis portions 100-1, 100-2, and 100-3 and is electrolyzed, the water becomes cathode water containing hydrogen and hydrogen peroxide. Those anode water and cathode water merge and flows out from the common outlet 320. Therefore, according to the embodiment, a water-saving compact advanced oxidation water production apparatus can be configured. According to the embodiment, water can flow over the entire surface of the electrode meshes and the catalyst electrodes, and formation of bubble pools, or dead portions in the water flow, that reduce the efficiency of water electrolysis can be prevented, and a highly efficient water electrolysis apparatus can be configured.

In the configuration example illustrated in FIGS. 32 and 33, the water electrolysis portions 100-1, 100-2, and 100-3 are configured to allow raw water to flow in the respective inner side openings and electrolytic water to flow out from the respective outer peripheral openings.

However, as in Configuration Example in FIG. 8, the water electrolysis portions 100-1, 100-2, and 100-3 can be configured to allow raw water to flow in each of the outer peripheral openings and electrolytic water to flow out from each of the inner side openings.

In this configuration, the inner side openings 141', 141P', 121', 171', 141, 141P, 121, and 171 of the mesh electrodes, catalyst electrodes, and polymer electrolyte membranes in each of the three water electrolysis portions 100-1, 100-2, 100-3 are made to communicate with the common outlet 310. Furthermore, the outer peripheral openings 131, 161, 131', 161' of each of the three water electrolysis portions 100-1, 100-2, 100-3 are to communicate with the common inlet 320.

Figure 34:
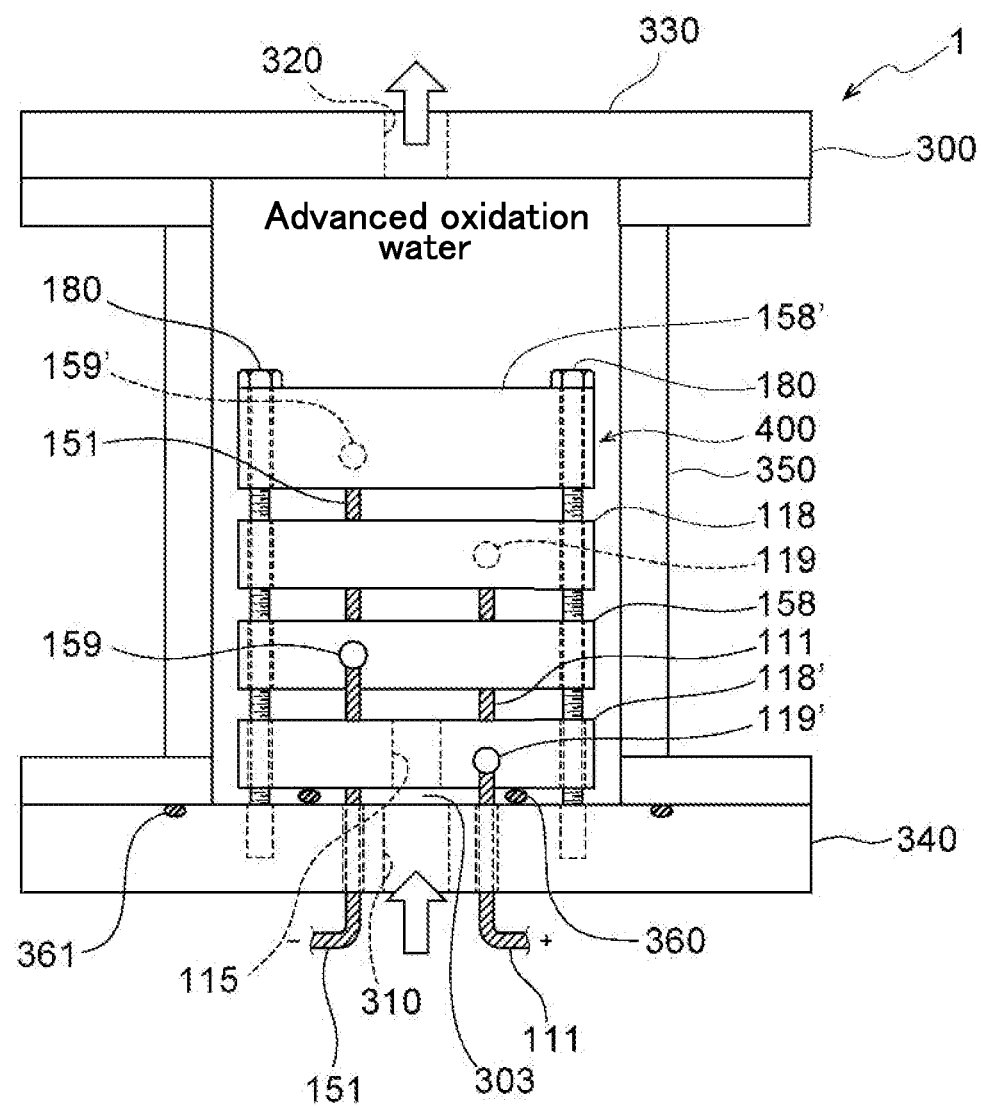
FIG. 34 is a diagram illustrating a configuration in which a water electrolysis portion is arranged in a housing.

FIG. 34 illustrates a side view of the advanced oxidation water production apparatus in which the three-stage parallel type water electrolysis portion 400 of FIGS. 32 and 33 is accommodated in a cylindrical acrylic housing 300 (can body).

For example, when the diameter of the water electrolysis portion 400 is 5.6 cm, the inner diameter of the housing 300 may be 6 cm, and the inner diameter height may be from 7 to 8 cm. This allows configuration of a considerably small advanced oxidation water production apparatus. Only one water pipe needs to be connected to each of the inlet 310 and the outlet 320 of the housing 300.

The water electrolysis portion 400 may be arranged in the housing 300 configured similarly to the housing 300 illustrated in FIG. 1, for example, to configure a water electrolysis apparatus.

The housing 300 is formed in a cylindrical shape. The housing 300 is made of an acrylic resin, for example. The water electrolysis apparatus 400 is similarly formed in a circular column shape. The housing 300 is composed of a circular flanged top plate 330 viewed from above in the figure, a circular flanged bottom plate 340 viewed from below in the figure, and a flanged cylindrical portion 350 between the top plate 330 and the bottom plate 340. The outlet 320 is provided on the top plate 330, and the inlet port 310 is provided on the bottom plate 340. The flange of the top plate 330 and the flange of the cylindrical portion 350 are joined to each other, and the flange of the cylindrical portion 350 and the flange of the bottom plate 340 are joined to each other by screwing or other means to configure the housing 300.

The flow channel 303 as the gap between the anode holding portion 118' and the bottom plate 340 is sealed by the O-ring 360. The gap between the cylindrical portion 350 and the bottom plate 340 is sealed by the O-ring 360.

Functional water such as advanced oxidation water containing ozone and hydrogen peroxide can be generated by flowing raw water such as tap water, pure water, or ion exchange water (soft water) in the water electrolysis apparatus illustrated in FIG. 34 and applying a voltage of several to 20 volts to electrolyze the water.

This water electrolysis apparatus not only generates functional water from raw water, but also includes functions of purifying and sterilizing water such as wastewater, river water, and well water. For example, when purifying wastewater contaminated with organic matter, acid, or alkali, the wastewater is introduced into the water electrolysis apparatus illustrated in FIG. 34 for direct electrolysis. In this case, pollutants in the wastewater are decomposed and treated by reacting with ozone and hydrogen peroxide. River water and well water containing bacteria and coliform bacteria can be sterilized and purified to the tap water level by direct electrolysis in the water electrolysis apparatus 34 illustrated in FIG. 34.

The water electrolysis portion 400 of the thirteenth embodiment includes three water electrolysis portions having the same electrode area. As a result, the flow channel cross-sectional area is three times larger than that of a single water electrolysis portion 100, making it possible to dramatically reduce the pressure loss and generate a large flow rate of electrolytic water. The water electrolysis portion may be configured with four, five, or more stages if necessary.

In the thirteenth embodiment of the water electrolysis portion 400, the anode 110 of the two water electrolysis portions 100-2 and 100-3 adjacent in the thickness direction is composed of a common electrode, and the cathode 150 of the two water electrolysis portions 100-1 and 100-2 adjacent in the thickness direction is composed of a common electrode.

In the thirteenth embodiment, the electrodes (anode and cathode) are configured to be common for all the water electrolysis portions adjacent to each other in the thickness direction. However, it is also possible to configure the electrodes to be common to at least two water electrolysis portions adjacent to each other in the thickness direction. For example, it is possible to configure the anode 110 of one of the two water electrolysis portions 100-2 and 100-3 adjacent in the thickness direction with a common electrode, while the other two water electrolysis portions 100-1 and 100-2 adjacent in the thickness direction are configured with individual cathodes.

In the same way as the water electrolysis portion 400 of the thirteenth embodiment, n water electrolysis portions 100-1, 100-2, 100-3 . . . 100-n may be stacked in the thickness direction to configure the water electrolysis portion 400.

When the anodes or cathodes of the n water electrolysis portions 100-1, 100-2, 100-3 . . . 100-n, which are adjacent to each other in the thickness direction, are composed of common electrodes, the number of electrodes for all may be composed of n+1.

In the case of three water electrolysis portions 100-1, 100-2, and 100-3, the number of electrodes is four. In the case of four water electrolysis portions, the number of electrodes is five. In the case of five water electrolysis portions, the number of electrodes is six.

Since the anode 110 and the cathode 150 are common to the water electrolysis portion 400 configured as described above, the apparatus can be configured with fewer parts than the case where single water electrolysis portions 100 are directly arranged in parallel. This is because the number of electrodes is 2n when n single water electrolysis portions 100 are arranged in parallel. This makes it possible to make the apparatus smaller, lighter, and less expensive. Despite the small size, the flow channel cross-sectional area and the area of the BDD substrate electrode can be larger than those of a stand-alone water electrolysis portion 100. Therefore, it is possible to generate highly concentrated advanced oxidation water at a large flow rate.

Fourteenth Embodiment

Figure 35:
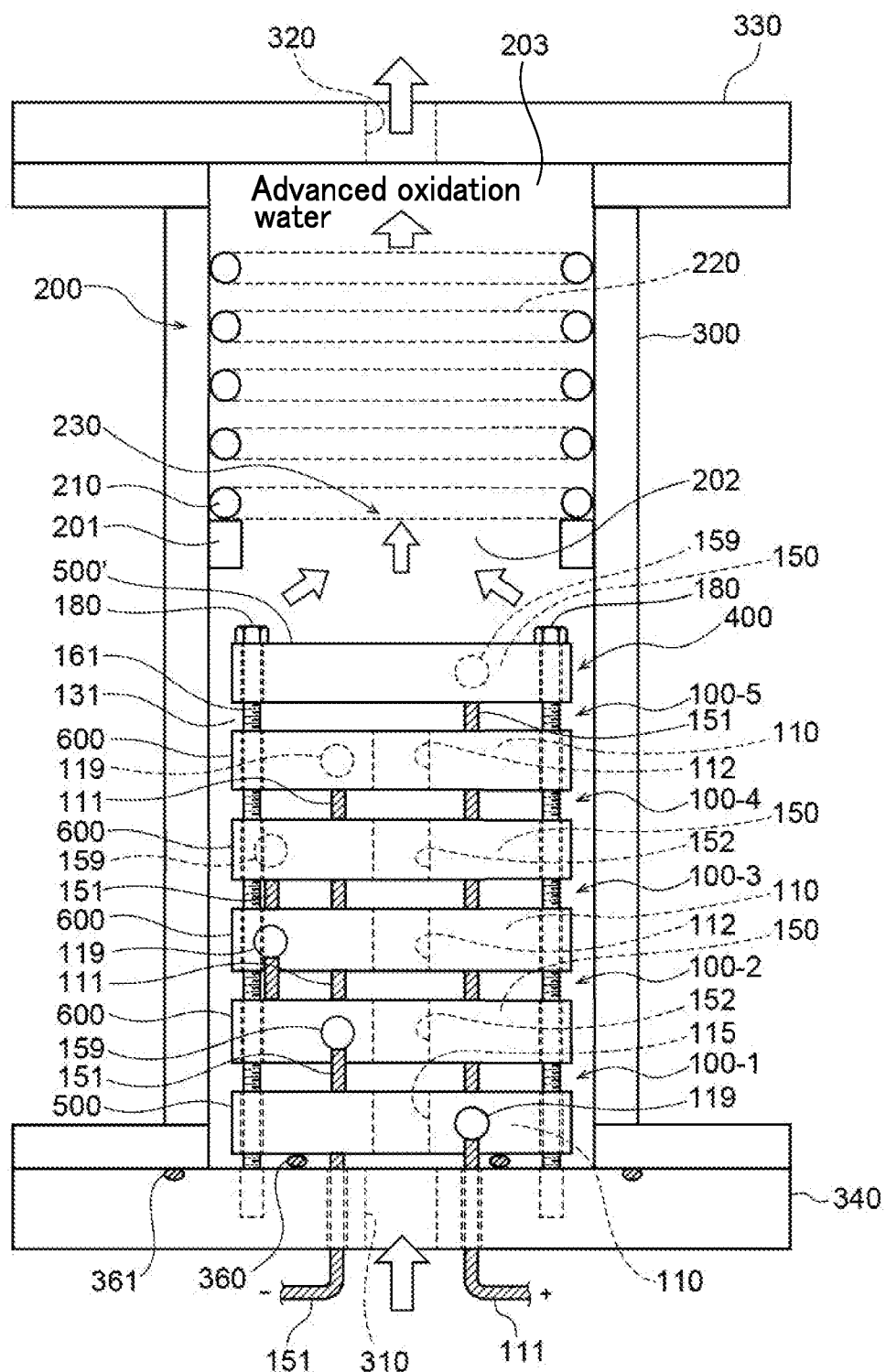
FIG. 35 is a sectional view of a fourteenth embodiment, illustrating an example of the configuration of a water electrolysis apparatus in which a water electrolysis portion and a gas-liquid mixing portion are arranged in a housing.

FIG. 35 is a sectional view of a five-stage parallel type water electrolysis apparatus with built-in mixer, in which the water electrolysis apparatus 400 and the gas-liquid mixing portion 200, which are stacked five stages in parallel, are housed in the same housing (can body) 300.

As in the configuration example of FIG. 9, the water electrolysis portion 400 and the gas-liquid mixing portion 200 are arranged in the housing 300. In the following, descriptions that overlap with the description of the configuration example in FIG. 9 are omitted as appropriate.

The gas-liquid mixing portion 200 is provided to redissolve the gas generated in the water electrolysis portion 400 in the electrolytic water flowing out from the water electrolysis portion 400.

The water electrolysis portion 400 is composed of five-stage water electrolysis portions 100-1, 100-2, 100-3, 100-4, and 100-5. Water electrolysis portions 100-4 and 100-5, composed of mesh electrodes and other similar components, are sequentially stacked in the thickness direction above the three-stage water electrolysis portions 100-1, 100-2, and 100-3 illustrated in FIGS. 32 and 33. A catalyst electrode containing boron-doped diamond is provided on the anode side of each of the water electrolysis portions 100-1 to 100-5.

The cathode 150 of the two water electrolysis portions 100-1 and 100-2 adjacent to each other in the thickness direction is composed of a common electrode. The anode 110 of the two water electrolysis portions 100-2 and 100-3 adjacent to each other in the thickness direction is composed of a common electrode. The cathode 150 of the two water electrolysis portions 100-3 and 100-4 adjacent to each other in the thickness direction is composed of a common electrode. The anode 110 of the two water electrolysis portions 100-4 and 100-5 adjacent to each other in the thickness direction is composed of a common electrode.

The bottom anode 110 in the figure in FIG. 35 is held by the electrode holding portion 500. The top cathode 150 is held by the electrode holding portion 500'. The common anode 110 and the common cathode 150 are held by the electrode holding portion 600. A configuration example in which the electrode holding portion holds the anode and the cathode will be described with reference to FIGS. 36A, 36B, 37A, 37B, 38A, and 38B.

For convenience of description, the six electrode holding portions arranged from top to bottom in the figure of FIG. 35 will be referred to as the first electrode holding portion 500', the second electrode holding portion 600, the third electrode holding portion 600, the fourth electrode holding portion 600, the fifth electrode holding portion 600, and the sixth electrode holding portion 500 as appropriate in the order from top to bottom.

Figure 36A:
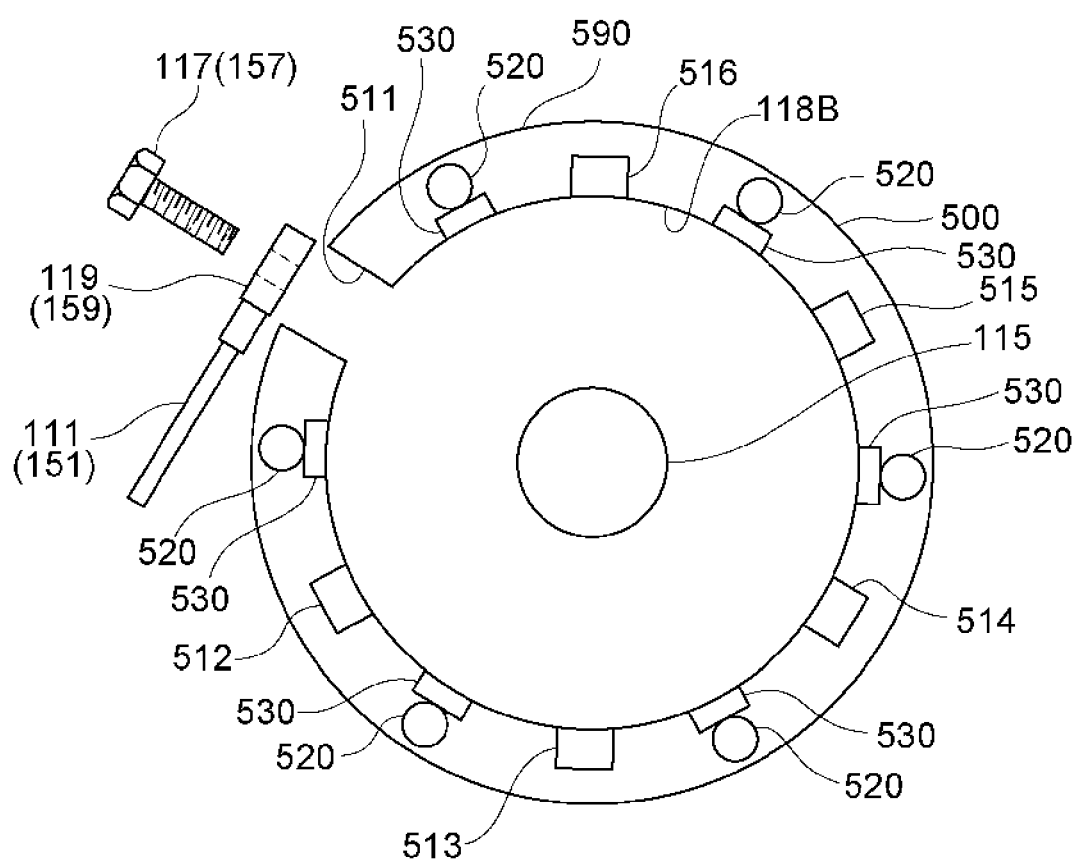
FIG. 36A is a top view of an electrode holding portion.

FIGS. 36A and 36B illustrates the sixth electrode holding portion 500 that holds the bottom anode 110 in the figure of FIG. 35. FIG. 36A is a top view of the electrode holding portion 500 from the top of FIG. 35 and an arrow view A of FIG. 36B. FIG. 36B is a side view of the electrode holding portion 500.

Figure 37A:
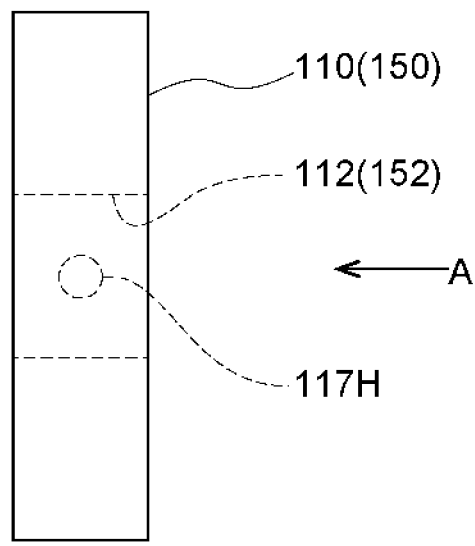
FIG. 37A is a side view of an electrode.
Figure 37B:
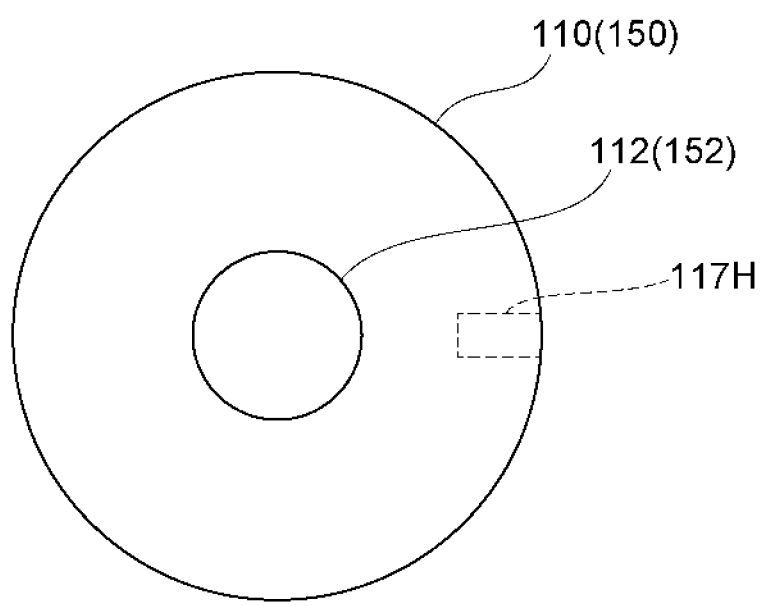
FIG. 37B is a top view of an electrode.

FIG. 37A is a side view of the annular anode 110 or cathode 150, and FIG. 37B is a top view of it and an arrow view A of FIG. 37A. As illustrated in FIGS. 37A and 37B, the inner side openings 112 and 152 as through holes are formed at the center or approximate center of the annular electrode 110 or cathode 150. On the sides of the annular anode 110 and cathode 150, screw holes 117H are formed to screw in the threaded portions of screws 117 for the anode terminal and screws 157 for the cathode terminal.

The electrode holding portion 500 includes a circular recess 118B into which the annular anode 110 or cathode 150 is fitted. It is desirable that the circular recess 118B is designed with a fitting tolerance that is sufficient to prevent the annular anode 110 or cathode 150 from being easily detached when mated. The depth of the circular recess 118B is formed, for example, to be the same or approximately the same as the thickness of the annular anode 110 or cathode 150.

An inner side opening 115 as a through hole that is connected to the inner side openings 112 and 152 of the annular anode 110 or cathode 150 when the annular anode 110 or cathode 150 is mated with the circular recess 118B is formed at the center or approximate center of the circular recess 118B. The inner side opening 115 is formed, for example, to have the same diameter and the same center as the inner side openings 112 and 152.

A notch 511 is formed in the outer periphery 590 of the electrode holding portion 500 where the anode terminal 119 or the negative terminal 159 is mated. The notch 511 is formed in such a manner that the notch is connected to the circular recess 118B from the outer side of the outer periphery 590 also in the thickness direction.

In FIG. 36A, the power cords 119 and 159 are illustrated on paper, but when the anode terminal 119 and negative terminal 159 are mated in the notch 511, the power cords 119 and 159 are arranged in the back direction of the paper in FIG. 36A.

Notches 512, 513, 514, 515, and 516 are formed in the outer periphery 590 of the electrode holding portion 500 for penetrating in the thickness direction and inserting the power cords 119 and 159.

The notches 511 to 516 are formed in the circumferential direction of the outer periphery 590 at the same pitch (60 degrees) counterclockwise in the order of the number.

Guide pawls 530 are formed on the outer periphery 590 of the electrode holding portion 500 to guide the periphery of the anode side mesh electrode 140 and the BDD catalyst electrode. The guide pawls 530 are formed on the opening side of the circular recess 118B and on the insertion side of the annular anode 110 and cathode 150. For example, six guide pawls 530 are formed in the circumferential direction of the outer periphery 590 at the same pitch.

The outer periphery 590 of the electrode holding portion 500 includes screw holes 520 that penetrate in the thickness direction and into which the threaded portion of the bolt 180 is screwed. For example, the six screw holes 520 are formed in the circumferential direction of the outer periphery 590 at the same pitch.

The first electrode holding portion 500' at the top of the figure in FIG. 35 is also configured in the same way as the sixth electrode holding portion 500 illustrated in FIGS. 36A and 36B. However, the first electrode holding portion 500' is configured to be non-through in the thickness direction with no inner side opening 115 and only a circular recess 118B for holding the cathode 150. In the first electrode holding portion 500', formation of notches 512, 513, 514, 515, and 516 for inserting the power cords 119 and 159, which were present in the sixth electrode holding portion 500, is omitted.

Next, the fifth electrode holding portion 600, the fifth from the top in FIG. 35, will be described.

Figure 38A:
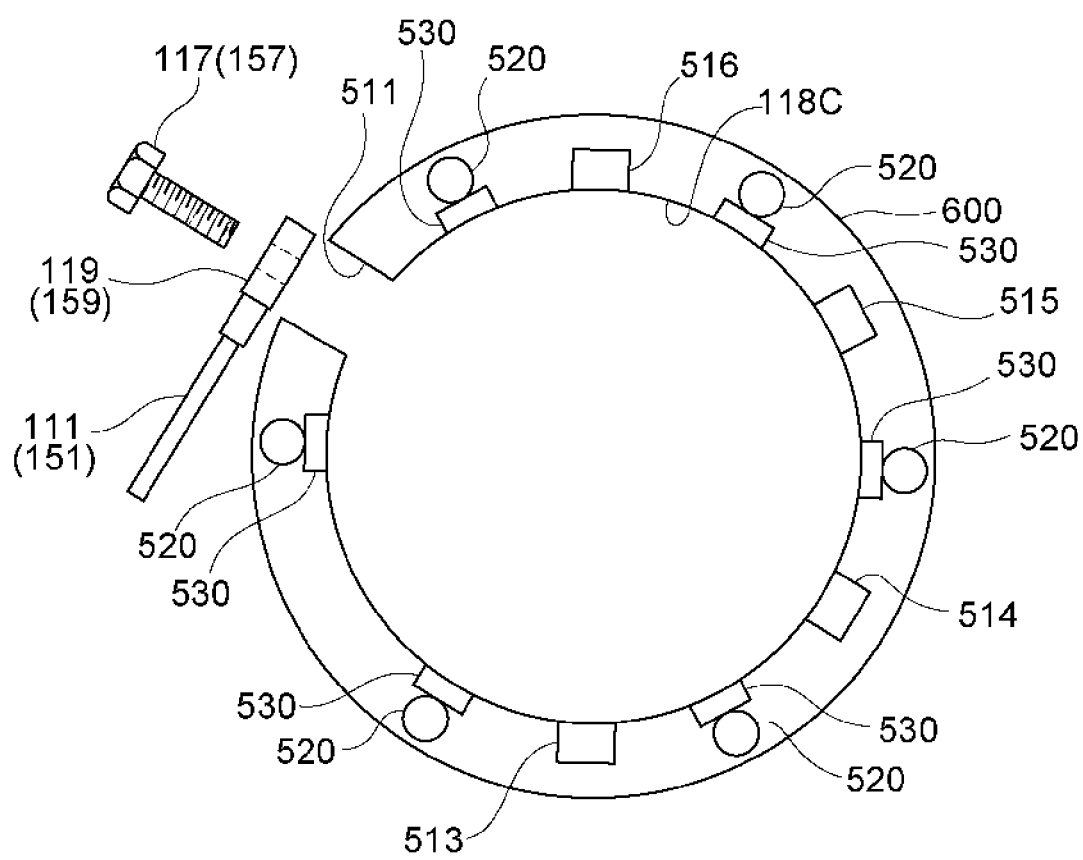
FIG. 38A is a side view of an electrode.
Figure 38B:
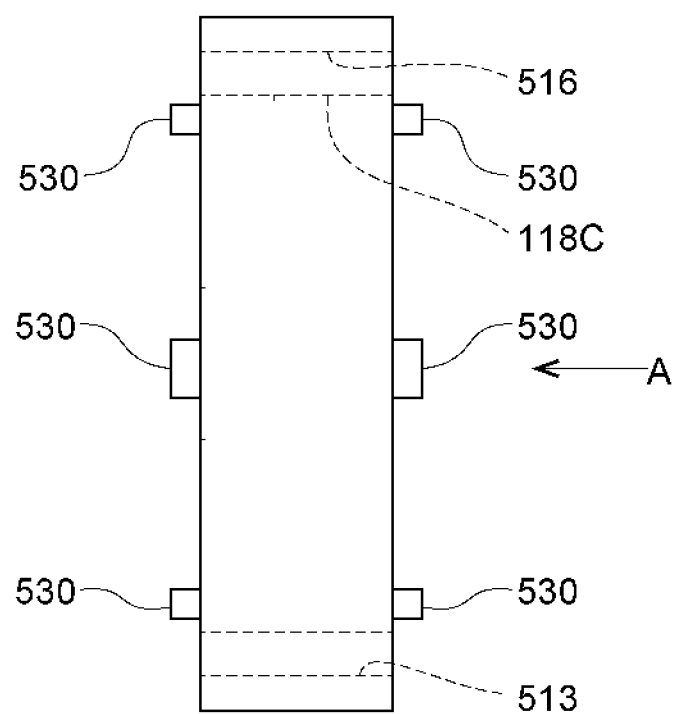
FIG. 38B is a side view of an electrode holding portion.

FIGS. 38A and 38B are top view and sectional view corresponding to FIGS. 36A and 36B, respectively, and illustrate the configuration of the electrode holding portion 600 that holds the common anode 110 and the common cathode 150. The same symbols are assigned to the same components as in FIGS. 36A and 36B, and descriptions are omitted as appropriate.

The electrode holding portion 600 includes a circular opening 118C that is formed as a through hole and into which the annular anode 110 or cathode 150 is fitted. The circular opening 118C should be designed with a fitting tolerance that is sufficient to prevent the annular anode 110 or cathode 150 from being easily detached when mated. The depth of the circular opening 118C, or the thickness of the electrode holding portion 600, is formed to be the same or approximately the same as the thickness of the annular anode 110 or cathode 150, for example.

The guide pawls 530 are provided on both sides of the electrode holding portion 600 (see FIG. 38B). In the fifth electrode holding portion 600, the notches 512 for inserting the power cords 119 and 159 that were in the sixth electrode holding portion 500 are omitted and notches 513 to 516 are formed.

The fourth electrode holding portion 600, the fourth from the top in FIG. 35, is also configured in the same way as the fifth electrode holding portion 600 illustrated in FIGS. 38A and 38B. However, in the fourth electrode holding portion 600, the notches 512 and 513 for inserting the power cords 119 and 159 that were present in the sixth electrode holding portion 500 are omitted, and notches 514 to 516 are formed.

The third electrode holding portion 600, the third from the top in the figure of FIG. 35, is configured in the same way as the fifth electrode holding portion 600 illustrated in FIGS. 38A and 38B. However, in the third electrode holding portion 600, the notches 512, 513, and 514 for inserting the power cords 119 and 159 that were present in the sixth electrode holding portion 500 are omitted, and notches 515 and 516 are formed.

The second electrode holding portion 600, second from the top in the figure of FIG. 35, is also configured in the same way as the fifth electrode holding portion 600 illustrated in FIGS. 38A and 38B. However, in the second electrode holding portion 600, the notches 512, 513, 514, and 515 for inserting the power cords 119 and 159 that were present in the sixth electrode holding portion 500 are omitted, and a notch 516 is formed.

The negative terminal 159 is mated to the notch 511 of the first electrode holding portion 500'. A screw 157 is screwed to the negative terminal 159 and is screwed to the screw hole 117H of the circular cathode 150. As a result, the power cord 151 is electrically connected to the cathode 150 of the electrode holding portion 500'.

Hereinafter, in the same manner as above, the power cord 111 is electrically connected to the anode 110 of the second electrode holding portion 600. The power cord 151 is electrically connected to the cathode 150 of the third electrode holding portion 600. The power cord 111 is electrically connected to the anode 110 of the fourth electrode holding portion 600. The power cord 151 is electrically connected to the cathode 150 of the fifth electrode holding portion 600. The power cord 111 is electrically connected to the anode 110 of the sixth electrode holding portion 500.

In the following, for convenience of description, the notches 511 to 516 formed in the first electrode holding portion 500', the second electrode holding portion 600, the third electrode holding portion 600, the fourth electrode holding portion 600, the fifth electrode holding portion 600, and the sixth electrode holding portion 500 are treated as being arranged in the order of numbers 511 to 516 in a counterclockwise direction when viewed from above in FIG. 35.

The second electrode holding portion 600 is displaced 60 degrees counterclockwise in such a manner that the position of the notch 511 of the first electrode holding portion 500' corresponds to the position of the notch 516 of the second electrode holding portion 600 when viewed from above in FIG. 35. The power cord 151 electrically connected to the first electrode holding portion 500' is inserted into the notch 516 of the second electrode holding portion 600.

Similarly, the third electrode holding portion 600 is displaced 60 degrees counterclockwise to the second electrode holding portion 600. The power cord 151 electrically connected to the first electrode holding portion 500' is inserted into the notch 515 of the third electrode holding portion 600, and the power cord 111 electrically connected to the second electrode holding portion 600 is inserted into the notch 516 of the third electrode holding portion 600.

Similarly, the fourth electrode holding portion 600 is displaced 60 degrees counterclockwise to the third electrode holding portion 600. The power cord 151 electrically connected to the first electrode holding portion 500' is inserted into the notch 514 of the fourth electrode holding portion 600, and the power cord 111 electrically connected to the second electrode holding portion 600 is inserted into the notch 515 of the fourth electrode holding portion 600. The power cord 151 electrically connected to the third electrode holding portion 600 is inserted into the notch 516 of the fourth electrode holding portion 600.

Similarly, the fifth electrode holding portion 600 is displaced 60 degrees counterclockwise with respect to the fourth electrode holding portion 600. The power cord 151 electrically connected to the first electrode holding portion 500' is inserted into the notch 513 of the fifth electrode holding portion 600, and the power cord 111 electrically connected to the second electrode holding portion 600 is inserted into the notch 514 of the fifth electrode holding portion 600. The power cord 151 electrically connected to the third electrode holding portion 600 is inserted into the notch 515 of the fifth electrode holding portion 600. The power cord 111 electrically connected to the fourth electrode holding portion 600 is inserted into the notch 516 of the fifth electrode holding portion 600.

Similarly, the sixth electrode holding portion 500 is displaced 60 degrees counterclockwise with respect to the fifth electrode holding portion 600. The power cord 151 electrically connected to the first electrode holding portion 500' is inserted into the notch 512 of the sixth electrode holding portion 600, and the power cord 111 electrically connected to the second electrode holding portion 600 is inserted into the notch 513 of the sixth electrode holding portion 600. The power cord 151 electrically connected to the third electrode holding portion 600 is inserted into the notch 514 of the sixth electrode holding portion 600. The power cord 111 electrically connected to the fourth electrode holding portion 600 is inserted into the notch 515 of the sixth electrode holding portion 600. The power cord 151 electrically connected to the fifth electrode holding portion 600 is inserted into the notch 516 of the sixth electrode holding portion 600.

The first electrode holding portion 500', the second electrode holding portion 600, the third electrode holding portion 600, the fourth electrode holding portion 600, the fifth electrode holding portion 600, and the sixth electrode holding portion 500 are tightened together in the thickness direction by screwing the threaded portion of the bolt 180 into the screw hole 520 formed in each.

The same electrode holding portions 500, 500', and 600 can be applied to the water electrolysis device consisting of the three-stage water electrolysis portion illustrated in FIG. 34. In this case, the cathode holding portion 158', anode holding portion 118, cathode holding portion 158, and anode holding portion 118' illustrated in FIG. 34 can be replaced with electrode holding portion 500', electrode holding portion 600, electrode holding portion 600, and electrode holding portion 500, respectively. However, at most three notches for inserting the power cords 111 and 151 may be needed. A similar anode terminal 119, a notch 511 for fitting a negative terminal 159, and notches 512, 513, and 514 for inserting power cords 111 and 151 are formed at the same pitch in the circumferential direction in the bottom anode holding portion 118' in FIG. 34. In the third cathode holding portion 158 from the top in the figure of FIG. 34, notch 512 is omitted and notches 513 and 514 are formed. In the second anode holding portion 118 from the top in the figure in FIG. 34, notches 512 and 513 are omitted and notches 514 are formed. In the top cathode holding portion 158' in the figure of FIG. 34, the notches 512, 513, and 514 are omitted. Then, each electrode holding portion 158', anode holding portion 118, cathode holding portion 158, and anode holding portion 118' can be sequentially staggered and arranged at the same pitch, and the power cords 111 and 151 of the upper electrode holding portion in the figure of FIG. 34 can be inserted into the notches 512, 513, and 514 of the lower electrode holding portion in the figure.

Figure 39:
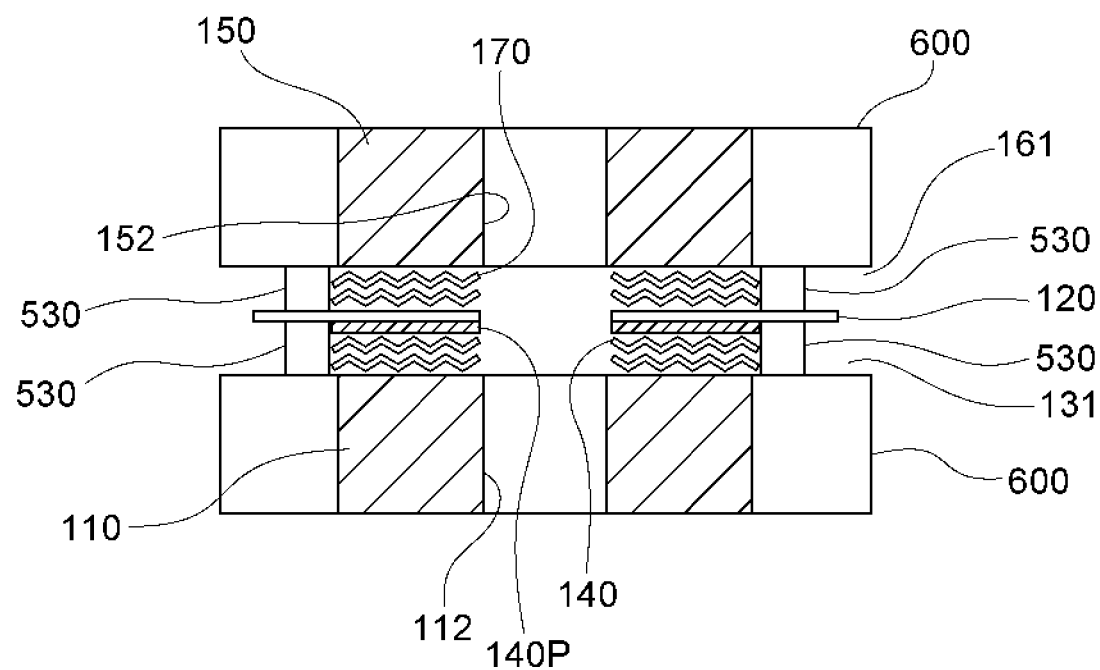
FIG. 39 is a side sectional view of two electrode holding portions adjacent to each other in the thickness direction.

FIG. 39 illustrates a side sectional view of two electrode holding portions 600 and 600 adjacent to each other in the thickness direction. The polymer electrolyte membrane 120 is sandwiched between the guide pawls 530 of one electrode holding portion 600 and the guide pawls 530 of the other electrode holding portion 600 facing the guide pawls. The outer periphery of the anode side mesh electrode 140 and the catalyst electrode 140P containing boron-doped diamond are guided by the guide pawls 530 of one electrode holding portion 600, and the lateral movement in the figure is restricted. Similarly, the outer periphery of the cathode side mesh electrode 170 is guided by the guide pawls 530 of the other electrode holding portion 600, and movement in the horizontal direction in the figure is restricted. The other two electrode holding portions 500, 600 and 500', 600 adjacent to each other in the thickness direction are configured in the same way.

The inner side openings of the mesh electrodes 140, 170, the catalyst electrode 140P, and the polymer electrolyte membrane 120 in each of the five water electrolysis portions 100-1 to 100-5 communicate with the common inlet 310 of the housing 300 in FIG. 35. Furthermore, the outer peripheral openings 131, 161 of each of the five-stage water electrolysis portions 100-1 to 100-5 communicate with the common outlet 320 of the housing 300 via the gas-liquid mixing portion 200.

The gas-liquid mixing portion 200 is interposed between the five-stage water electrolysis portions 100-1 to 100-5 and the common outlet 320 in the housing 300.

The gas-liquid mixing inlet portion 202 of the gas-liquid mixing portion 200 is connected to the peripheral openings 131 and 161 of each of the five-stage water electrolysis portions 100-1 to 100-5. The gas-liquid mixing outlet portion 203 of the gas-liquid mixing portion 200 is connected to the common outlet 320 of the housing 300.

When water flows in the common inlet 310 from below, water flows in the anode side electrolytic domain and the cathode side electrolytic domain of water electrolysis portions 100-1 to 100-5, respectively, via the respective inner side openings, as illustrated in FIG. 33, and water electrolysis is carried out.

The electrolytic water generated in each of the water electrolysis portions 100-1 to 100-5 merges via the respective outer peripheral openings 131 and 161 and flows in the gas-liquid mixing inlet portion 202 of the gas-liquid mixing portion 200.

In the gas-liquid mixing portion 200, mixing of gas and electrolytic water is accelerated, and the gas is dissolved in the electrolytic water with high efficiency. The electrolytic water in which the gas is dissolved efficiently is discharged to the outside via the gas-liquid mixing outlet portion 203 and the common outlet 320.

When raw water flows via the gap between the anode side mesh electrodes 140 of water electrolysis portions 100-1 to 100-5 and is electrolyzed, the water becomes anode water containing ozone and oxygen and hydrogen peroxide. When raw water flows via the gap between the cathode side mesh electrodes 170 of water electrolysis portions 100-1 to 100-5 and is electrolyzed, the water becomes cathode water containing hydrogen and hydrogen peroxide. The anode water and the cathode water merge and flow out from the common outlet 320.

In the configuration example of FIG. 35, raw water flows in each of the inner side opening of the water electrolysis portions 100-1 to 100-5, and electrolytic water flows out from each of the outer peripheral openings 131 and 161.

However, as in the configuration example in FIG. 8, the water electrolysis portions 100-1 to 100-5 can be configured to allow raw water to flow in each of the outer peripheral openings 131 and 161, and electrolytic water to flow out of each of the inner side openings.

In this configuration, the inner side openings of the mesh electrodes, catalyst electrodes, and polymer electrolyte membranes in each of the water electrolysis portions 100-1 to 100-5 are made to communicate with the gas-liquid mixing inlet portion 202 of the gas-liquid mixing portion 200 and to be communicate with the common outlet 320 via the gas-liquid mixing inlet portion 202. Furthermore, the outer peripheral openings 131 and 161 of each of the water electrolysis portions 100-1 to 100-5 are made to communicate with the common inlet 310.

As described above, when five water electrolysis apparatuses with only one water electrolysis portion 100 are connected in parallel and used without this configuration, a total of ten anodes 110 and cathodes 150 are required as anode and cathode terminals. As a result, a large number of joints are required. However, in the water electrolysis apparatus illustrated in FIG. 35, the anode 110 and cathode 150 can be shared. For this reason, the number of anodes 110 and cathodes 150 as terminals is only six in total, and only two joints, the common inlet 310 and outlet 320, are needed.

An example of a water electrolysis apparatus illustrated in FIG. 35 is composed of the housing 300 with an inner diameter of 10 cm and the water electrolysis portion 400 with an outer diameter of 9.4 cm. In order to dissolve ozone gas sufficiently in water, the gas-liquid mixing portion 200 has a length of 30 cm.

The inner and outer diameters of the metal mesh electrodes 140, 170 and BDD substrate electrode 140P and the polymer electrolyte membrane 120 are 2 cm and 7.35 cm, respectively, and the total electrode area of the five-stage water electrolysis portions 100-1 to 100-5 is 196 cm$^2$.

Here, a one-stage type water electrolysis apparatus with an electrode area of 8.6 cm$^2$, such as Example 1, is used for comparison. According to the embodiment, the electrode area can be 22.8 times larger (196 cm$^2$) than that of the one-stage type water electrolysis apparatus by stacking the water electrolysis portions in five stages and increasing the diameter of the electrodes per stage.

The apparatus can be made much smaller, lighter, and cheaper than five water electrolysis apparatuses with only one water electrolysis portion connected in parallel.

Furthermore, since all ozone gas generated by the gas-liquid mixing portion 200 is dissolved in water, gas-phase ozone is almost eliminated and safe advanced oxidation water can be generated. The piping connection between the water electrolysis portion 400 and the gas-liquid mixing portion 200 becomes unnecessary.

According to the embodiment, a compact and safe advanced oxidation water production apparatus that does not generate ozone gas can be provided to the market. Such an apparatus can be used to sterilize wastewater, contaminated river water, and well water. When used for such a purpose, ozone gas generation from the water coming out from a treatment apparatus is suppressed, and safe treated water can be obtained.

Example 7

Figure 40:
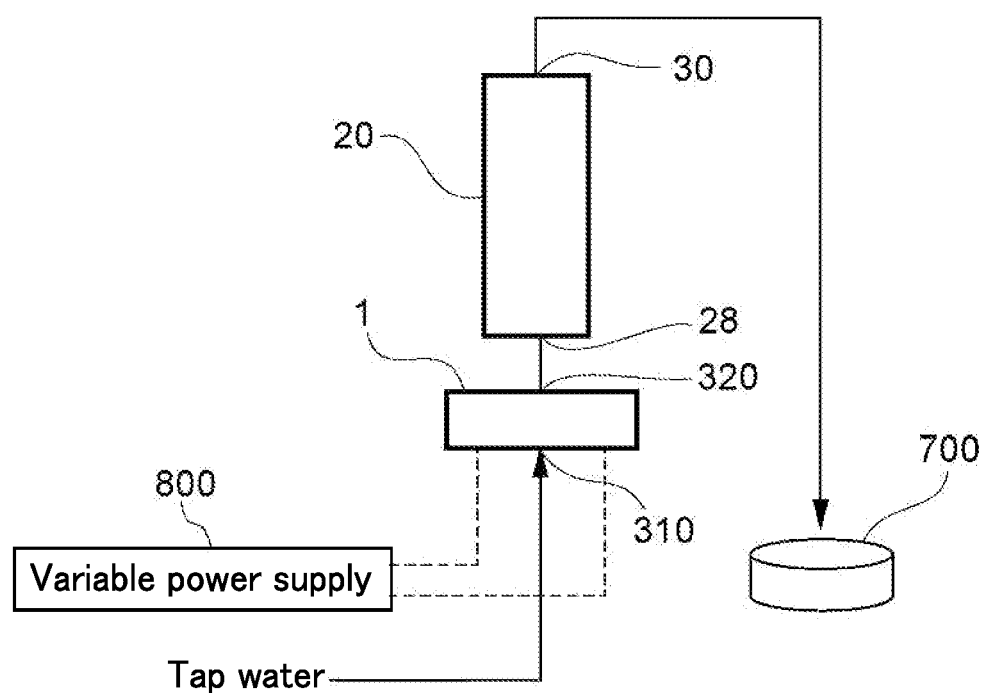
FIG. 40 is a diagram illustrating the configuration of the water electrolysis apparatus of Example 7.

FIG. 40 illustrates a configuration of an apparatus with piping connected in such a manner that the inlet portion 28 of the gas-liquid mixing apparatus 20 disclosed in JP-A No. 2019-42628 is connected to the common outlet 320 of the three-stage parallel type water electrolysis apparatus 1 illustrated in FIG. 34. The gas-liquid mixing apparatus 20 is configured in a similar manner to the gas-liquid mixing portion 200.

Tap water flows in the common inlet 310 of the three-stage parallel type water electrolysis apparatus 1. The advanced oxidation water flows out from the outlet 30 of the gas-liquid mixing apparatus 20 and is stored in a container 700.

A variable power supply 800 applies a direct current voltage between the anode 110 and the cathode 150 of the three-stage parallel type water electrolysis apparatus 1. The magnitude of the voltage V applied between the anode 110 and the cathode 150 by the variable power supply 800 can be adjusted.

On the anode side of each of the three water electrolysis portions 100-1 to 100-3, five 100-mesh titanium (Ti) mesh electrodes 120 and one boron-doped diamond (BDD) substrate electrode 140P are placed. On the cathode side, three 100-mesh titanium (Ti) mesh electrodes 170 are placed. The anode side mesh electrode 140, the substrate electrode 140P, and the cathode side mesh electrode 170 are annular in shape with an outer diameter of 3.95 cm and an inner diameter of 1.2 cm.

The total electrode area of the three-stage water electrolysis portions 100-1 to 100-3 is 34 $cm^2$. The gas-liquid mixing apparatus 20 is provided with 33 stages of holding members 210 composed of Teflon O-rings. The gas-liquid mixing apparatus 20 is provided with 33 stages (66 pieces) of partitioning members 220 composed of 100-mesh made of titanium (Ti). The gas-liquid mixing apparatus 20 has an inner diameter of 8 cm and a height of 24 cm.

Figure 41:
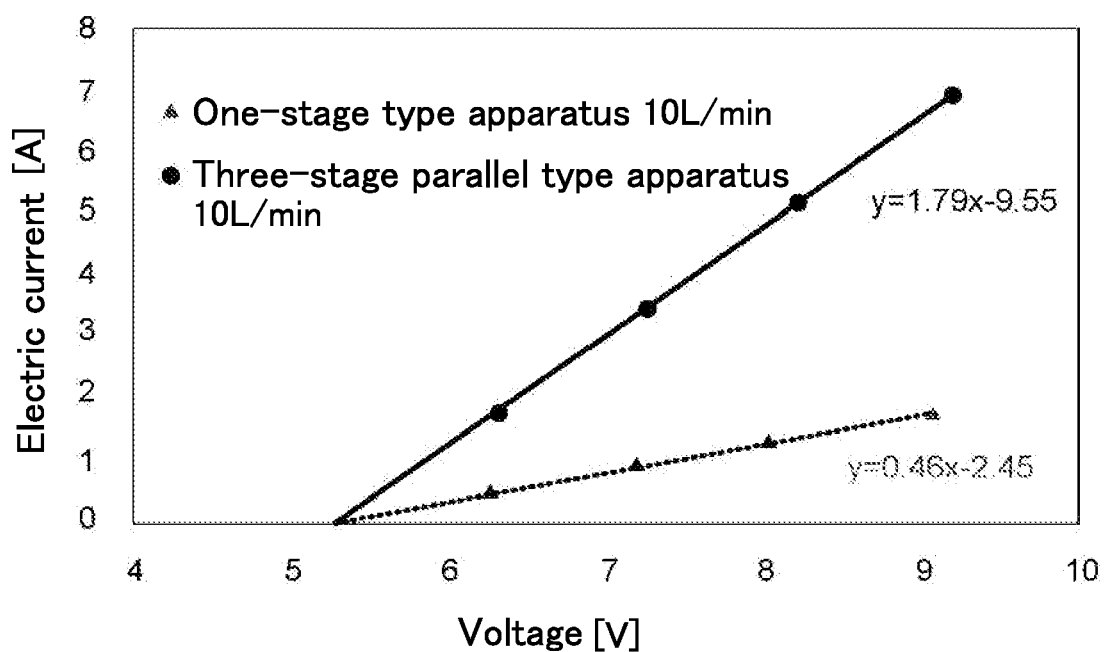
FIG. 41 is a diagram illustrating the voltage-current characteristics of the water electrolysis apparatus of Example 7.
Figure 42:
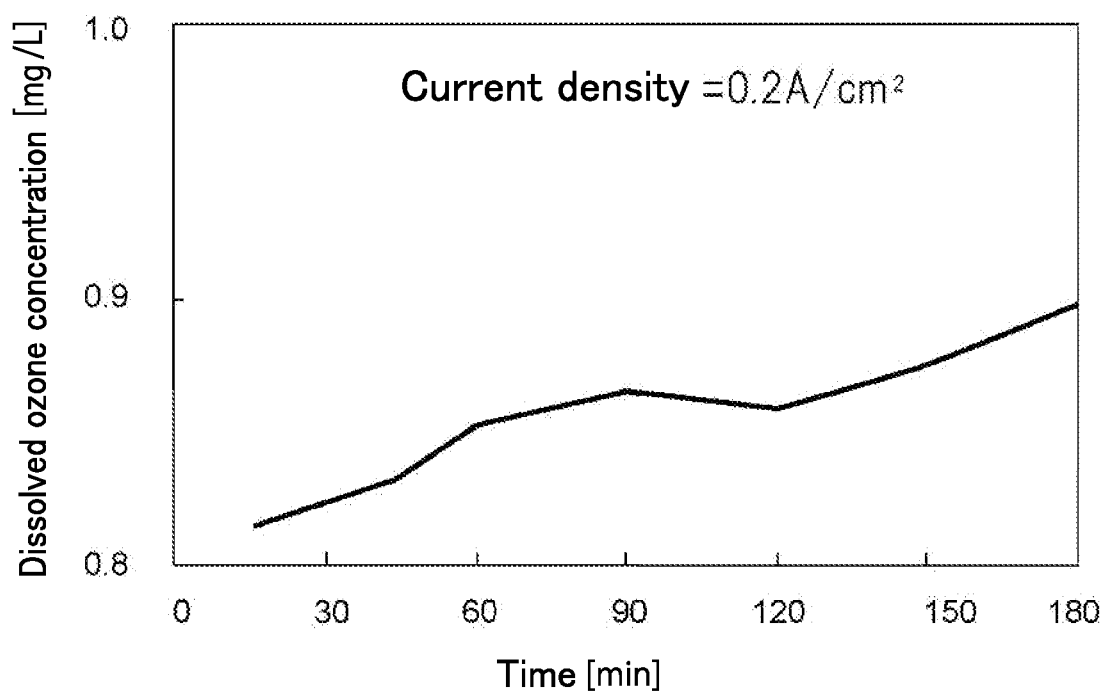
FIG. 42 is a diagram illustrating the change in dissolved ozone concentration over time in the advanced oxidation water generated by the water electrolysis apparatus of Example 7.
Figure 43:
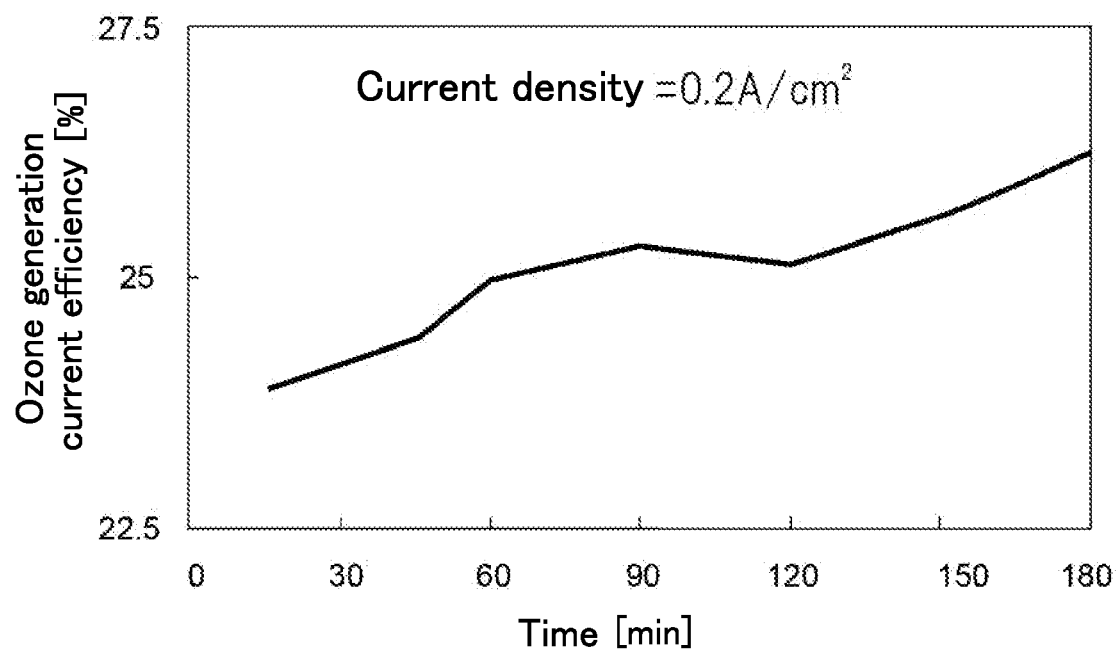
FIG. 43 is a diagram illustrating the change in ozone generation current efficiency over time in the water electrolysis apparatus of Example 7.

Tap water was flowed into the common inlet 310 of the three-stage parallel type water electrolysis apparatus 1 at a flow rate of 10 L/min, and water electrolysis was performed by applying current between the anode 110 and the cathode 150. The voltage-current characteristics of the three-stage parallel type water electrolysis apparatus 1 of Example 7 are illustrated in FIG. 41 as solid lines. FIG. 42 illustrates the change over time of the dissolved ozone concentration in the advanced oxidation water generated by the three-stage parallel type water electrolysis apparatus 1. The change over time of the ozone generation current efficiency in the three-stage parallel type water electrolysis apparatus 1 is illustrated in FIG. 43.

Comparative Example 3

For Comparative Example 3, which corresponds to Example 7, a one-stage type water electrolysis apparatus in which the one-stage water electrolysis portion 100 with an electrode area of 8.6 $cm^2$ and the gas-liquid mixing portion 200 are built into the housing 300. This one-stage type water electrolysis apparatus also includes a single boron-doped diamond (BDD) substrate electrode 140P on the anode side. Tap water was flowed in the inlet 310 of this one-stage water electrolysis apparatus at a flow rate of 4 L/min, and water electrolysis was carried out by passing an electric current between the anode 110 and the cathode 150.

The voltage-current characteristics of the one-stage water electrolysis apparatus of Comparative Example 3 is illustrated in FIG. 41 as a dashed line. From FIG. 41, it can be seen that compared to the one-stage water electrolysis apparatus, the three-stage parallel type water electrolysis apparatus 1 is capable of 3.9 times higher current flow under the same voltage due to the larger electrode area.

As can be seen from FIG. 42, when a current density of 0.2 $A/cm^2$ is applied to the three-stage parallel type water electrolysis apparatus 1, advanced oxidation water containing 0.9 mg/L of dissolved ozone can be generated at a high flow rate of 10 L/min.

From FIG. 43, it can be seen that the ozone generation current efficiency at a current density of 0.2 $A/cm^2$ of the three-stage parallel type water electrolysis apparatus 1 was 25% or more. The hydrogen peroxide concentration of the advanced oxidation water was from 0.2 to 0.3 mg/L.

On the other hand, when a current density of 0.2 A/cm' was applied to the one-stage water electrolysis apparatus, the dissolved ozone concentration in the advanced oxidation water generated at a flow rate of 4 L/min was 0.48 mg/L, and the hydrogen peroxide concentration was 0.2 mg/L.

Therefore, the three-stage parallel type water electrolysis apparatus 1 can achieve higher flow rates and higher concentrations of dissolved ozone than the one-stage type water electrolysis apparatus.

It was confirmed that the advanced oxidation water generated by the three-stage parallel type water electrolysis apparatus 1 had sufficient sterilization/cleaning power when used for sterilization applications. Therefore, it was found that the water electrolysis apparatus of Example 7 can generate advanced oxidation water with sufficient sterilization/cleaning power at a high flow rate of 10 L/min.

Example 8

The three-stage parallel type water electrolysis apparatus of Example 7, illustrated in FIG. 40, was used to evaluate the sterilization/cleaning effect of contaminated water.

In the sterilization/cleaning method, contaminated water containing bacteria and/or viruses was directly supplied to the common inlet 310 of the three-stage parallel type water electrolysis apparatus 1 instead of tap water, and contaminated water after treatment (sterilized and cleaned) having reduced ATP (adenosine triphosphate) value was flowed out from the common outlet 320 of the three-stage parallel type water electrolysis apparatus 1. This sterilization/cleaning method of contaminated water is referred to as the first sterilization/cleaning method.

The procedure for sterilization/cleaning of contaminated water is as follows.

1) River water is collected as contaminated raw water. After the river water is collected, the water is left indoors for a day and night to stabilize the bacteria count.

2) After stabilizing the number of bacteria in the contaminated raw water, the contaminated raw water is supplied at a flow rate of 2 L/min to the common inlet 310 of the three-stage parallel type water electrolysis apparatus 1. A current of 7 A with a current density of 0.2 A/cm' is passed between the anode 110 and the cathode 150 of the three-stage parallel type water electrolysis apparatus 1.

3) The sterilization/cleaning effect of the contaminated water after treatment stored in the container 700 is evaluated. The evaluation method is to measure the concentration of ATP (adenosine triphosphate), which is an essential substance for the energy metabolism of all living organisms. This method is commonly referred to as the "luminol reaction". Since the environment is not sterile, and beakers used for sample collection are not sterilized, the ATP indicator value will not be zero even when the river water is completely sterilized. Therefore, the ATP value of tap water (RLU=7) was used as an indicator of the sterilization level, and when the ATP value fell below 7, the river water was considered to have been completely sterilized.

The results of the sterilization experiment of the three-stage parallel type water electrolysis apparatus 1 are shown in FIG. 44 as Table 1. When contaminated raw water was supplied to the three-stage parallel type water electrolysis apparatus 1 and the contaminated water after treatment was evaluated, the ATP value of the contaminated raw water before treatment of 357 was reduced to the ATP value of the contaminated water after treatment of 7. When tap water was supplied to the three-stage parallel type water electrolysis apparatus 1 under the same operating conditions of flow rate and current density to electrolyze tap water and produce advanced oxidation water, the dissolved ozone concentration in the produced advanced oxidation water was 2.7 mg/L and the hydrogen peroxide concentration was 0.42 mg/L. Accordingly, it was confirmed that an apparatus that generates advanced oxidation water with a dissolved ozone concentration of 2.7 mg/L and a hydrogen peroxide concentration of 0.42 mg/L can completely sterilize and clean contaminated water with an ATP value of 357 with strong sterilization power.

The first sterilization/cleaning method of contaminated water by direct electrolysis was described, but the second sterilization/cleaning method by mixing advanced oxidation water and contaminated water can also be used.

In the second sterilization/cleaning method, tap water is supplied to the common inlet 310 of the three-stage parallel type water electrolysis apparatus 1 to generate advanced oxidation water. The generated advanced oxidation water is then mixed with contaminated water containing bacteria and/or viruses to reduce the ATP (adenosine triphosphate) value to 7 or less (sterilization/cleaning), for example.

By configuring the apparatus to be able to generate further advanced oxidation water, the first sterilization/cleaning method and the second sterilization/cleaning method can be carried out using any form of water electrolysis apparatus of each embodiment and each Example disclosed herein. The advanced oxidation water can be used for application of sterilization/cleaning of contaminated water.

Advanced oxidation water, in which dissolved ozone and hydrogen peroxide coexist, is also useful in applications to decompose and treat organic matter and/or ammonia and/or cyanide from contaminated water.

For example, the following first or second decomposition/treatment method is carried out using the three-stage parallel type water electrolysis apparatus 1 illustrated in FIG. 34.

(First Decomposition/treatment Method)

Contaminated water containing organic matter and/or ammonia and/or cyanide is directly supplied to the common inlet 310 of the three-stage parallel type water electrolysis apparatus 1 instead of tap water, and the water in which organic matter and/or ammonia and/or cyanide have been decomposed and treated is discharged from the common outlet 320 of the three-stage parallel type water electrolysis apparatus 1 from the common outlet 320 of the three-stage parallel type water electrolysis apparatus 1.

(Second Decomposition/treatment Method)

Tap water is supplied to the common inlet 310 of the three-stage parallel type water electrolysis apparatus 1 to generate advanced oxidation water. The generated advanced oxidation water is then mixed with contaminated water containing organic matter and/or ammonia and/or cyanide to decompose and treat the organic matter and/or ammonia and/or cyanide in the contaminated water.

The first decomposition/treatment method and the second decomposition/treatment method can be implemented using any form of water electrolysis apparatus of each embodiment and each Example disclosed herein when configured to be able to generate further advanced oxidation water.

The first sterilization/cleaning method, the second sterilization/cleaning method, the first decomposition/treatment method, and the second decomposition/treatment method may be implemented in combination. Implementation of the first sterilization/cleaning method and/or the second sterilization/cleaning method and/or the first decomposition/treatment method and/or the second decomposition/treatment method allows contaminated water containing ammonia and E. coli to be made drinkable. For example, when tap water with ammonia added at a concentration of about 0.03% was supplied to the three-stage parallel type water electrolysis apparatus 1 illustrated in FIG. 34, odorless water with ammonia completely decomposed was obtained.

When wastewater containing organic matter and cyanide was supplied to the three-stage parallel type water electrolysis apparatus 1 illustrated in FIG. 34, the organic matter and cyanide in the wastewater was decomposed and treated. Therefore, the water electrolysis apparatus disclosed herein can be used for wastewater treatment applications.

Example 9

Example of using a five-stage parallel type water electrolysis apparatus 1 with a built-in gas-liquid mixing portion illustrated in FIG. 35 to generate a large flow rate of advanced oxidation water will be described.

On the anode side of each of the five-stage water electrolysis portions 100-1 to 100-5, six 100-mesh titanium (Ti) mesh electrodes 120 and one boron-doped diamond (BDD)-supported titanium (Ti) mesh electrode 140P are placed. On the cathode side, three 100-mesh titanium (Ti) mesh electrodes 170 are placed. The total electrode area of the five-stage water electrolysis portions 100-1 to 100-5 is 196 $cm^2$.

Tap water was flowed in the common inlet 310 of the five-stage parallel type water electrolysis apparatus 1 at a flow rate of 30 L/min, and a current of 30 A with a current density of 0.15 $A/cm^2$ was applied between the anode 110 and the cathode 150 to carry out water electrolysis, and advanced oxidation water was generated.

The common inlet 310 of the five-stage parallel type water electrolysis apparatus 1 was used to flow out the generated advanced oxidation water. The pressure loss of the five-stage parallel type water electrolysis apparatus 1 under the conditions of this operation was as small as 0.02 MMPa. The generated advanced oxidation water contained 0.9 mg/L of dissolved ozone and 0.3 mg/L of hydrogen peroxide. The generated advanced oxidation water was used for sterilization/cleaning applications, and was found to have sufficient sterilization power.

In another operating condition, tap water was flowed in the common inlet 310 of the five-stage parallel type water electrolysis apparatus 1 at a flow rate of 50 L/min to carry out water electrolysis, and advanced oxidation water was generated.

The dissolved ozone concentration in the advanced oxidization water generated under the conditions of this operation was 0.5 mg/L, and the hydrogen peroxide concentration was 0.2 mg/L. When the generated advanced oxidation water was used for sterilization/cleaning, it was confirmed that the water had sufficient sterilization power.

Under all operating conditions, ozone gas is efficiently dissolved in the water at the gas-liquid mixing portion 200. Therefore, there was no generation of gas-phase ozone harmful to the human body. The ozone generation current efficiency was from 15 to 17%.

Such a water electrolysis apparatus capable of generating a large flow rate of advanced oxidation water can be used for applications of sterilizing processed foods such as agricultural products, fish, meat, and cut vegetables, as well as for sterilizing kitchens and tableware in restaurants. The water electrolysis apparatus of the embodiment is useful particularly when there are regulations on the use of chlorine-based sterilization/cleaning agents. When there are regulations on gas-phase ozone concentration, the water electrolysis apparatus of the embodiment that generates almost no gas-phase ozone is useful.

In the above description, a configuration in which the electrodes are common for at least two water electrolysis portions adjacent to each other in the water electrolysis apparatus thickness direction is also possible. For example, an implementation in which the anode 110 of one of the two water electrolysis portions 100-2 and 100-3 adjacent to each other in the thickness direction is configured to be a common electrode, but the other two water electrolysis portions 100-1 and 100-2 adjacent to each other in the thickness direction are configured to be individual cathodes is also possible.

In the tenth embodiment, the thirteenth embodiment, the fourteenth embodiment, Example 7, Example 8, and Example 9, the electrodes were configured to be common for at least two water electrolysis portions adjacent to each other in the thickness direction.

However, in a configuration in which a plurality of water electrolysis portions are placed in parallel, the electrodes are not necessarily required to be common. For example, in a configuration in which a plurality of water electrolysis portions are placed in parallel, the plurality of water electrolysis portions may be arranged with respective inner side openings communicating with a common inlet and respective outer peripheral openings communicating with a common outlet. Alternatively, the plurality of water electrolysis portions may be arranged with respective inner side openings communicating with a common outlet and respective outer peripheral openings communicating with a common inlet.

The disclosure of JP-A No. 2019-031029, filed on Feb. 22, 2019, is incorporated herein by reference in its entirety.

All publications, patent applications, and technical standards mentioned in this specification are incorporated herein by reference to the same extent as if each individual publication, patent application, or technical standard was specifically and individually indicated to be incorporated by reference.

The invention claimed is:

1. A water electrolysis apparatus, comprising:
an inlet (310) through which raw water flows in from an exterior, wherein the inlet is formed on one side of a housing (300) in an axial direction;
an outlet (320) through which electrolytic water flows out to the exterior, wherein the outlet is formed at the other end of the housing (300) in the axial direction; and
a water electrolysis portion interposed between the inlet and the outlet, wherein the water electrolysis portion is arranged inside the housing (300), and wherein the water electrolysis portion includes:
an anode (110) that is a plate, electrically connected to a positive terminal of a power source, and arranged such that the axial direction of the housing (300) is a thickness direction of the plate;
a cathode (150) that is a plate, electrically connected to a negative terminal of the power source, and arranged such that the axial direction of the housing (300) is the thickness direction of the plate,
wherein either one of the anode (110) and the cathode (150) constitutes an inlet side electrode (150) disposed at a position facing the inlet (310), and wherein the inlet side electrode (150) has an inner side opening (152) formed at its center position or approximately at its center position, and which penetrates in the thickness direction;
a polymer electrolyte membrane (120) that is disposed between the anode (110) and the cathode (150), and is disposed such that the axial direction of the housing (300) is the thickness direction of the membrane,
wherein the polymer electrolyte membrane (120) has an inner side opening (121) formed at its center or approximately at its center, and which penetrates in the thickness direction of the membrane, and
wherein the inner side opening (121) of the polymer electrolyte membrane (120) communicates with the inner side opening (152) of the inlet side electrode (150);
an anode side mesh electrode (140) that is located between the anode (110) and the polymer electrolyte membrane (120) at a position in contact with the anode (110), and is electrically connected to the anode (110), whereby a region between the anode (110) and the polymer electrolyte membrane (120) constitutes an anode side electrolytic domain (130), wherein an outer periphery of the anode side mesh electrode (140) constitutes an outer periphery opening (131) of the anode side electrolytic domain (130) that communicates with the outlet (320),
wherein the anode side mesh electrode (140) has an inner side opening (141) being a through hole formed in the center or approximately the center of the anode side mesh electrode (140), penetrating in a thickness direction of the anode side mesh electrode (140), and having a size perpendicular to the thickness direction of the anode side mesh electrode (140) larger than the pore diameter of the mesh wherein the inner side opening (141) is connected to the inner side opening (121) of the polymer electrolyte membrane (120),
whereby the outer peripheral opening (131) of the anode side electrolytic domain (130) and the inner side opening (141) of the anode side mesh electrode (140) are communicated with each other, and a radial flow from the inner side opening (141) of the anode side mesh electrode (140) to the outer peripheral opening (131) of the anode side electrolytic domain (130) is formed; and
a cathode side mesh electrode that is located between the polymer electrolyte membrane (120) and the cathode (150) at a position in contact with the cathode (150), and is electrically connected to the cathode (150), whereby the region between the cathode (150) and the polymer electrolyte membrane (120) constitutes a cathode side electrolytic domain (160),
wherein an outer periphery of the cathode side mesh electrode (170) constitutes an outer periphery opening (161) of the cathode side electrolytic domain (160) that communicates with the outlet (320),
wherein the cathode side mesh electrode (170) has an inner side opening (171) being a through hole formed in the center or approximately the center of the cathode side mesh electrode (170), penetrating in a thickness direction of the cathode side mesh electrode (170), and having a size perpendicular to the thickness direction of the cathode side mesh electrode (170) larger than the pore diameter of the mesh, wherein the inner side opening (171) is connected to the inner side opening (121) of the polymer electrolyte membrane (120), and whereby the outer periphery opening (161) of the cathode side electrolytic domain (160) and the inner side opening (171) of the cathode side mesh electrode (170) are communicated with each other, and a radial flow from the inner side opening (171) of the cathode side mesh electrode (170) to the outer periphery opening (161) of the cathode side electrolytic domain (160) is formed.

2. The water electrolysis apparatus according to claim 1, wherein:

a plurality of the water electrolysis portions are interposed between the inlet and the outlet, and the plurality of the water electrolysis portions are arranged in such a manner that a flow of water in the anode side electrolytic domain and the cathode side electrolytic domain of one of the plurality of water electrolysis portions and a flow of water in the anode side electrolytic domain and the cathode side electrolytic domain of another of the plurality of water electrolysis portions are parallel to each other.

3. The water electrolysis apparatus according to claim 2, wherein the cathode or the anode of one of the plurality of water electrolysis portions is the same as the cathode or the anode of another of the plurality of water electrolysis portions.

4. The water electrolysis apparatus according to claim 1, wherein:

the inlet and the outlet are provided at a housing, the water electrolysis portion is arranged in the housing, a gas-liquid mixing portion is interposed between the water electrolysis portion and the outlet in the housing, and the gas-liquid mixing portion includes:

a gas-liquid mixing inlet portion that is connected to the outer peripheral opening of the anode side electrolytic domain and the outer peripheral opening of the cathode side electrolytic domain of the water electrolysis portion; and a gas-liquid mixing outlet portion that discharges a fluid that has been gas-liquid mixed and that is connected to the outlet.

5. The water electrolysis apparatus according to claim 4, wherein the gas-liquid mixing portion includes:

a plurality of partitioning portions interposed between the gas-liquid mixing inlet portion and the gas-liquid mixing outlet portion, including a plurality of openings, spaced apart in an axial direction of the housing, and partitioning the inside of the housing in the axial direction; and a holding member arranged between the partitioning portions that are adjacent to each other in the axial direction and configured to maintain the spacing between the partitioning portions, wherein a space portion between the adjacent partitioning portions in the axial direction functions as a chamber that traps gas generated in the water electrolysis portion and forms a gas accumulation.

6. The water electrolysis apparatus according to claim 5, wherein each of the partitioning portions comprises a partitioning member with a plurality of openings.

7. The water electrolysis apparatus according to claim 1, wherein:

a plurality of the water electrolysis portions are provided, and the plurality of the water electrolysis portions are arranged in such a manner that each of the inner side openings is connected to the same inlet and each of the outer peripheral openings is connected to the same outlet.

8. The water electrolysis apparatus according to claim 7, wherein:

at least two of the plurality of the water electrolysis portions are stacked on top of each other in the thickness direction, and the anode or the cathode of the at least two of the water electrolysis portions is configured by the same electrode.

9. The water electrolysis apparatus according to claim 7, wherein:

n units of the water electrolysis portions are stacked on top of each other in the thickness direction, the anode or the cathode of adjacent units of the n units of the water electrolysis portions in the thickness direction is configured by the same electrode, and the n units of the water electrolysis portions include n+1 electrodes.

10. The water electrolysis apparatus according to claim 7, wherein:

the same inlet and the same outlet are provided at a housing, the plurality of the water electrolysis portions are arranged in the housing, a gas-liquid mixing portion is interposed between the plurality of the water electrolysis portions and the same outlet in the housing, and the gas-liquid mixing portion includes:

a gas-liquid mixing inlet portion that is connected to each of the outer peripheral openings of the plurality of the water electrolysis portions; and a gas-liquid mixing outlet portion that discharges a fluid that has been gas-liquid mixed and that is connected to the same outlet.

11. The water electrolysis apparatus according to claim 7, wherein a catalyst electrode containing boron-doped diamond is provided on the anode side of the plurality of the water electrolysis portions.

12. A disinfection, sterilization and cleaning method using the water electrolysis apparatus according to claim 11, the method comprising:

supplying contaminated water containing bacteria, a virus, or any combination thereof to the inlet of the water electrolysis apparatus according to claim 11, and discharging water with a reduced adenosine triphosphate value from the outlet of the water electrolysis apparatus.

13. The water electrolysis apparatus according to claim 1, wherein electrode surfaces of the anode side mesh electrode and the cathode side mesh electrode are parallel to a surface of the polymer electrolyte membrane.

14. The water electrolysis apparatus according to claim 1, wherein the anode, the anode side mesh electrode, the polymer electrolyte membrane, the cathode side mesh electrode, and the cathode are circular or approximately circular in outline when viewed in a plane perpendicular to the thickness direction.

15. The water electrolysis apparatus according to claim 1, wherein one or more metal mesh electrodes, and a boron-doped diamond substrate electrode comprising boron-doped diamond deposited on a substrate electrode in which a plurality of holes are formed, are disposed in the anode side electrolytic domain.

16. The water electrolysis apparatus according to claim 1, wherein the anode side mesh electrode includes a boron-doped diamond mesh electrode comprising boron-doped diamond powder supported on a metal mesh.

17. The water electrolysis apparatus according to claim 1, wherein at least one of a metal mesh electrode made of titanium, stainless steel or any combination thereof, or a mesh electrode or substrate electrode comprising boron-doped diamond formed at least on a surface thereof, is arranged in the cathode side electrolytic domain.

18. The water electrolysis apparatus according to claim 1, wherein the cathode side mesh electrode includes a metal mesh electrode made of platinum.

19. A disinfection, sterilization and cleaning method using the water electrolysis apparatus according to claim 1, the method comprising:
   supplying contaminated water containing bacteria, a virus, or any combination thereof to the inlet of the water electrolysis apparatus according to claim 1, and
   discharging water with a reduced adenosine triphosphate value from the outlet of the water electrolysis apparatus.

20. A disinfection, sterilization and cleaning method using the water electrolysis apparatus according to claim 1, the method comprising:
   using the water electrolysis apparatus according to claim 1 to generate advanced oxidation water in which ozone and hydrogen peroxide coexist as the electrolytic water, and
   mixing the generated advanced oxidation water with contaminated water containing bacteria, a virus, or any combination thereof to reduce an adenosine triphosphate value.

21. A disinfection, sterilization and cleaning method using the water electrolysis apparatus according to claim 1, the method comprising:
   using the water electrolysis apparatus according to claim 1 to generate advanced oxidation water in which ozone and hydrogen peroxide coexist as the electrolytic water, and
   mixing the generated advanced oxidation water with contaminated water containing bacteria, a virus, or any combination thereof to reduce an adenosine triphosphate value.

22. A method of decomposing/treating harmful substances using the water electrolysis apparatus according to claim 1, the method comprising:
   supplying contaminated water containing organic matter, ammonia, cyanide or any combination thereof to the inlet of the water electrolysis apparatus according to claim 1, and
   discharging water wherein the organic matter, ammonia, cyanide or any combination thereof has been decomposed/treated from the outlet of the water electrolysis apparatus.

23. A method of decomposing and treating harmful substances using the water electrolysis apparatus according to claim 1, the method comprising:
   supplying contaminated water containing organic matter, ammonia, cyanide or any combination thereof to the inlet of the water electrolysis apparatus according to claim 1, and
   discharging water wherein the organic matter, ammonia, cyanide or any combination thereof has been decomposed/treated from the outlet of the water electrolysis apparatus.

24. A method of decomposing and treating harmful substances using the water electrolysis apparatus according to claim 1, the method comprising:
   using the water electrolysis apparatus according to claim 1 to generate advanced oxidation water in which ozone and hydrogen peroxide coexist as the electrolytic water, and
   mixing the generated advanced oxidation water with contaminated water containing organic matter, ammonia, cyanide or any combination thereof to decompose and treat the organic matter, ammonia, cyanide or any combination thereof in the contaminated water.

25. A method of decomposing and treating harmful substances using the water electrolysis apparatus according to claim 1, the method comprising:
   using the water electrolysis apparatus according to claim 1 to generate advanced oxidation water in which ozone and hydrogen peroxide coexist as the electrolytic water, and
   mixing the generated advanced oxidation water with contaminated water containing organic matter, ammonia, cyanide or any combination thereof to decompose and treat the organic matter, ammonia, cyanide or any combination thereof in the contaminated water.

* * * * *